United States Patent
Lee et al.

(10) Patent No.: US 9,394,388 B2
(45) Date of Patent: Jul. 19, 2016

(54) HYBRID SUPPORTED METALLOCENE CATALYST, METHOD FOR PREPARING THE SAME, AND PROCESS FOR PREPARING POLYOLEFIN USING THE SAME

(71) Applicants: SK Innovation Co., Ltd., Seoul (KR); SK Global Chemical Co., Ltd., Seoul (KR)

(72) Inventors: Ho Seong Lee, Seoul (KR); Dong Cheol Shin, Daejeon (KR); Sung Seok Chae, Daejeon (KR); Kyu Cheol Cho, Seoul (KR); Seung Yeol Han, Daejeon (KR); Jong Sok Hahn, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 14/382,807

(22) PCT Filed: Mar. 5, 2013

(86) PCT No.: PCT/KR2013/001741
§ 371 (c)(1),
(2) Date: Sep. 4, 2014

(87) PCT Pub. No.: WO2013/133595
PCT Pub. Date: Sep. 12, 2013

(65) Prior Publication Data
US 2015/0025204 A1 Jan. 22, 2015

(30) Foreign Application Priority Data
Mar. 6, 2012 (KR) ............ 10-2012-0022935

(51) Int. Cl.
| | |
|---|---|
| *C08F 4/653* | (2006.01) |
| *C08F 4/6592* | (2006.01) |
| *C08F 10/00* | (2006.01) |
| *C08F 110/02* | (2006.01) |
| *C08F 4/659* | (2006.01) |
| *C08F 210/16* | (2006.01) |

(52) U.S. Cl.
CPC ............ *C08F 110/02* (2013.01); *C08F 4/6592* (2013.01); *C08F 4/65904* (2013.01); *C08F 4/65916* (2013.01); *C08F 210/16* (2013.01)

(58) Field of Classification Search
CPC ... C08F 4/65904; C08F 4/6592; C08F 210/16
See application file for complete search history.

(56) References Cited

U.S. PATENT DOCUMENTS

| | | | |
|---|---|---|---|
| 5,786,291 A | 7/1998 | Speca et al. | |
| 7,294,600 B2 | 11/2007 | Lee et al. | |
| 8,921,499 B2 * | 12/2014 | Shin .................. | C08F 4/76 502/103 |
| 9,120,884 B2 * | 9/2015 | Shin .................. | C08F 4/76 |
| 2011/0105705 A1 * | 5/2011 | Han .................. | C08F 10/00 526/129 |
| 2011/0201770 A1 | 8/2011 | Yang et al. | |
| 2013/0046068 A1 | 2/2013 | Kwon et al. | |

FOREIGN PATENT DOCUMENTS

| | | |
|---|---|---|
| CN | 1211994 A | 3/1999 |
| CN | 100567336 C | 12/2009 |
| CN | 101389668 B | 11/2011 |
| KR | 1020110101386 A | 9/2011 |
| WO | 2011111979 A2 | 9/2011 |

OTHER PUBLICATIONS

Rodrigues et al.; "An explanation for experimental behavior of hybrid metallocene silica-supported catalyst for ethylene polymerization"; Journal of Molecular Catalysis A: Chemical; 2004; pp. 19-27; vol. 216.

* cited by examiner

*Primary Examiner* — Caixia Lu
(74) *Attorney, Agent, or Firm* — The Webb Law Firm

(57) ABSTRACT

Provided are a hybrid supported metallocene catalyst, a method for preparing the same, and a process for preparing an olefin polymer using the same, and more particular, a hybrid supported metallocene catalyst characterized in that two kinds of metallocene compounds containing a new cyclopenta[b]fluorenyl transition metal compound are supported on an inorganic or organic porous carrier surface-treated with an ionic compound and a co-catalyst, a method for preparing the same, and a process for preparing an olefin polymer using the hybrid supported metallocene catalyst.

15 Claims, No Drawings

HYBRID SUPPORTED METALLOCENE CATALYST, METHOD FOR PREPARING THE SAME, AND PROCESS FOR PREPARING POLYOLEFIN USING THE SAME

CROSS-REFERENCE TO RELATED APPLICATIONS

This application is the United States national phase of International Application No. PCT/KR2013/001741 filed Mar. 5, 2013, and claims priority to Korean Patent Application No. 10-2012-0022935 filed Mar. 6, 2012, the disclosures of which are hereby incorporated in their entirety by reference.

TECHNICAL FIELD

The present invention relates to a hybrid supported metallocene catalyst, a method for preparing the same, a process for preparing an olefin polymer using the same, and a prepared olefin polymer.

BACKGROUND ART

A metallocene catalyst is configured of a main catalyst of which a main component is a transition metal compound, mainly a Group IV metal, and an organometallic compound co-catalyst of which main component is aluminum or boron. The metallocene catalyst, which is a homogeneous single activation point catalyst, may prepare a polyolefin having a narrow molecular weight distribution and uniform chemical compositional distribution, and stereoregularity, comonomer response, and hydrogen response may be freely adjusted depending on a ligand structure of the metallocene catalyst.

Particularly, in the case of polyethylene, enhanced toughness, strength, environmental stress cracking resistance (ESCR), or the like, may be important. Therefore, a method for preparing a polyolefin having a bimodal or broad molecular weight distribution to enhance mechanical properties that a high molecular weight resin has and processability in a low molecular weight has been proposed.

The polyolefin having a bimodal and broad molecular weight distribution is a polymer having two kinds of average molecular weights, that is, a high molecular weight and a low molecular weight. As a method for synthesizing a polymer having this molecular weight distribution, a method of mixing two different catalysts in a single reactor, or a method of introducing at least two catalysts in a single carrier to perform polymerization have been disclosed.

In the methods for adjusting molecular weight distribution of the polymer according to the related art, generally, at the time of preparing a catalyst, a multi-metal complex is formed using at least two metals, and the molecular weight distribution is improved by adjusting the activation point of each of the metal catalyst components.

However, polymerization only by hybrid of two catalysts has been suggested, and selections of organometallic compounds and homogeneous catalyst systems for controlling the molecular weight distribution and polymer properties have been only mentioned, but there was a limitation in preparing supported catalysts applicable to gas-phase and slurry processes, or the like.

DISCLOSURE OF INVENTION

Technical Problem

An object of the present invention is to provide a hybrid supported metallocene catalyst prepared by surface-treating a surface of an inorganic or organic porous carrier with an ionic compound and a co-catalyst and then simultaneously adding two different metallocene compounds.

Another object of the present invention is to provide a method for preparing a hybrid supported metallocene catalyst.

Another object of the present invention is to provide a process for preparing polyolefin capable of preparing various polyolefin products while having high activity and process stability in a slurry polymerization process or gas-phase olefin polymerization process by using the hybrid supported metallocene catalyst in a single reactor or multiple reactors.

Solution to Problem

In one general aspect, there is provided a hybrid supported metallocene catalyst in which a first metallocene compound and a second metallocene compound are supported on a carrier surface-treated with an ionic compound and a co-catalyst.

In another general aspect, there is provided a method for preparing a hybrid supported metallocene catalyst including 1) treating a carrier with an ionic compound and a co-catalyst; and 2) simultaneously supporting a hybrid of first and second metallocene compounds on the carrier surface-treated with the ionic compound and the co-catalyst in step 1) to prepare a hybrid supported metallocene catalyst.

In another general aspect, there is provided a process for preparing an olefin polymer using the hybrid supported metallocene catalyst described above.

In another general aspect, there is provided an olefin polymer prepared using the hybrid supported metallocene catalyst described above.

Advantageous Effects of Invention

Since a hybrid supported metallocene catalyst according to the present invention may be a heterogeneous metallocene supported catalyst in which a new cyclopenta[b]fluorenyl transition metal compound is contained in an inorganic or organic porous carrier surface-treated with an ionic compound and a co-catalyst and prepared by simultaneously adding a hybrid of first and second metallocene compounds to the carrier surface-treated with the ionic compound and the co-catalyst to support them on the carrier, unlike a method of sequentially adding the compounds, which is a general supporting method, catalytic activity in an olefin polymerization reaction may be significantly excellent, and the prepared polymer may also have an excellent particle shape and bulk density. Therefore, the present invention may be significantly economical and useful for preparing metallocene polyolefin in a commercial slurry process or gas-phase process.

MODE FOR THE INVENTION

The present invention provides a hybrid supported metallocene catalyst in which first and second metallocene compounds are supported on a carrier surface-treated with an ionic compound and a co-catalyst, a method for preparing the hybrid supported metallocene catalyst, a process for preparing an olefin polymer by polymerizing olefin monomer or olefin based material, or olefin comonomer using the hybrid supported metallocene compound.

Hereinafter, the present invention will be described in detail.

As the ionic compound that may be used in the present invention, all of the ionic compounds that are currently commercialized may be used, and a newly synthesized ionic compound may be used according to the structures of the metallocene catalyst and the co-catalyst and the kind of carrier. The commercialized or synthesized ionic compounds may have features in that the ionic compound has vapor pressure of almost 0 and polarity in a temperature range of −100 to 300° C., and the polarity may be changed according to the kind of anion materials. In addition, various kinds of ionic compounds having significantly weak polarity to significantly strong polarity may be used. Further, any ionic compound in which impurities are not present may be used in the present invention as long as a molecular structure of the metallocene catalyst is not changed into an inactive molecular structure. More specifically, the ionic compound used in the present invention may be represented by the following Chemical Formula 1.

$$X^+Y^-$$ [Chemical Formula 1]

[In Chemical Formula 1, $X^+$ may be imidazolium ion, pyridinium ion, ammonium ion, phosphonium ion, sulfonium ion, pyrazolium ion, or pyrrolidium ion and further substituted with (C1-C20)alkyl or (C6-C20)aryl substituted or unsubstituted with at least one functional group selected from —CN, —OH, —SO$_3$H, —COOH, amino, —SiR$_{11}$R$_{12}$R$_{13}$ (R$_{11}$ to R$_{13}$ each are independently (C1-C20)alkyl or (C6-C30)aryl), (C1-C20)alkyl, and (C1-C20)alkoxy; $Y^-$ may be BF$_4^-$, BCl$_4^-$, PF$_6^-$, AlCl$_4^-$, halogen$^-$, CH$_3$CO$_2^-$, CF$_3$CO$_2^-$, CH$_3$SO$_4^-$, CH$_3$CH$_2$SO$_4^-$, CF$_3$SO$_3^-$, N(CN)$_2^-$, HCO$_3^-$, (CF$_3$SO$_2$)N$^-$, SCN$^-$, NO$_3^-$, SbF$_6^-$, Sb$_2$F$_{11}^-$, MePhSO$_3^-$, (CF$_3$SO$_2$)$_2$N$^-$, (CF$_3$SO$_2$)$_3$C$^-$, (OR)$_2$PO$_2^-$(R=(C1-C20)alkyl), Bu$_2$PO$_2^-$, Et$_2$PO$_2^-$, or HSO$_4^-$.]

In Chemical Formula 1, examples of the cation ($X^+$) are shown in the following Table 3.

TABLE 3

| Cation structure ($X^+$) | | | | | | | |
|---|---|---|---|---|---|---|---|
| Structure name | imidazolium ion | pyridinium ion | ammonium ion | phosphonium ion | sulfonium ion | pyrazolium ion | pyrrolidium ion |

In Table, R and R$_1$ to R$_3$ may be (C1-C20)alkyl or (C6-C20)aryl, and the alkyl or aryl may be substituted with at least one functional group selected from —OH, —SO$_3$H, —COOH, amino, —SiR$_{11}$R$_{12}$R$_{13}$ (R$_{11}$ to R$_{13}$ each are independently (C1-C20)alkyl or (C6-C30)aryl), (C1-C20)alkyl, and (C1-C20)alkoxy.

In Chemical Formula 1, examples of the anion ($Y^-$) are shown in the following Table 4.

TABLE 4

| Anion ($Y^-$) | Anion name | Anion ($Y^-$) | Anion name |
|---|---|---|---|
| BF$_4$— | tetrafluoroborate | (CH$_3$SO$_2$)N— | bis[9trifluoromethyl)sulfonyl]amide |
| BCl$_4$— | tetrachloroborate | SCN— | thiocyanate |
| PF$_6$— | hexafluorophosphate | NO$_3$— | nitrate |
| AlCl$_4$— | aluminum tetrachloride | SbF$_6$— | hexafluoroantimonate |
| Cl—, I—, Br— | chloride, iodide, bromide, | Sb$_2$F$_{11}$— | undecafluorodiantimotate |
| CH$_3$CO$_2$— | acetate | MePhSO$_3$— | tosylate |
| CF$_3$CO$_2$— | trifluoroacetate | (CF$_3$SO$_2$)$_2$N— | bis(trifluoromethylsulfonyl)imide |
| CH$_3$SO$_4$— | methylsulfate | (CF$_3$SO$_2$)$_3$C— | tris(trifluoromethylsulfontyl-methide |
| CH$_3$CH$_2$SO$_4$— | ethylsulfate | (OR)$_2$PO$_2$— | di(C1-C20)alkoxy phosphate |
| CF$_3$SO$_2$— | trifluoromethylsulfate | Bu$_2$PO$_2$— | dibutyl phosphate |
| N(CN)$_2$— | dicyanamide | Et$_2$PO$_2$— | diethyl phosphate |
| HCO$_3$— | hydrogen carbonate | HSO$_4$— | hydrogen sulfate |

In addition, examples of the ionic compound used in the present invention include 1,3-bis(cyanomethyl)-imidazolium chloride, 1-butyl-3-methylimidazoliumchloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogen carbonate, 1-butyl-3-methylimidazolium hydrogen sulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazoliumhexafluorophosphate, 1-ethyl-3-methylimidazolium tetrafluoroborate, 1-hexyl-3-methylimidazolium tetrafluoroborate, 1-butyl-4-methylpyridinium chloride, 1-butyl-4-methylpyridinium tetrafluoroborate, 1-butyl-4-methylpyridinium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate, 1-butyl-1-methylpyrrolidium chloride, 1-butyl-1-methylpyrrolidium bromide, 1-butyl-1-methylpyrrolidium tetrafluoroborate, 1-mesityl-3-methylimidazolium bromide, 1-mesityl-3-methylimidazolium chloride, 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate, 1-ethyl-2,3-dimethylimidazolium ethyl sulfate, and the like, and preferable examples thereof include 1,3-bis(cyanomethyl)-imidazolium chloride, 1-butyl-4-methylpyridinium hexafluorophosphate, benzyldimethyltetradecylammonium chloride, tributylmethylammonium chloride, tetrabutylphosphonium tetrafluoroborate, 1-butyl-1-methylpyrrolidium chloride, 1-butyl-3-methylimidazolium tetrachloroaluminate, 1-butyl-4-methylpyridinium chloride, 1-butyl-4-methylpyridinium tetrafluoroborate, and the like.

In the inorganic or organic porous carrier treated with the ionic compound, surface residual —OH groups are present in a range of 0.001 to 100 mmol per 1 g of the carrier before treating.

As the carrier treated with the ionic compound, an inorganic material or organic material having pores may be used, and these materials need to have the pore and surface area capable of supporting the ionic compound, metallocene, the co-catalyst. These carriers may have a functional group having hydrophobicity at the surfaces thereof or be surface-treated with various aluminum based compounds or halogen based compounds to thereby be used. Examples of the generally used inorganic carrier may include mesoporous materials, MCM-41, MCM-48, SBA-15, Asahi Glass H-122, H121, or the like, as well as the existing carriers used to support the metallocene catalyst such as silica, alumina, magnesium chloride, magnesium oxide, or the like, wherein the surface area thereof may be 100 m²/g or more, and pore volume may be 0.1 cc/g or more. Clay compounds such as mineral clay, kaolin, talc, mica, montmorillonite, or the like, may be used as the carrier. As the organic carrier, materials such as polysiloxane based polymer compounds, polystyrene gel, bead, or the like, may be used. The carrier compounds as described above may be used in an original state and be heat-treated at a temperature of 100 to 1000° C. to adjust an amount of hydrophobic functional groups, or the like, in pore surfaces of the carrier.

A composition of the ionic compound supported on the surface of the carrier as described above relates to physical and chemical properties of the surface of the carrier such as a pore surface area of the carrier, an amount of hydroxyl (OH) group in the surface of the carrier, and the like. A content of mixed and contacted ionic compound may be 0.001 to 50 weight %, preferably, 0.1 to 40 weight %, based on the surface-treated carrier. In addition, the more the content of the hydroxyl group remaining on the surface of the carrier, the more the amount of the ionic compound. In the case in which the content of the ionic compound is less than 0.001 weight %, a surface-treatment effect may be insignificant, and in the case in which the content is more than 50 weight %, an increasing effect corresponding to the excess amount is not obtained, such that the ionic compound may be wasted.

The hybrid supported metallocene catalyst according to the present invention is characterized in that a hybrid of a first metallocene compound represented by the following Chemical Formula 2 and a second metallocene compound represented by the following Chemical Formula 3 is supported on the carrier surface-treated with the ionic compound represented by the above-mentioned Chemical Formula 1 and the co-catalyst.

  [Chemical Formula 2]

[In Chemical Formula 2, $M^1$ is a Group 4 transition metal in the Periodic Table of Elements;

Cp' is a fused ring containing cyclopentadienyl or cyclopentadienyl ring capable of being $\eta^5$-bonded to a core metal M';

L' is a fused ring containing cyclopentadiene or cyclopentadienyl ring, or an anion ligand including (C1-C20)hydrocarbon substituents and O, N, or P atoms;

$L^2$ is a halogen atom, (C1-C20)alkyl, (C6-C30)aryl(C1-C20)alkyl, (C3-C20)cycloalkyl, (C1-C20)alkoxy, (C6-C30) aryloxy, (C6-C30)aryl, —SiR$^a$R$^b$R$^c$, —NR$^d$R$^e$, —OSiR$^f$R$^g$R$^h$, or —PR$^i$R$^j$;

$R^a$ to $R^j$ each are independently (C1-C20)alkyl or (C6-C30)aryl;

m is an integer of 1 or 2; and

Cp' and L' may not be connected to each other, or be connected via silicon or (C1-C4)alkenylene bond, the cyclopentadienyl ring or the fused ring containing the cyclopentadienyl ring of Cp' and L' may be further substituted with at least one selected from (C1-C20)alkyl, (C3-C20)cycloalkyl, (C6-C30)aryl, (C2-C20)alkenyl, and (C6-C30)aryl(C1-C20)alkyl.]

[Chemical Formula 3]

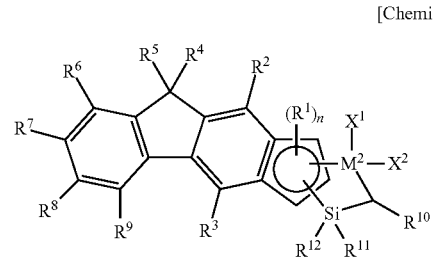

[In Chemical Formula 3, $M^2$ is a Group 4 transition metal in the Periodic Table of Elements;

n is an integer of 1 or 2, and when n is 2, $R^1$(s) may be the same as or different from each other $R^1$ is hydrogen, (C1-C20)alkyl, halo(C1-C20)alkyl, (C3-C20)cycloalkyl, (C1-C20)alkyl(C6-C30)aryl, (C6-C30)aryl, (C6-C30)ar(C1-C20)alkyl, ((C1-C20)alkyl(C6-C30)aryl)(C1-C20)alkyl, —SiR'''R''R°, or 5- to 7-membered N-heterocycloalkyl containing at least one nitrogen atom;

$R^2$ and $R^3$ each are independently, hydrogen, (C1-C20)alkyl, (C1-C20)alkoxy, halo(C1-C20)alkyl, (C3-C20)cycloalkyl, (C1-C20)alkyl(C6-C30)aryl, (C6-C30)aryl, (C6-C30)aryloxy, (C1-C20)alkyl(C6-C30)aryloxy, (C6-C30)ar(C1-C20)alkyl, ((C1-C20)alkyl(C6-C30)aryl)(C1-C20)alkyl, —NR$^k$R$^l$, or —SiR'''R''R°;

$R^4$, $R^5$, $R^{10}$, $R^{11}$, and $R^{12}$ each are independently (C1-C20)alkyl, halo(C1-C20)alkyl, (C3-C20)cycloalkyl, (C1-C20)alkyl(C6-C30)aryl, (C6-C30)aryl, (C1-C20)alkoxy(C6-C30)aryl, (C6-C30)ar(C1-C20)alkyl, ((C1-C20)alkyl(C6-C30)aryl)(C1-C20)alkyl, —NR$^k$R$^l$, or —SiR'''R''R°;

$R^6$, $R^7$, $R^8$, and $R^9$ each may be independently hydrogen, (C1-C20)alkyl, halo(C1-C20)alkyl, (C3-C20)cycloalkyl, (C1-C20)alkoxy, (C6-C30)aryl, (C1-C20)alkyl(C6-C30)aryl, (C6-C30)ar(C1-C20)alkyl, ((C1-C20)alkyl(C6-C30)aryl)(C1-C20)alkyl, (C1-C20)alkoxy(C6-C30)aryl, (C6-C30)aryloxy, (C1-C20)alkyl(C6-C30)aryloxy, N-carbazolyl, —NR$^k$R$^l$, or —SiR'''R''R° or linked with substituent adjacent thereto via (C1-C5)alkylene to form a ring, at least one CH$_2$— of alkylene may be substituted by a hetero atom selected from —O—, —S—, and NR', and alkylene may be further substituted with (C1-C20)alkyl;

R' and $R^k$ to R° each are independently (C1-C20)alkyl or (C6-C30)aryl; and $X^1$, and $X^2$ each are independently halogen, (C1-C20)alkyl, (C2-C20)alkenyl, (C3-C20)cycloalkyl, (C6-C30)aryl, (C6-C30)ar(C1-C20)alkyl, ((C1-C20)alkyl(C6-C30)aryl)(C1-C20)alkyl, (C1-C20)alkoxy, (C6-C30)aryloxy, (C1-C20)alkyl(C6-C30)aryloxy, (C1-C20)alkoxy(C6-C30)aryloxy, (C1-C20)alkylidene, or an anion or dianion ligand consisting of 60 or less atoms containing N, P, O, S, Si, and halogen, except hydrogen, provided that one of $X^1$ and $X^2$ is a dianion ligand, the other is ignored.]

The second metallocene compound represented by Chemical Formula 3, which is a new transition metal compound based on a cyclopenta[b]fluorenyl group, has a structure where a Group 4 transition metal in the Periodic Table of Elements as a core metal is linked with a cyclopenta[b]fluoren-3-yl group that has a rigid plane structure even though it is not in a hetero ring; has abundant electrons widely nonlocalized; and allows a substituent contributing to improvement in solubility and performance to be easily inducible at position 9 thereof, via an amino group substituted silyl group, to thereby have an advantageous structure in obtaining high-efficiency and high-molecular weight ethylene based polymers. The hybrid supported metallocene catalyst according to the present invention may be prepared by supporting the hybrid of the second metallocene compound represented by Chemical Formula 3 and the first metallocene compound represented by Chemical Formula 2.

The second metallocene compound represented by Chemical Formula 3 may include a transition metal compound represented by the following Chemical Formula 4 or 5.

[Chemical Formula 4]

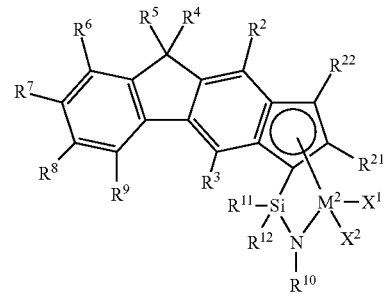

[Chemical Formula 5]

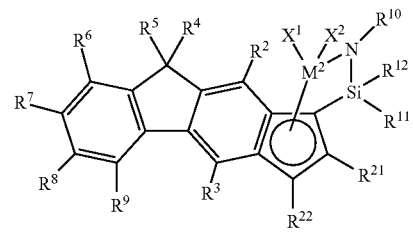

[In Chemical Formulas 4 and 5, $M^2$, $R^2$ to $R^{12}$, $X^1$, and $X^2$ each have the same definition as defined in Chemical Formula 3; $R^{21}$ and $R^{22}$ each are independently hydrogen, (C1-C20)alkyl, halo(C1-C20)alkyl, (C3-C20)cycloalkyl, (C1-C20)alkyl(C6-C30)aryl, (C6-C30)aryl, (C6-C30)ar(C1-C20)alkyl, ((C1-C20)alkyl(C6-C30)aryl)(C1-C20)alkyl, —NR$^k$R$^l$, —SiR'''R''R°, or 5- to 7-membered N-heterocycloalkyl containing at least one nitrogen atom; and $R^k$ to R° each are independently (C1-C20)alkyl or (C6-C30)aryl.]

The second metallocene compound represented by Chemical Formula 3 may be selected from compounds having the following structures.

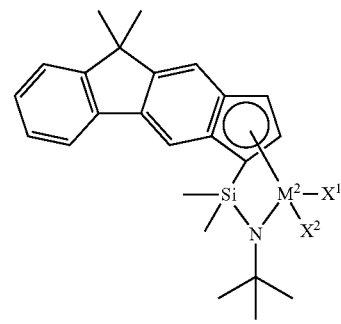

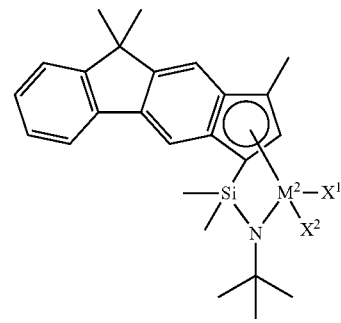

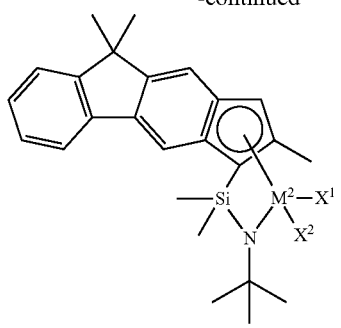
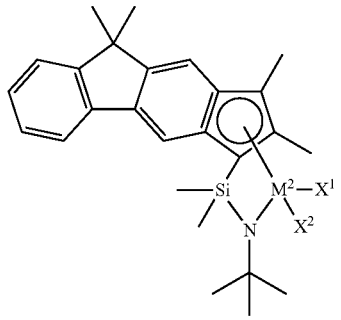
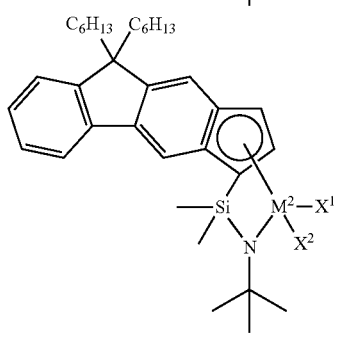
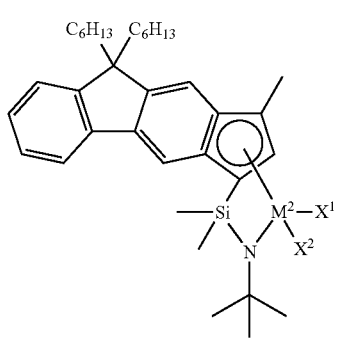
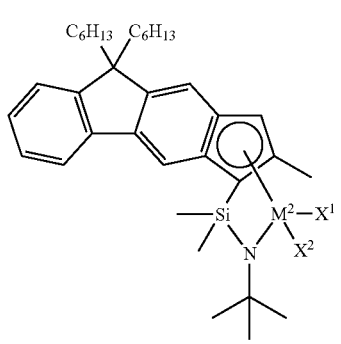
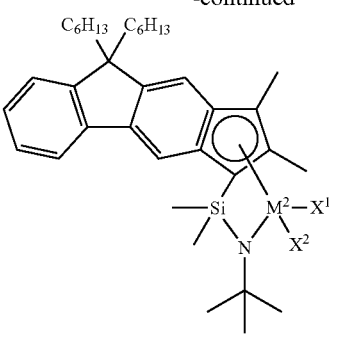
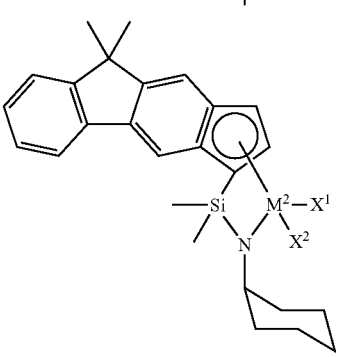
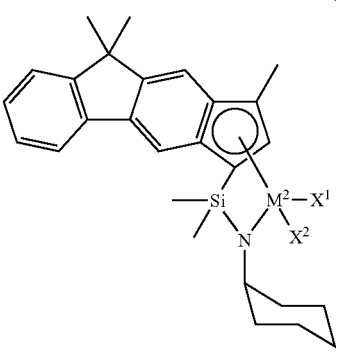
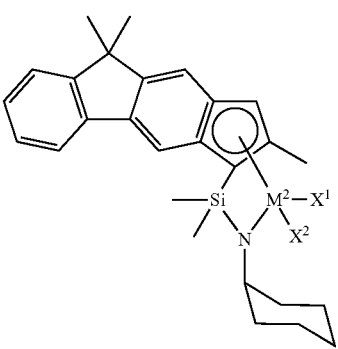
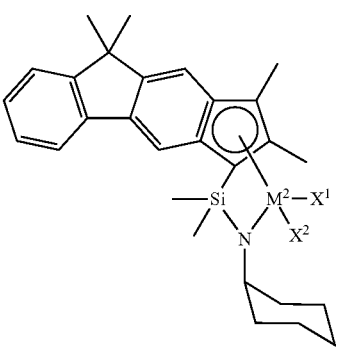

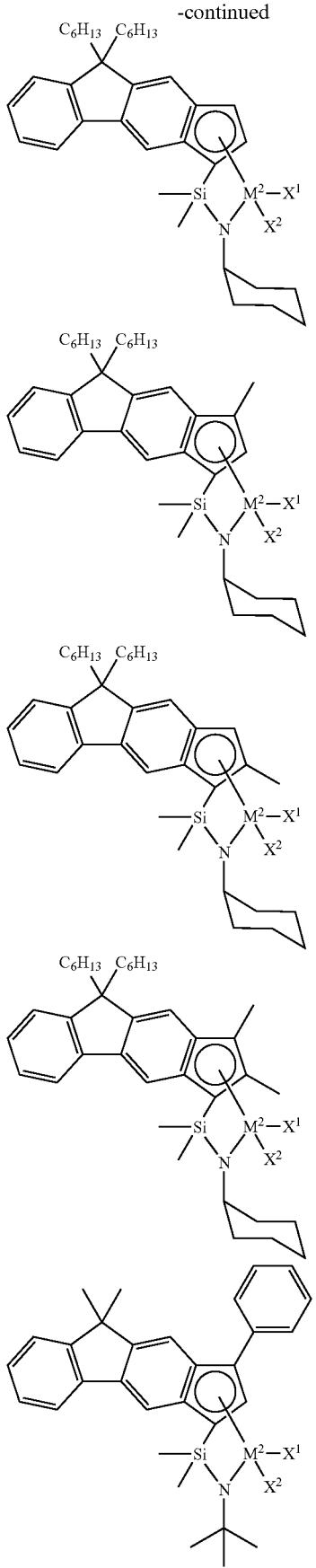
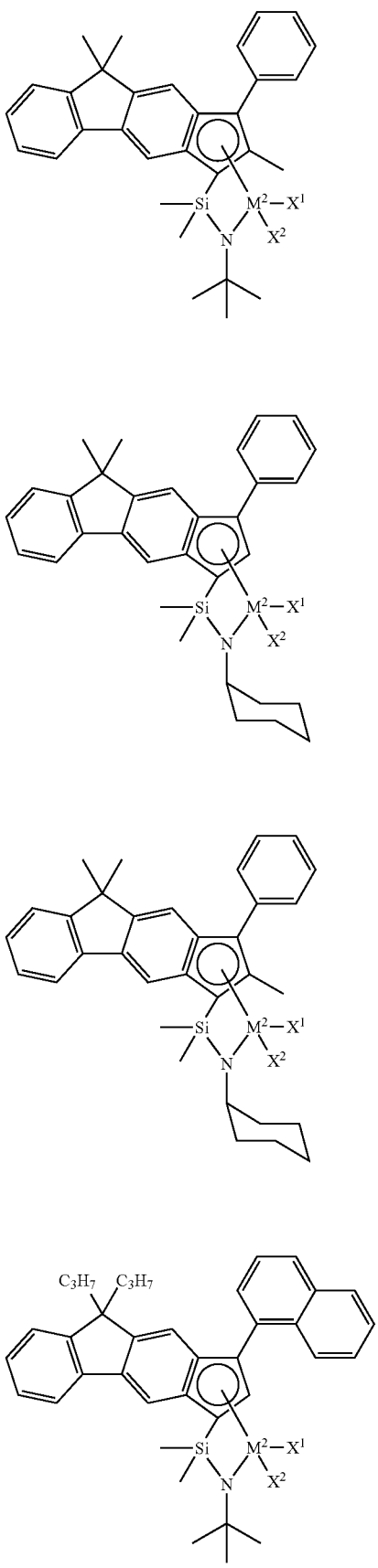

-continued
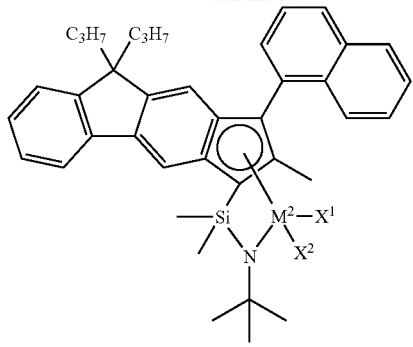
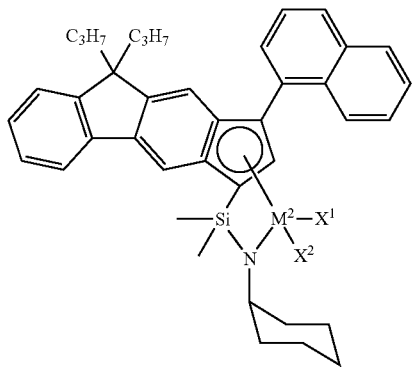
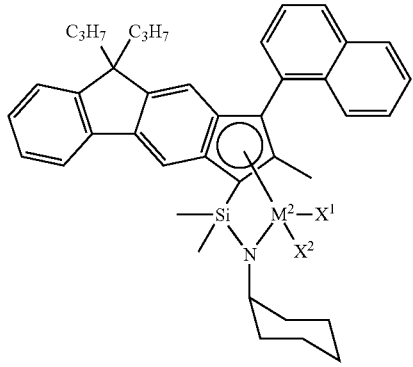
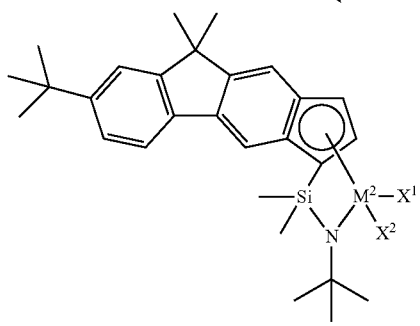
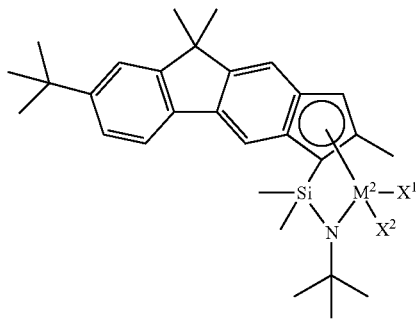
-continued
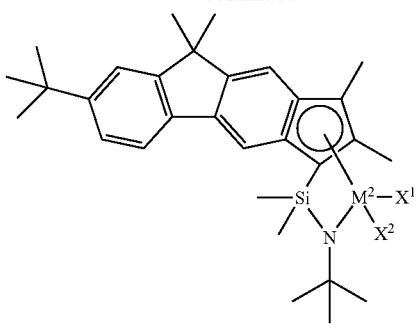
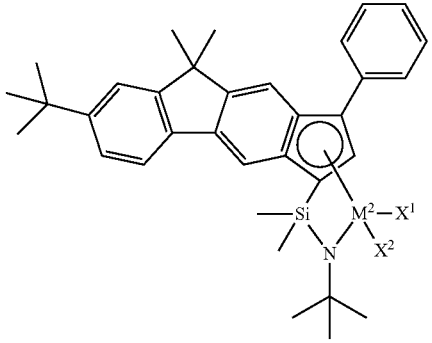
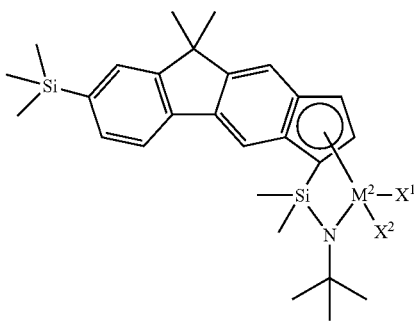
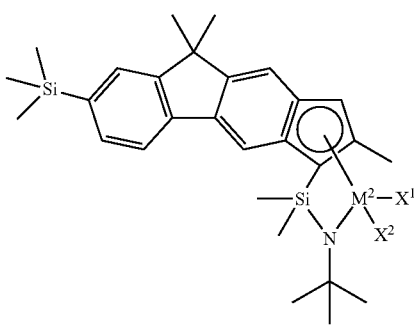
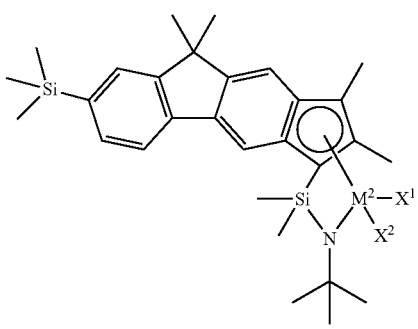

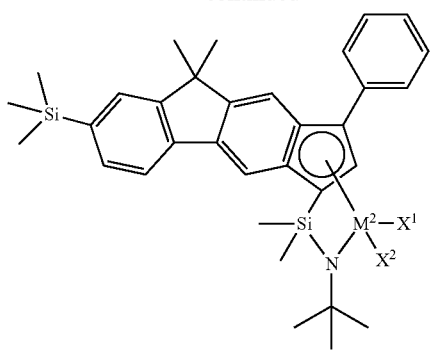
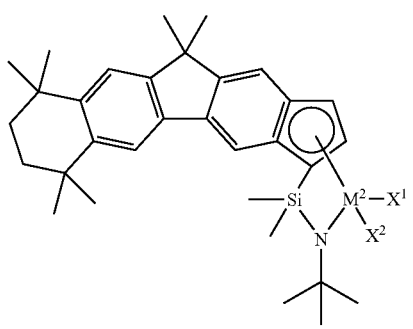
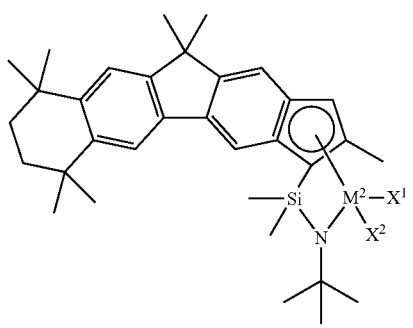
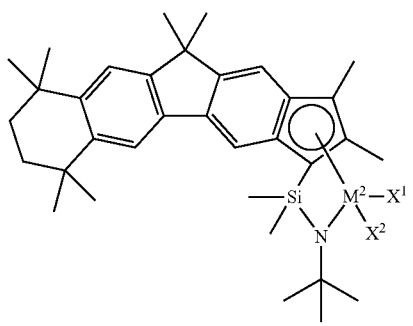
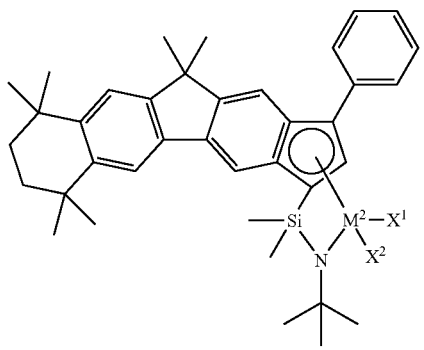
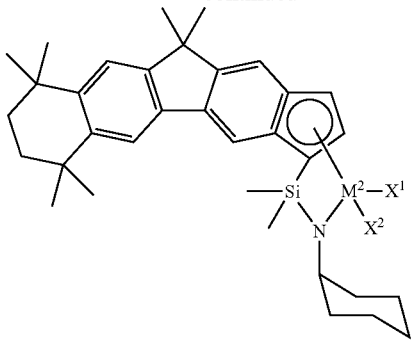
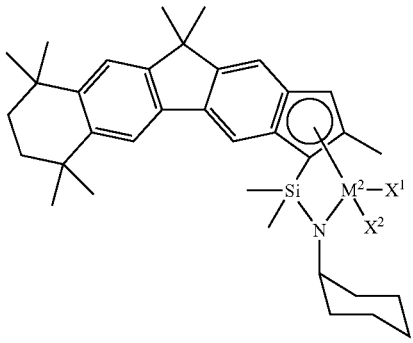
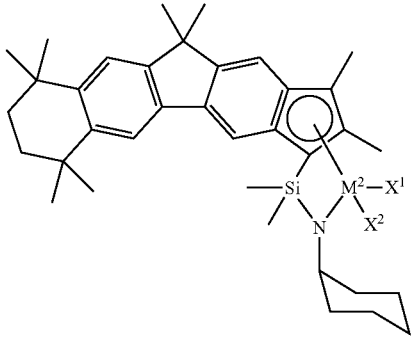
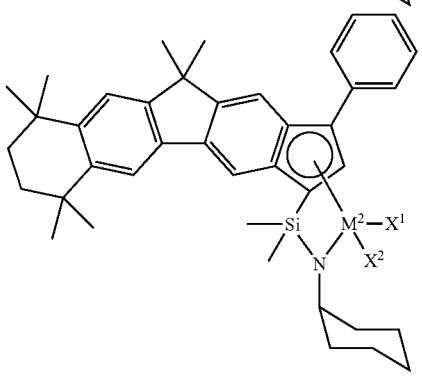
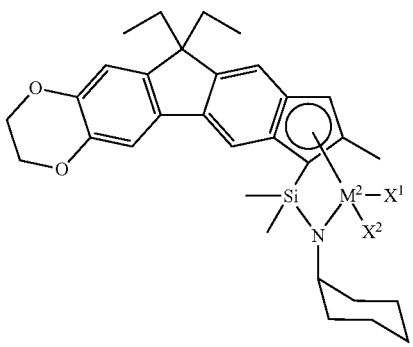

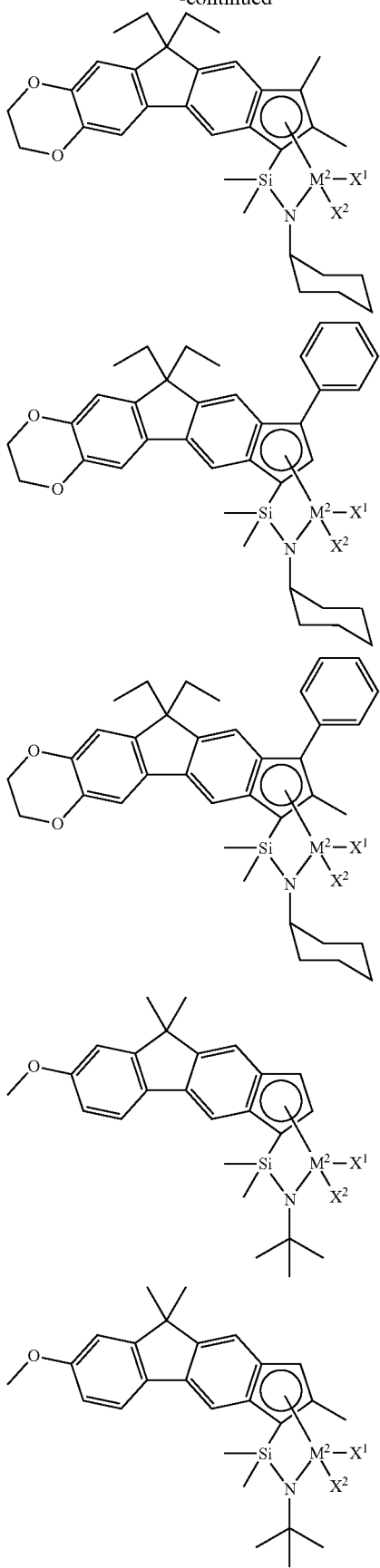
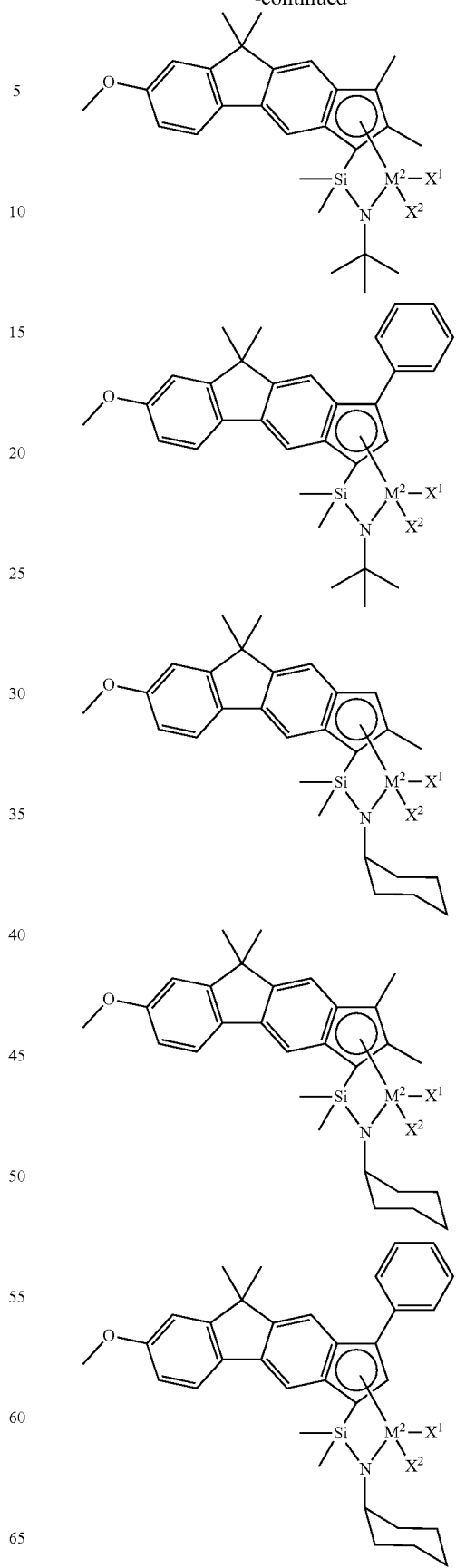

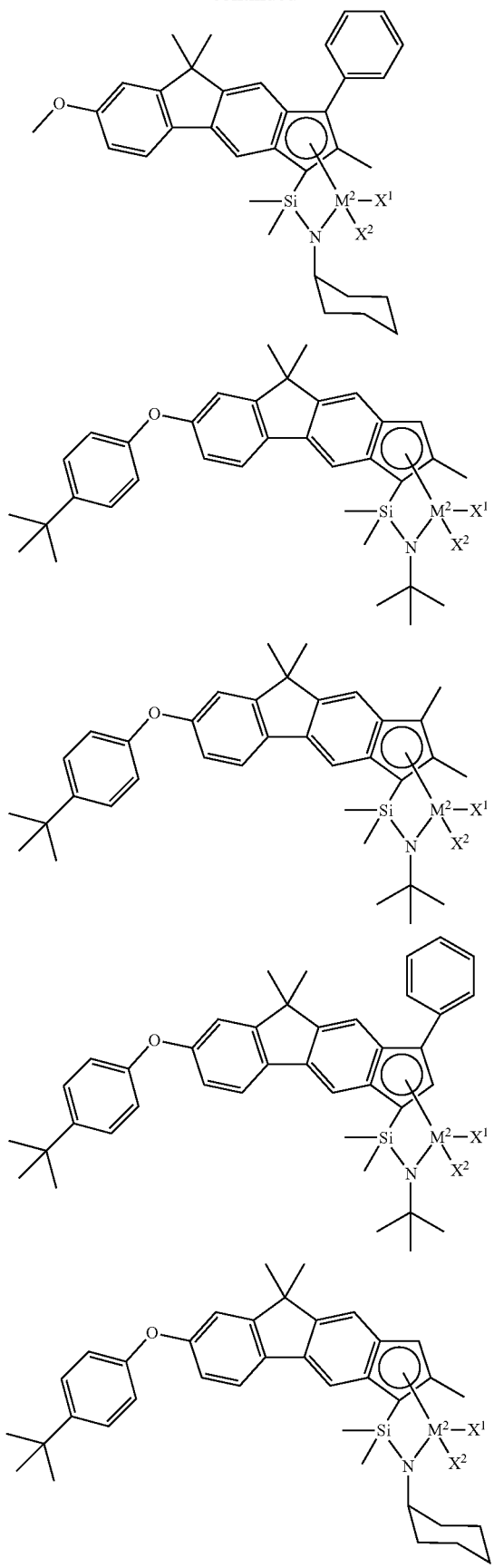
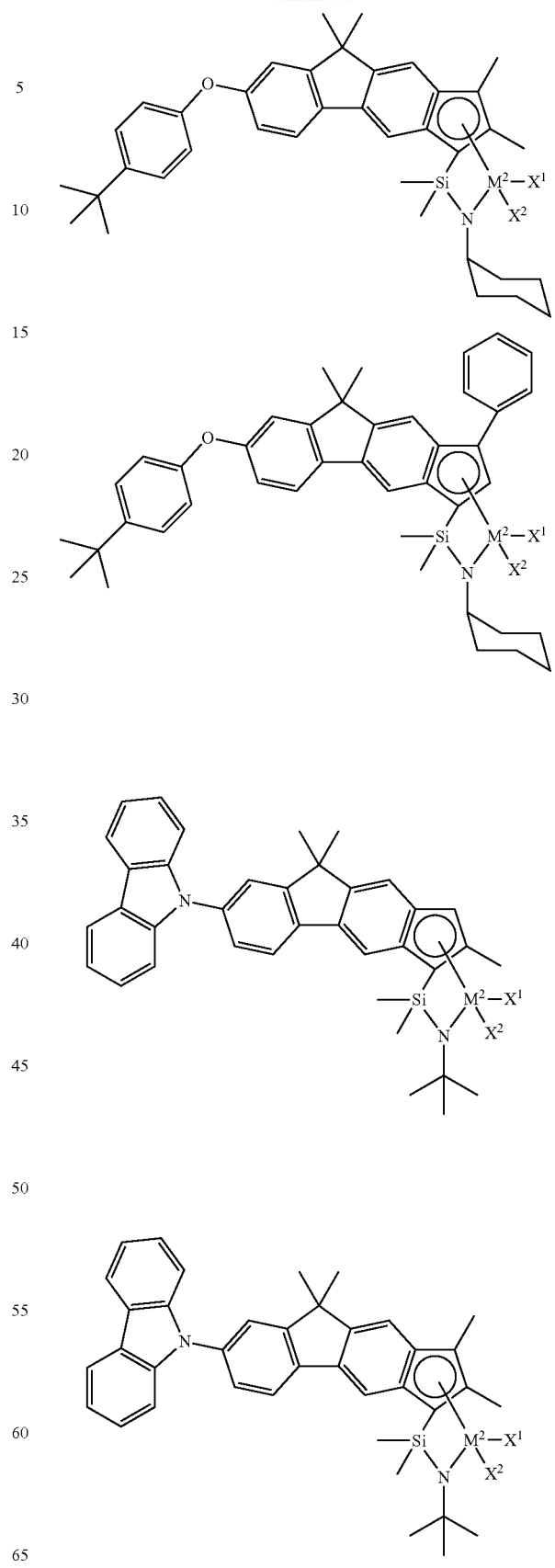

21
-continued
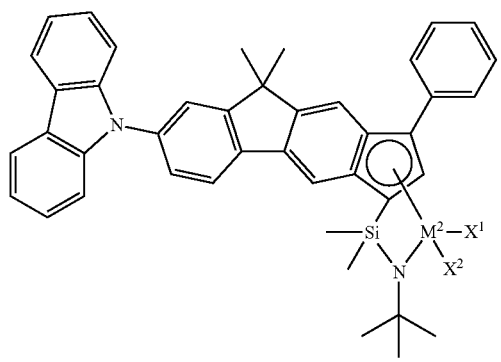
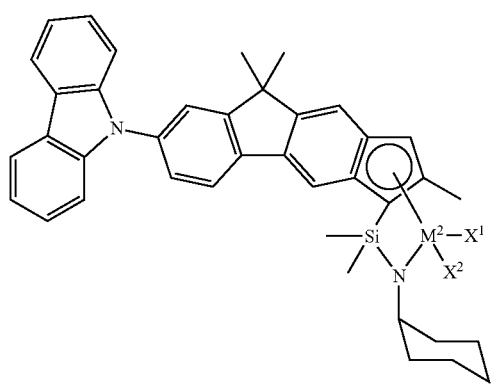
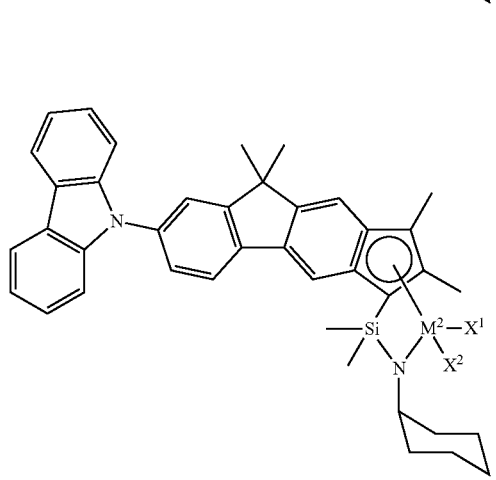
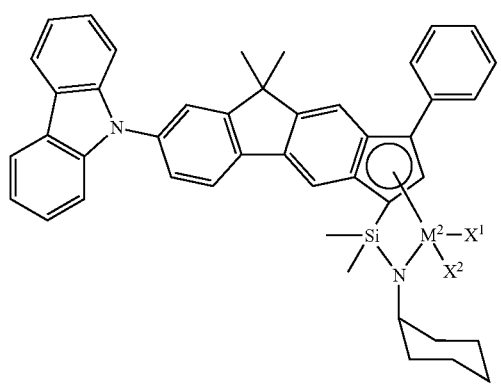
22
-continued
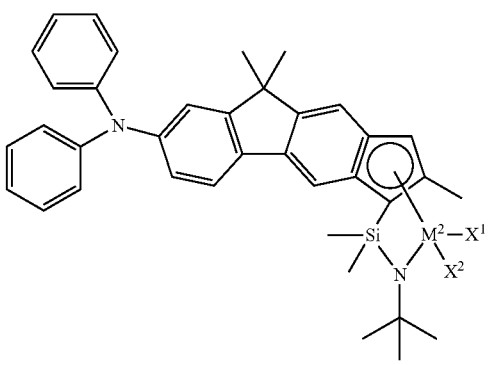
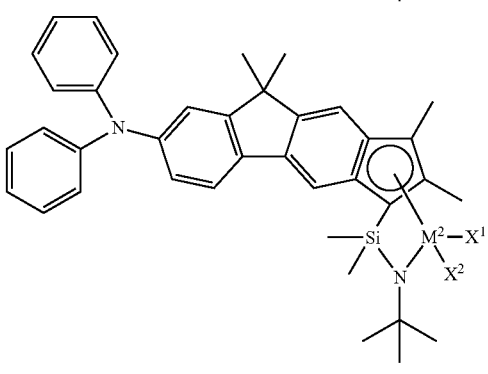
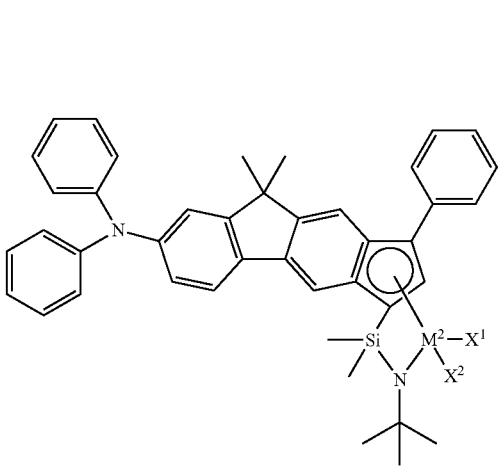
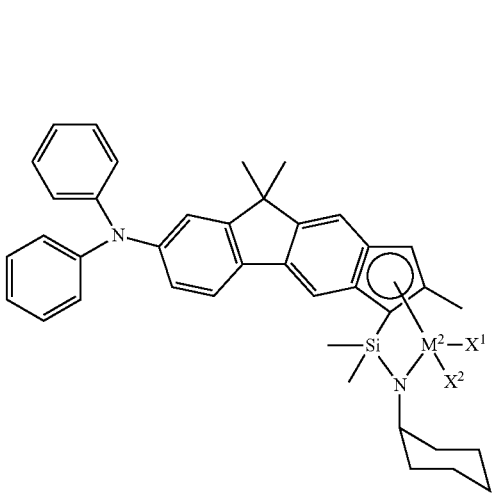

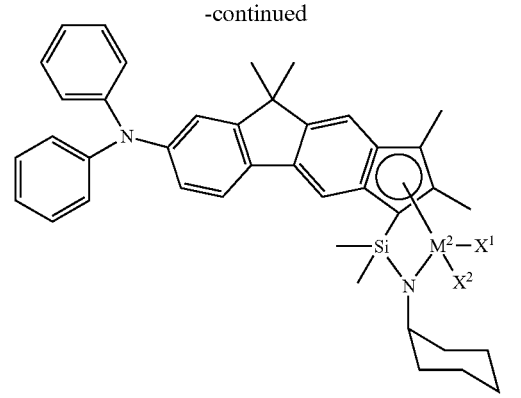
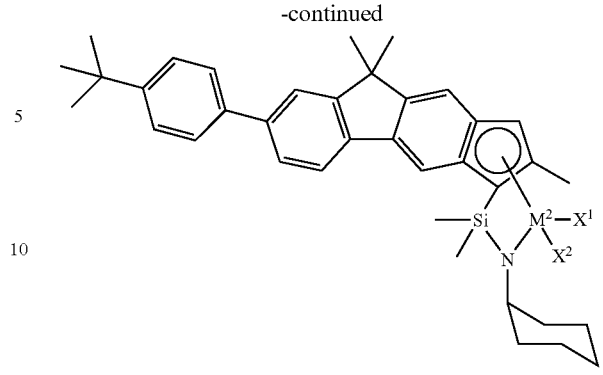
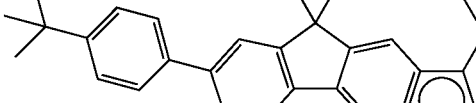

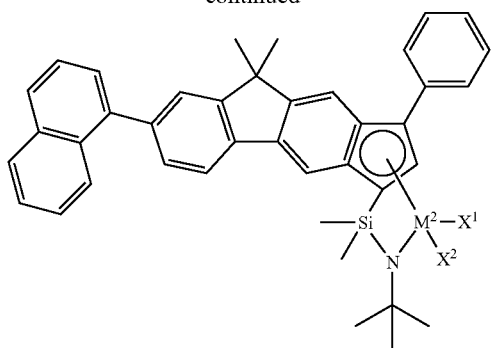
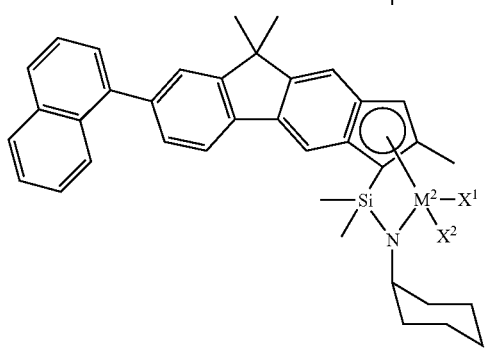
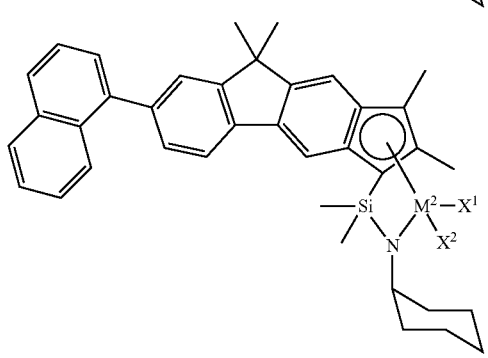
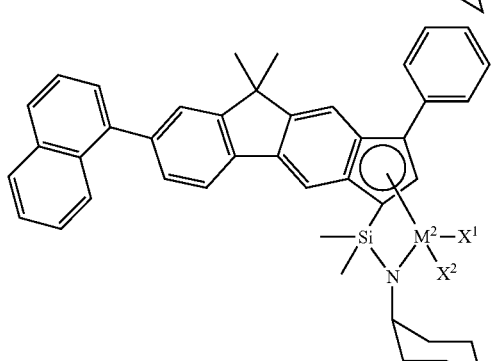
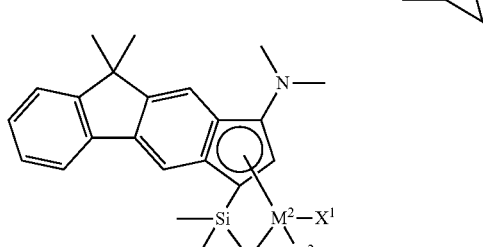
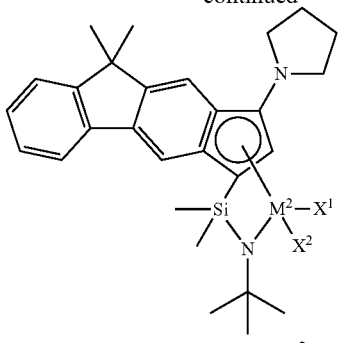
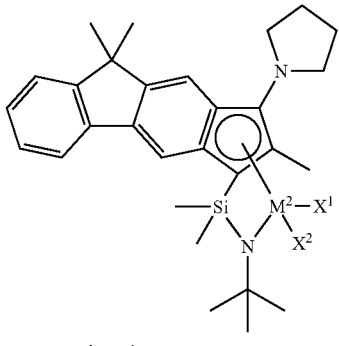
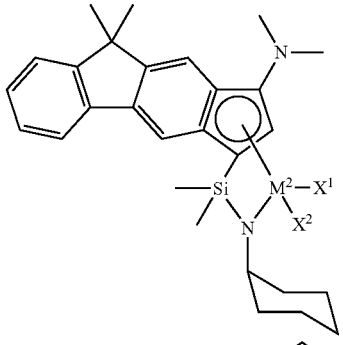
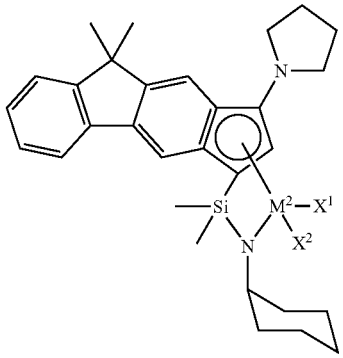
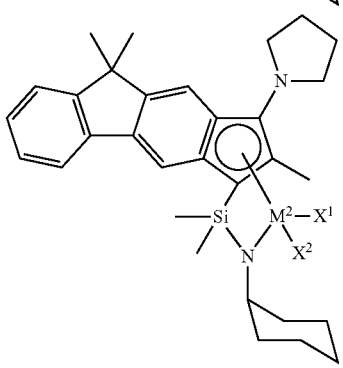

-continued
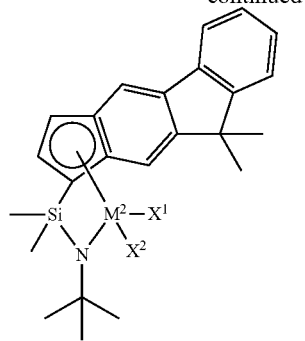
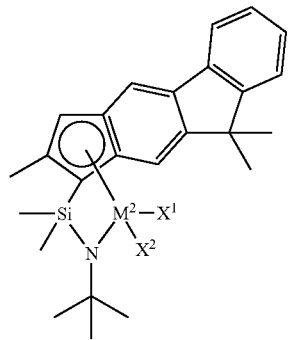
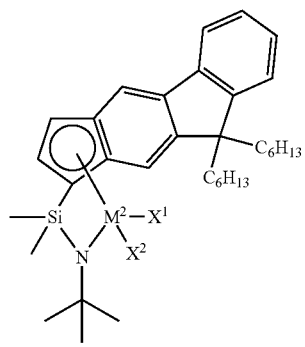
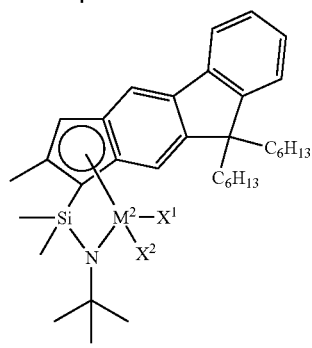
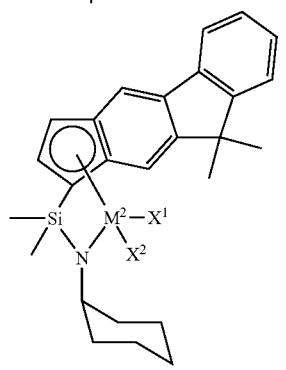
-continued
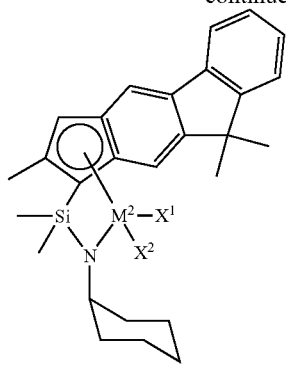
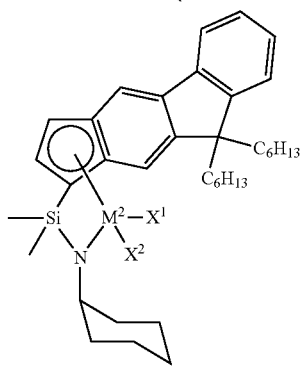
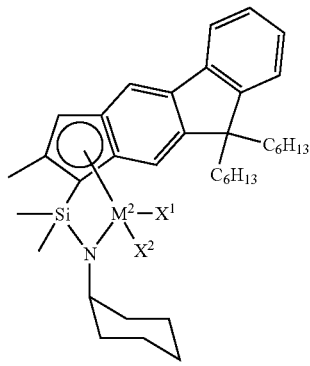
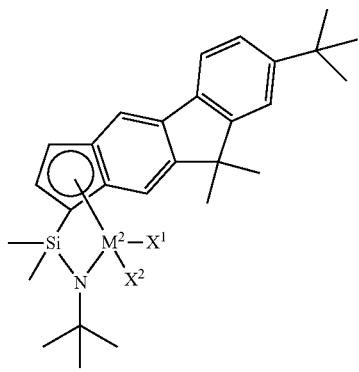

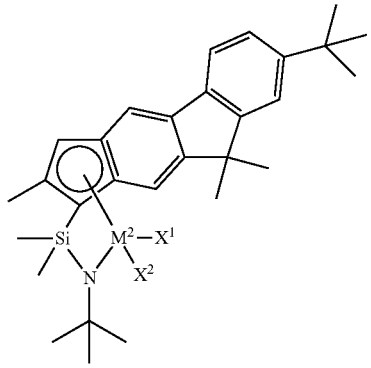
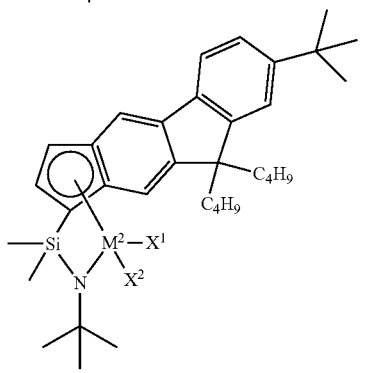
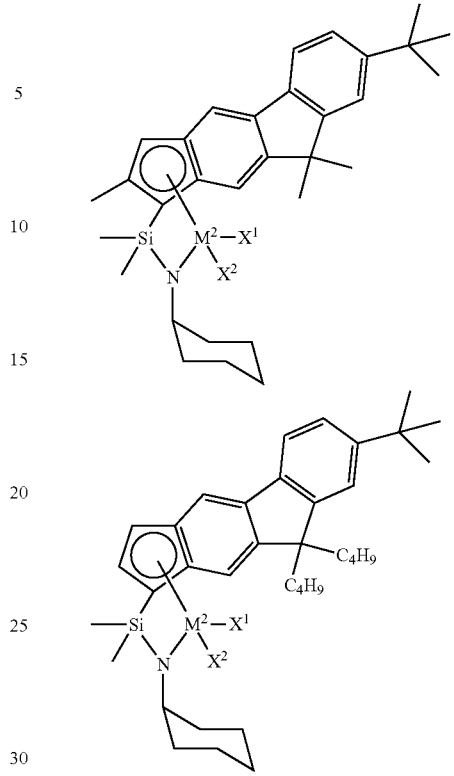
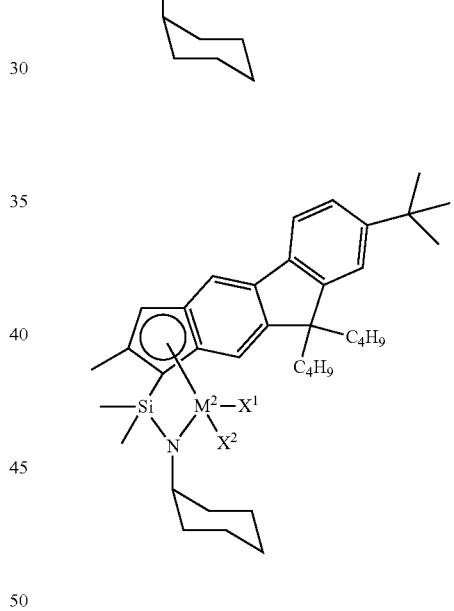
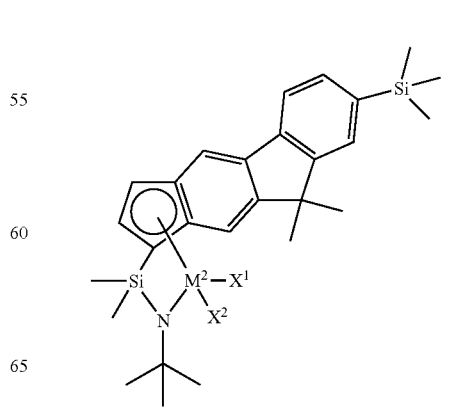

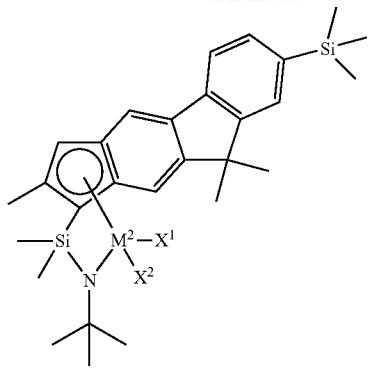
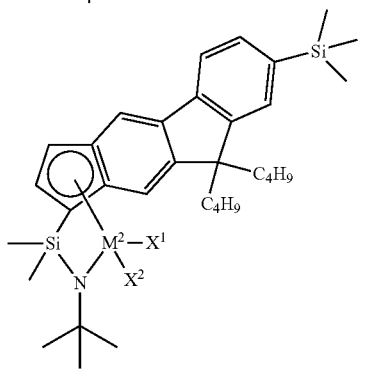
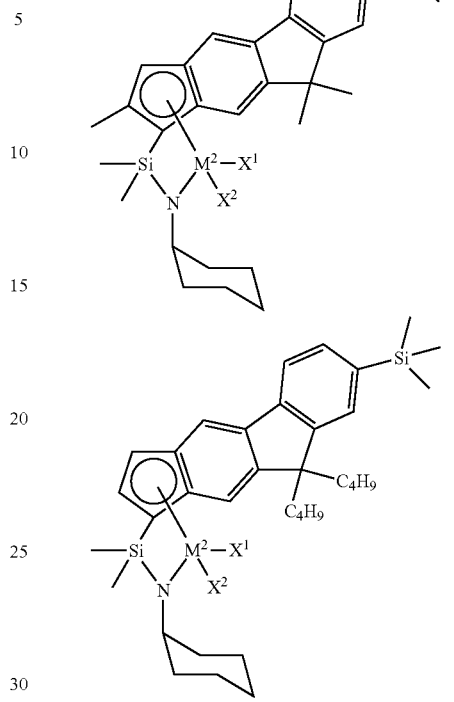
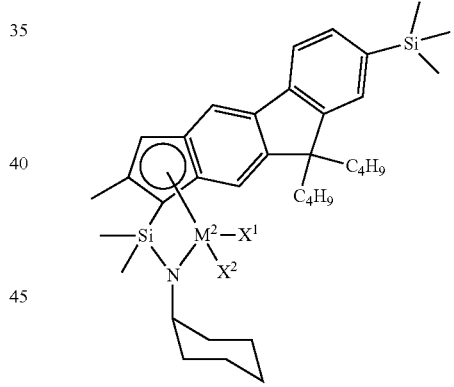
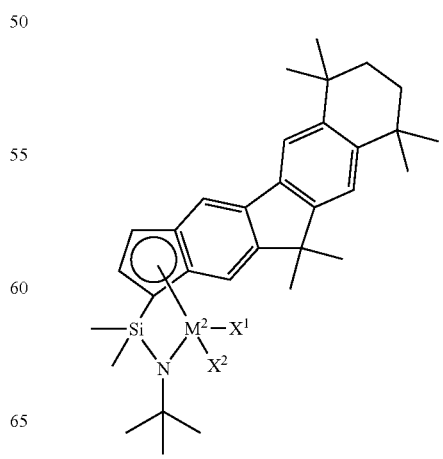

33
-continued
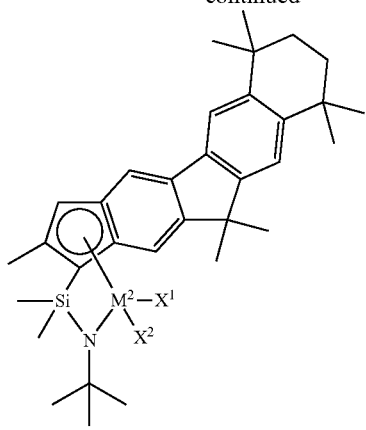
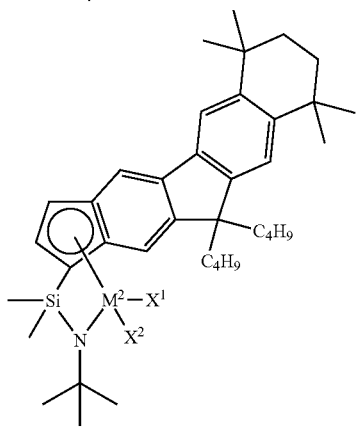
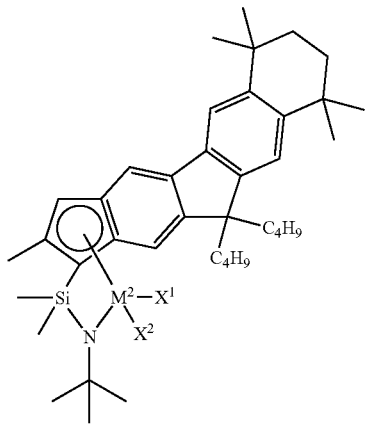
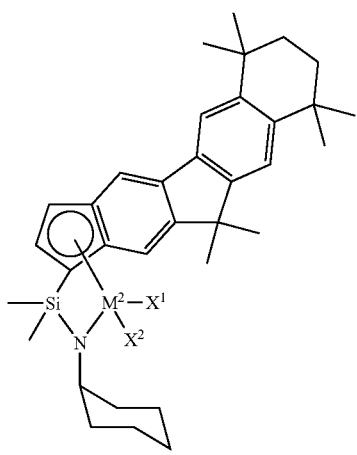
34
-continued
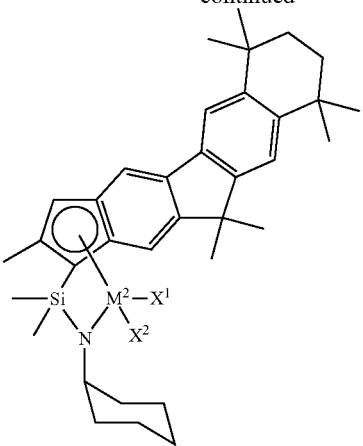
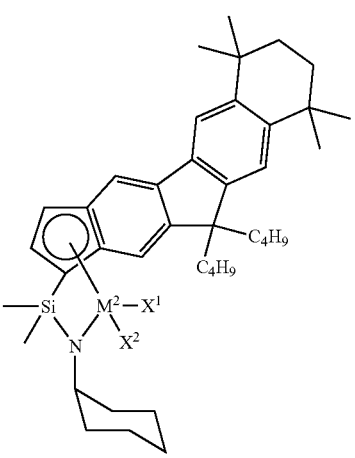
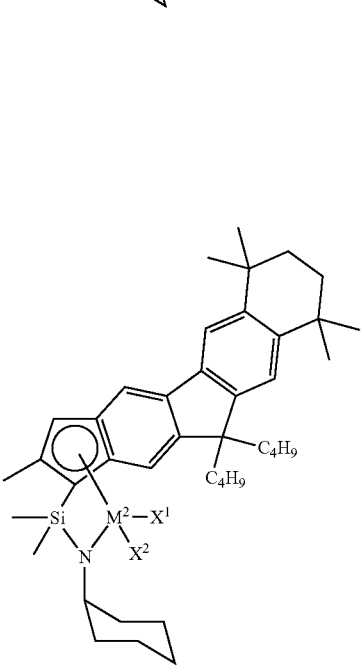

35
-continued
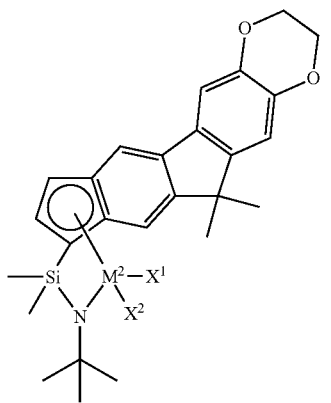
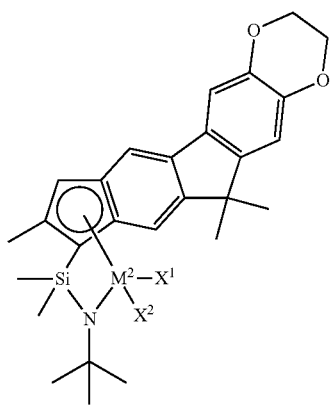
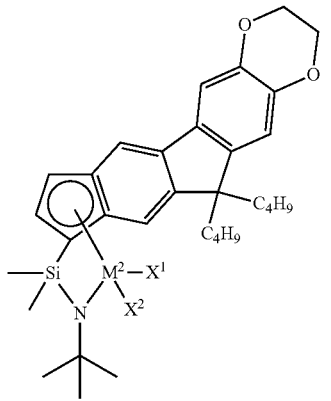
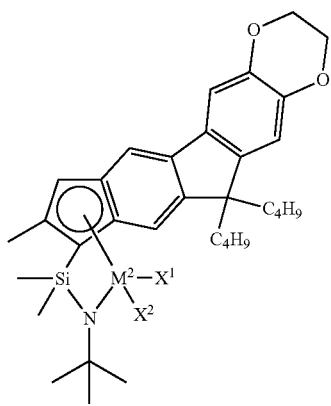
36
-continued
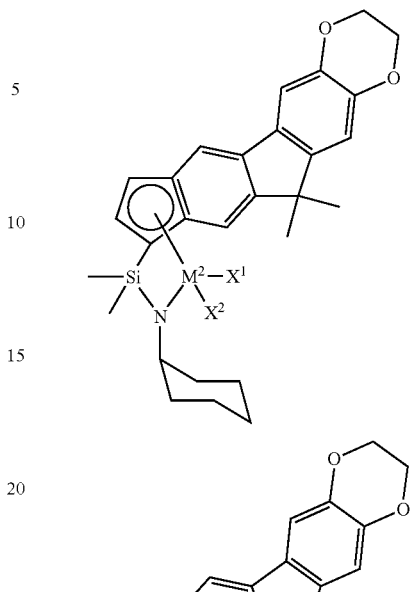
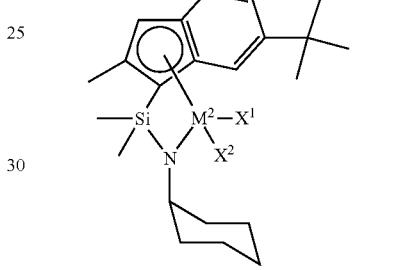
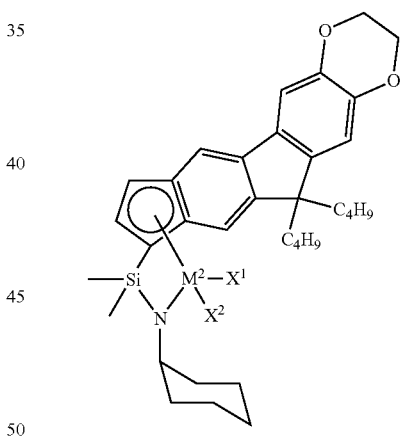
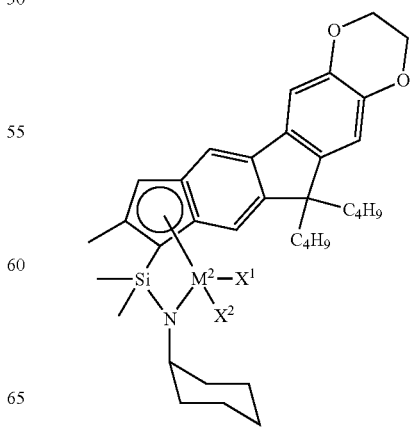

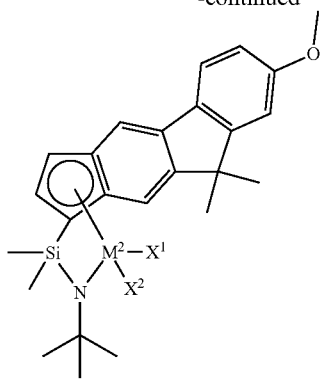
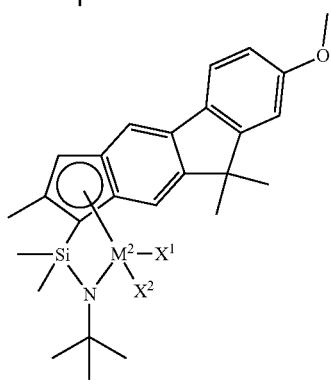
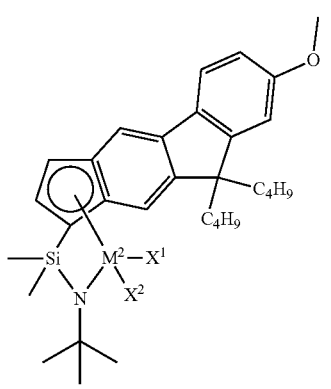
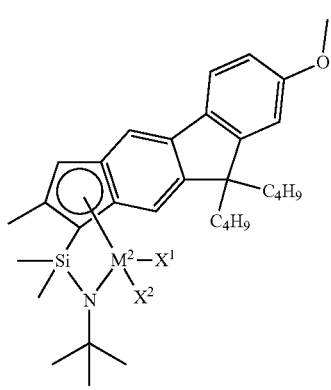
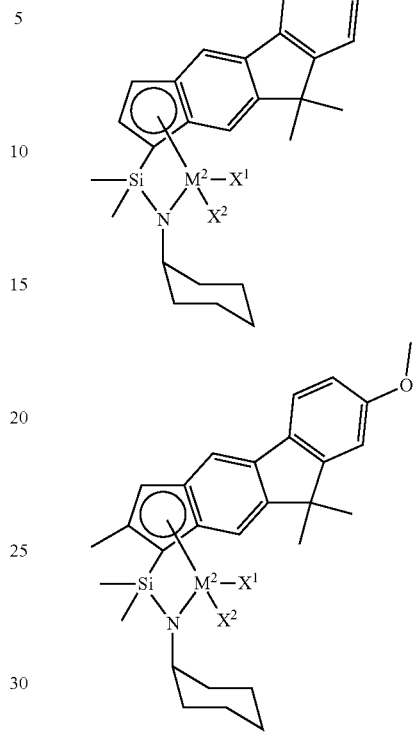
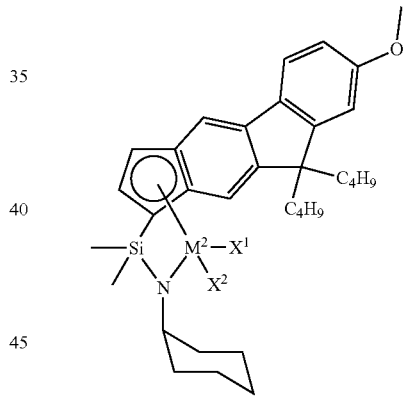
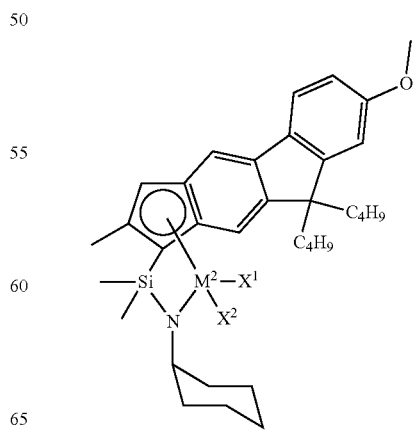

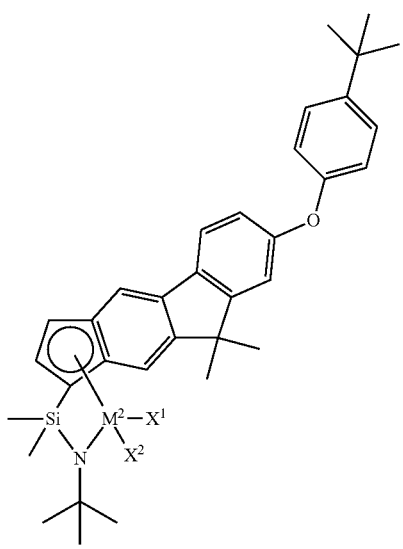
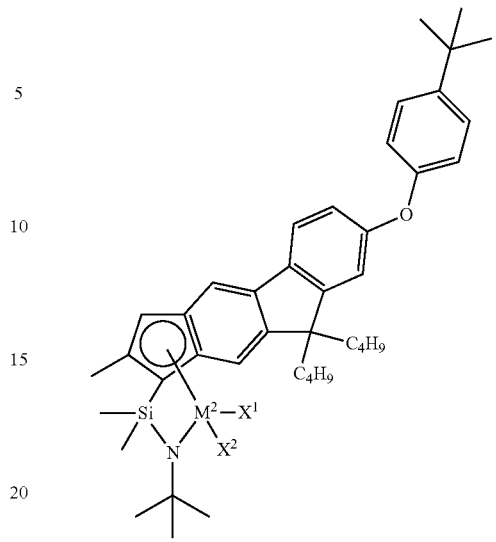
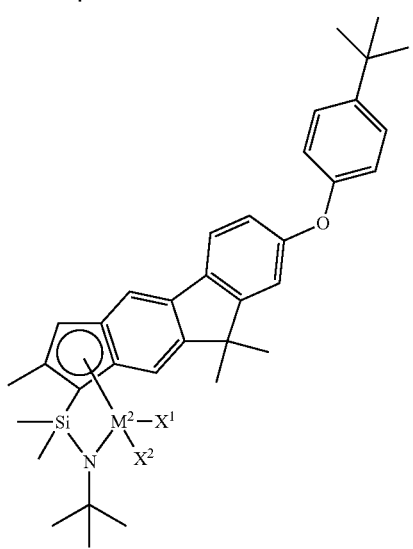
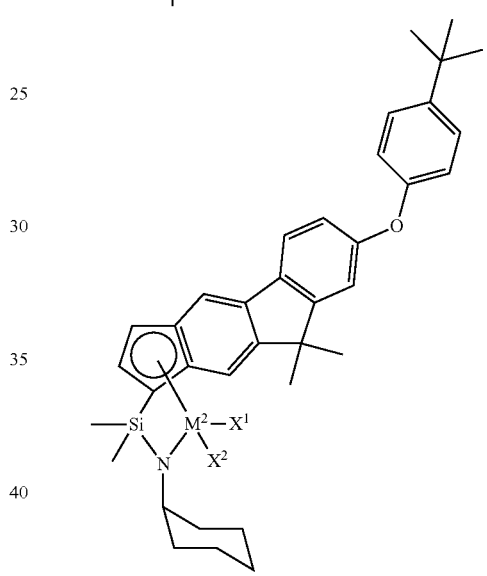
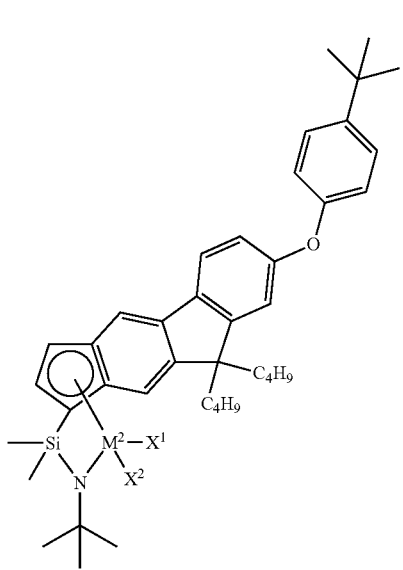
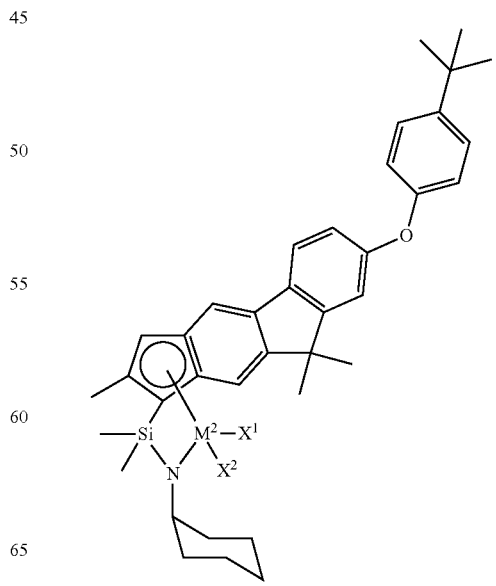

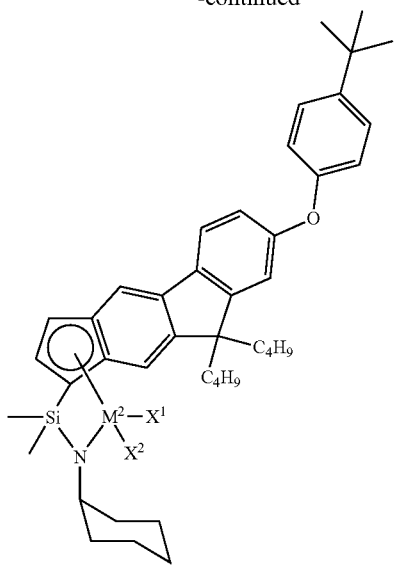
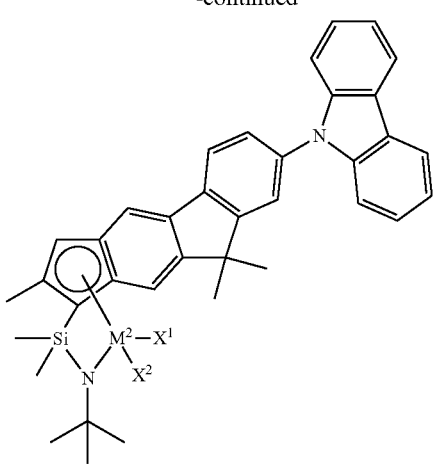
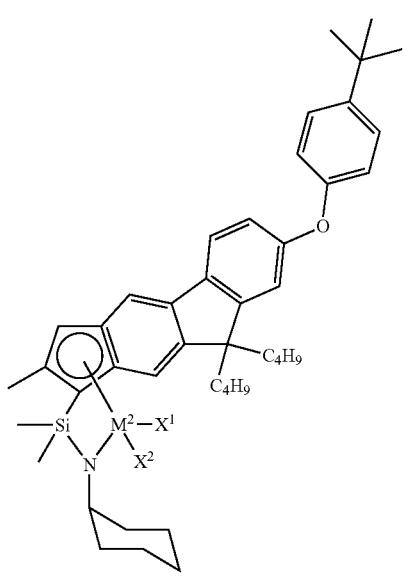
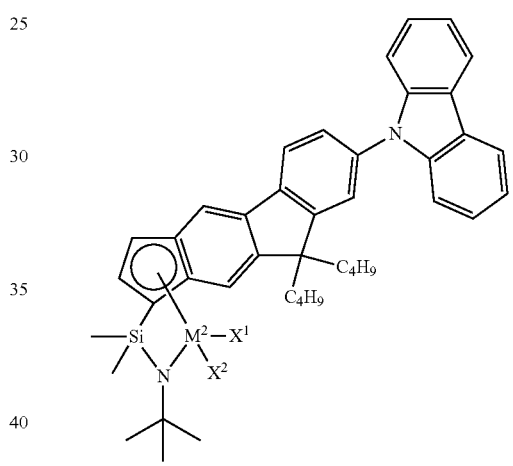
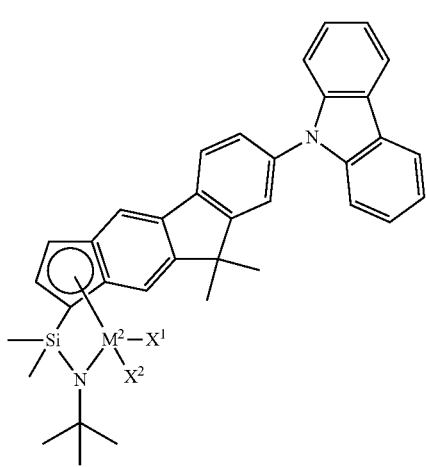
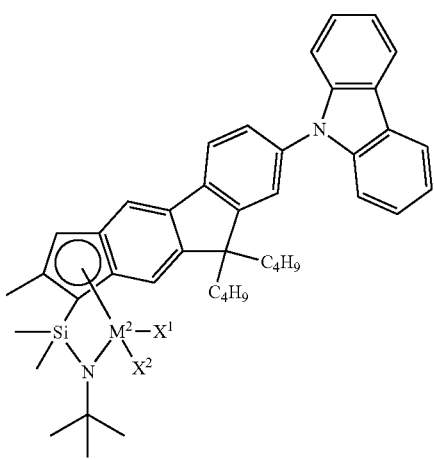

-continued
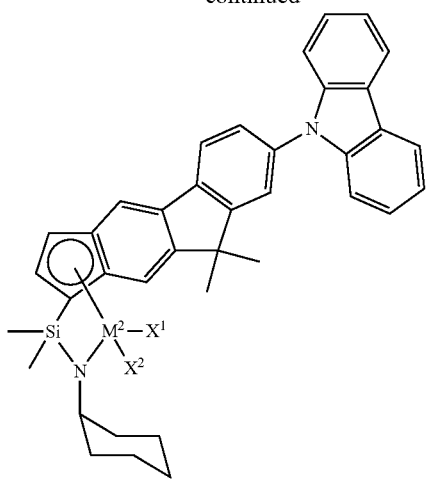
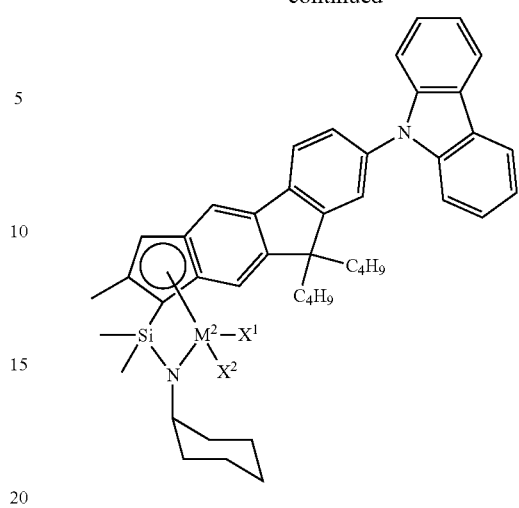
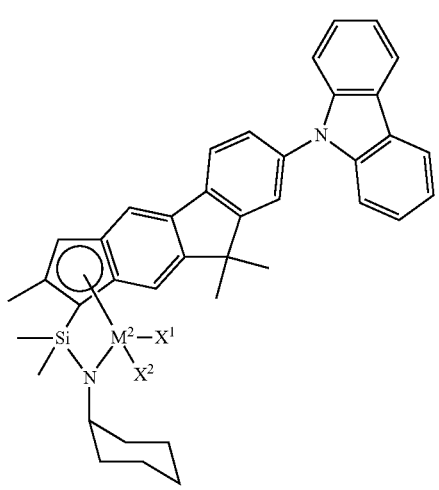
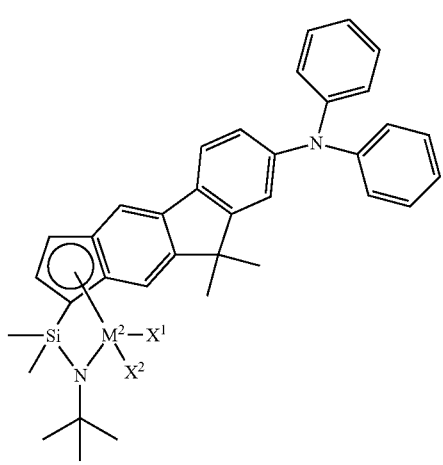
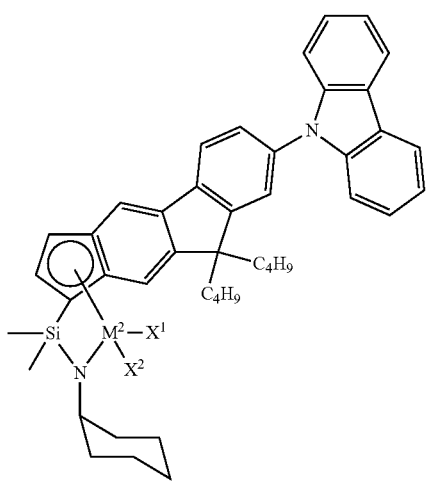
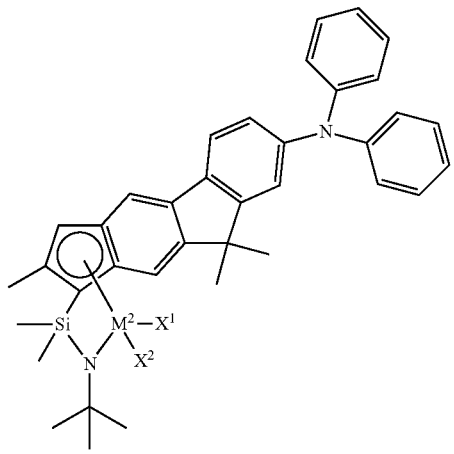

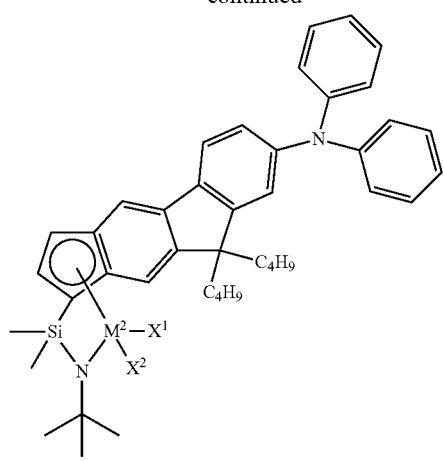
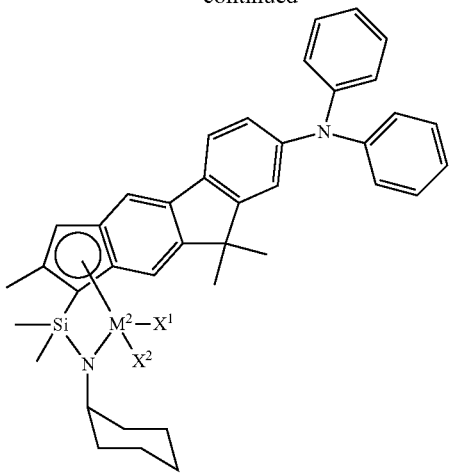
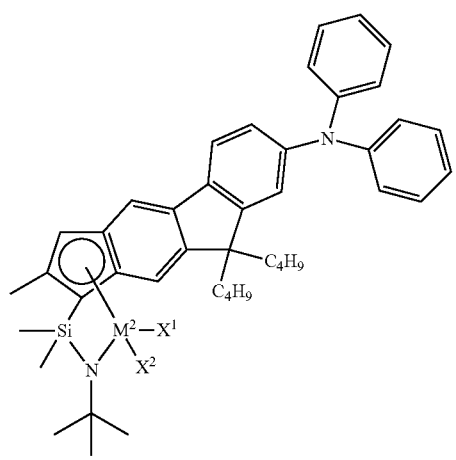
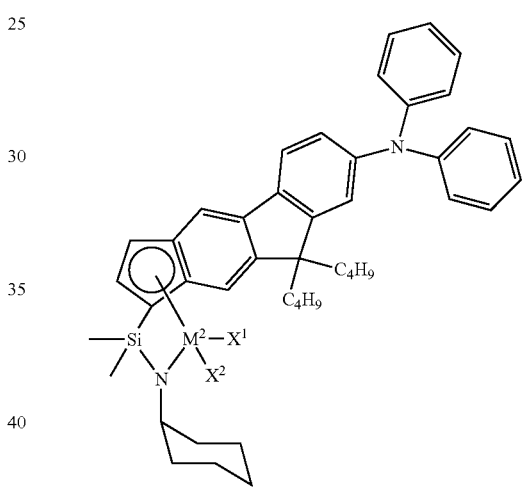
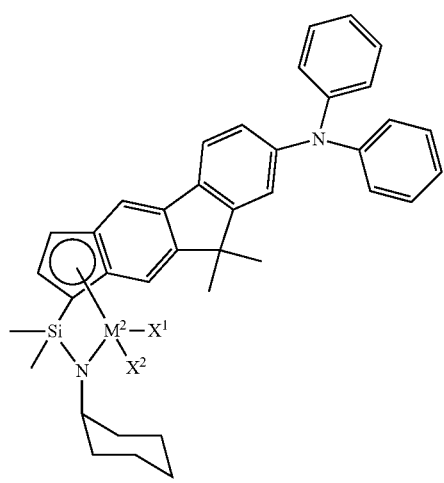
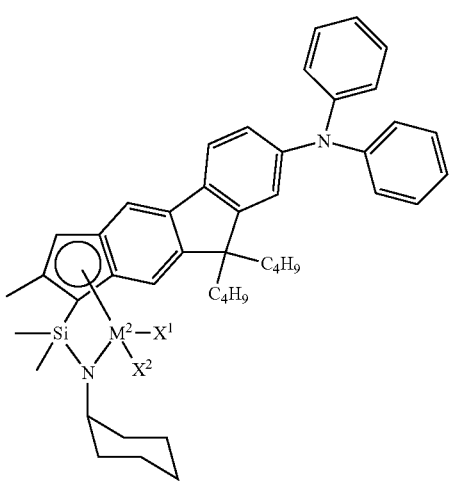

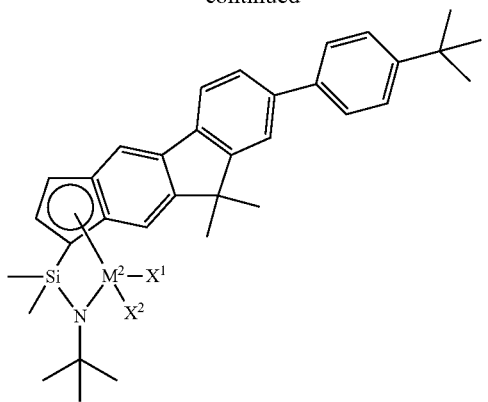
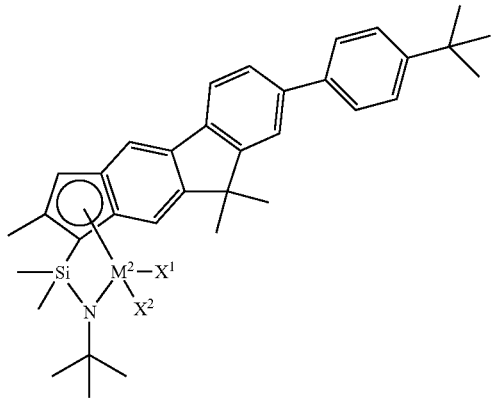
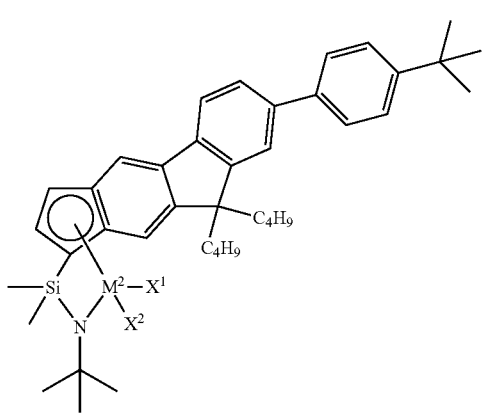
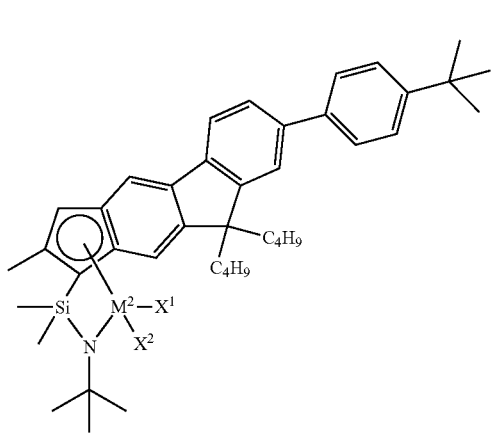
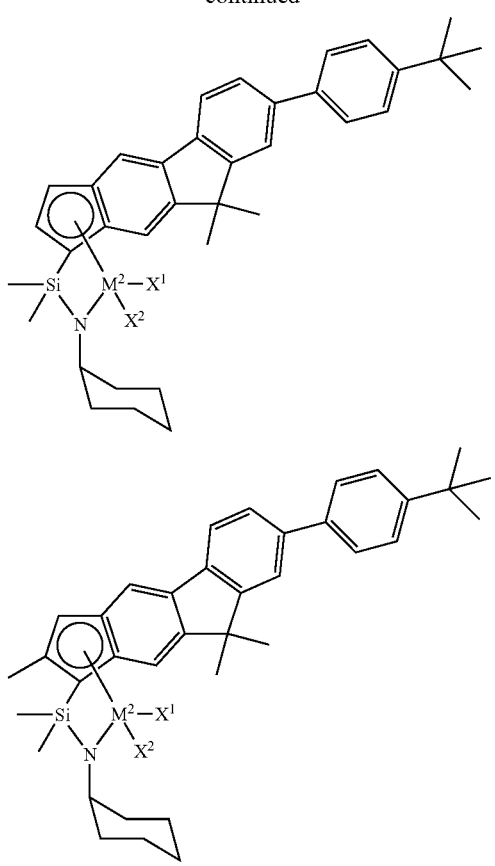
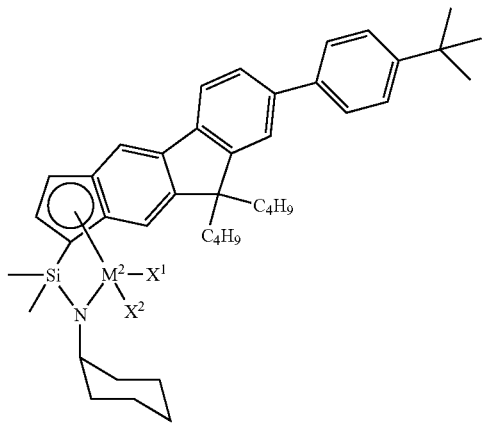
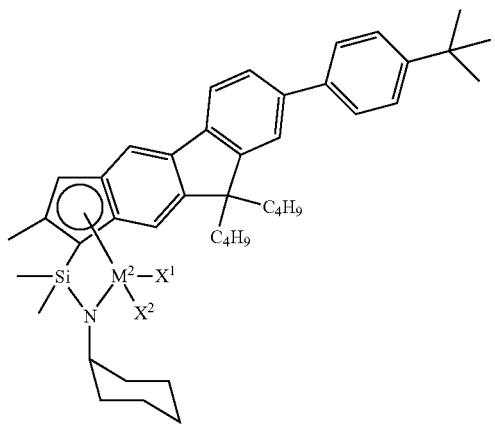

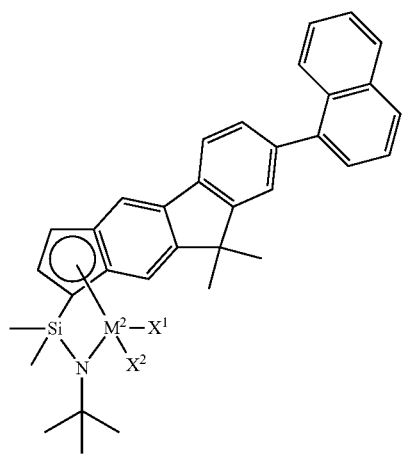
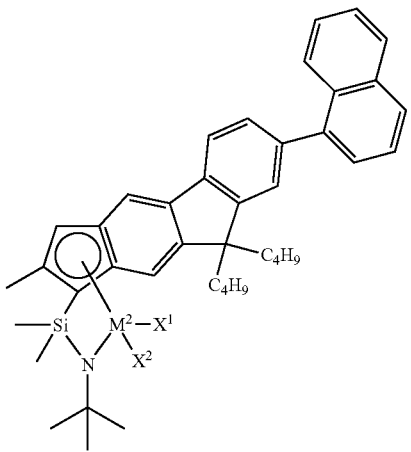
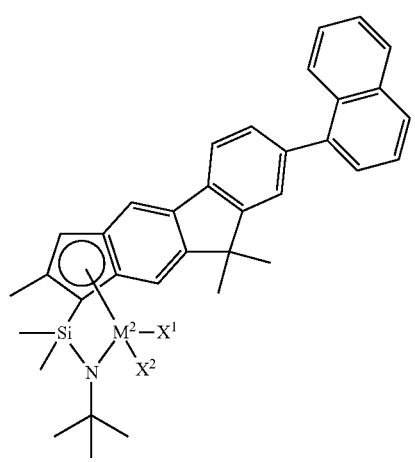
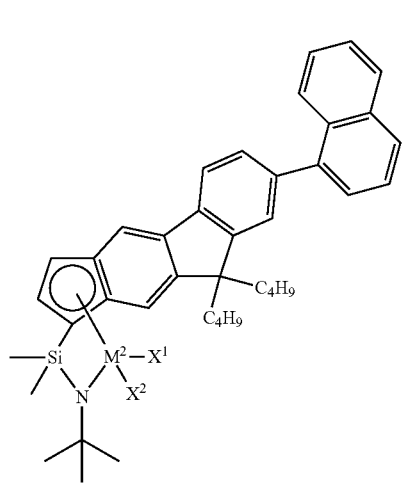
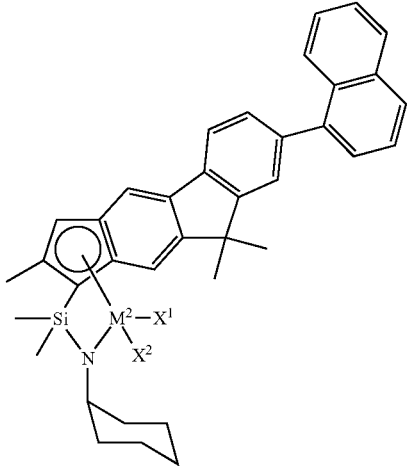

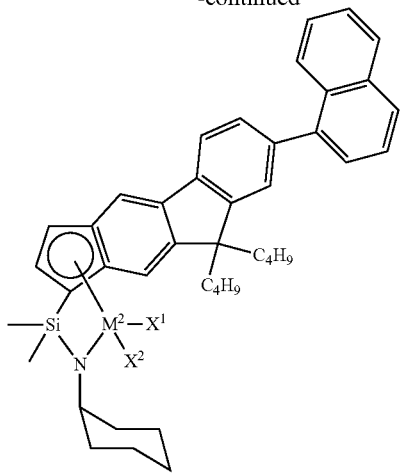

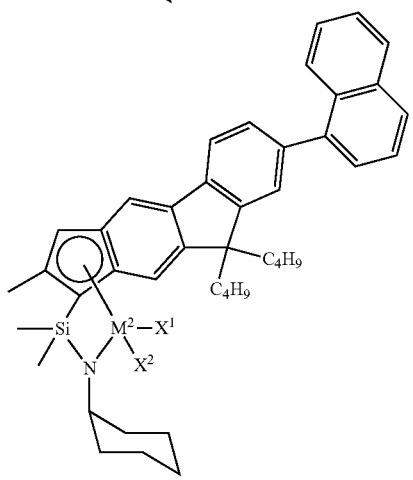

[$M^2$ is Ti, Zr, or Hf; and $X^1$ and $X^2$ each have the same definition as defined in Chemical Formula 3.]

Specific examples of the first metallocene compound of Chemical Formula 2 include bis(cyclopentadienyl)zirconium dichloride, bis(methylcyclopentadienyl)zirconium dichloride, bis(normalbutylcyclopentadienyl)zirconium dichloride, bis(cyclopentylcyclopentadienyl)zirconium dichloride, bis(cyclohexylcyclopentadienyl)zirconium dichloride, bis(1,3-dimethylcyclopentadienyl)zirconium dichloride, bis(isobutylcyclopentadienyl)zirconium dichloride, bis(indenyl)zirconium dichloride, bis(fluorenyl)zirconium dichloride, bis(4,5,6,7-tetrahydro-1-indenyl)zirconium dichloride, ethylene-bis(indenyl)zirconium dichloride, ethylene-[bis(4,5,6,7-tetrahydro-1-indenyl)]zirconium dichloride, dimethylsilylbis(indenyl)zirconium dichloride, diphenylsilyl-bis(indenyl)zirconium dichloride, isopropyl(cyclopentadienyl)(fluorenyl)zirconium dichloride, dimethylsilyl(cyclopentadienyl)(fluorenyl)zirconium dichloride, diphenylsilyl(cyclopentadienyl)(fluorenyl)zirconium dichloride, (cyclopentylcyclopentadienyl)(cyclopentadienyl)zirconium dichloride, (1-methyl-3-cyclopentylcyclopentadienyl)(cyclopentadienyl)zirconium dichloride, (1-ethyl-3-cyclopentylcyclopentadienyl)(cyclopentadienyl)zirconium dichloride, (1-butyl-3-cyclopentylcyclopentadienyl)(cyclopentadienyl)zirconium dichloride, (cyclopentylcyclopentadienyl)(cyclomethylcyclopentadienyl)zirconium dichloride, (1-methyl-3-cyclopentylcyclopentadienyl)(pentamethylcyclopentadienyl)zirconium dichloride, (1-ethyl-3-cyclopentylcyclopentadienyl)(pentamethylcyclopentadienyl)zirconium dichloride, (1-butyl-3-cyclopentylcyclopentadienyl)(pentamethylcyclopentadienyl)zirconium dichloride, (cyclohexylcyclopentadienyl)(cyclopentadienyl)zirconium dichloride, (1-methyl-3-cyclohexylcyclopentadienyl)(pentamethylcyclopentadienyl)zirconium dichloride, (1-ethyl-3-cyclohexylcyclopentadienyl)(pentamethylcyclopentadienyl)zirconium dichloride, (1-butyl-3-cyclohexylcyclopentadienyl)(pentamethylcyclopentadienyl)zirconium dichloride, (cyclohexylmethylenylcyclopentadienyl)(cyclopentadienyl)zirconium dichloride, (cycloheptylcyclopentadienyl)(cyclopentadienyl)zirconium dichloride, (1-methyl-3-cycloheptylcyclopentadienyl)(pentamethylcyclopentadienyl)zirconium dichloride, (1-ethyl-3-cycloheptylcyclopentadienyl)(pentamethylcyclopentadienyl)zirconium dichloride, (1-butyl-3-cycloheptylcyclopentadienyl)(pentamethylcyclopentadienyl)zirconium dichloride, (cyclohexylethylenylcyclopentadienyl)(cyclopentadienyl)zirconium dichloride, and the like.

The hybrid supported metallocene catalyst according to the present invention may further contain an alkylaluminoxane co-catalyst, an organic aluminum co-catalyst, a boron compound co-catalyst, or a mixture thereof.

The co-catalysts used in the present invention, that is, the co-catalyst treated on the surface of the carrier and the co-catalyst further contained in the hybrid supported metallocene catalyst may be the same as or different from each other. More specifically, the co-catalyst may include at least one kind selected from alkylaluminoxane compounds represented by the following Chemical Formula 6, organic aluminum compounds represented by the following Chemical Formula 7, and the boron compounds represented by the following Chemical Formulas 8 to 10.

$(-Al(R^{31})-O-)_a$     [Chemical Formula 6]

$(R^{32})_b Al(E)_{3-b}$     [Chemical Formula 7]

[In Chemical Formulas 6 and 7, $R^{31}$ and $R^{32}$ each are independently (C1-C20)alkyl; E is a hydrogen atom or halogen atom; a is an integer of 5 to 20; and b is an integer of 1 to 3.

$B(R^{41})_3$     [Chemical Formula 8]

$[R^{42}]^+[B(R^{41})_4]^-$     [Chemical Formula 9]

$[(R^{43})_q ZH]^+[B(R^{41})_4]^-$     [Chemical Formula 10]

[In Chemical Formulas 8 to 10, B is a boron atom; $R^{41}$ is phenyl, and phenyl may be further substituted with 3 to 5 substituents selected from a fluorine atom, (C1-C4)alkyl substituted or unsubstituted with a fluorine atom, or (C1-C4)alkoxy substituted or unsubstituted with a fluorine atom; $R^{42}$ is (C5-C7)cycloalkyl radical, (C6-C20)aryl radical, or (C1-C20)alkyl(C6-C20)aryl radical, (C6-C30)ar(C1-C20)alkyl radical, for example, triphenylmethylium radical; Z is a nitrogen atom or phosphorus atom; $R^{43}$ is ($C_1$-$C_4$)alkyl radical or anilinium radical substituted with two ($C_1$-$C_4$)alkyl together with a nitrogen atom; and q is an integer of 2 or 3.]

Examples of the alkylaluminum compound include trialkyl aluminum such as trimethylaluminum, triethylaluminum, tripropylaluminum, triisopropylaluminum, tributylaluminum, triisobutylaluminum, triisopentylaluminum, and the like; dialkylaluminum chloride such as dimethylaluminum chloride, diethylaluminum chloride, dipropylaluminum chloride, diisobutylaluminum chloride, and dihexylaluminum chloride; alkylaluminum dichloride such as methylaluminum dichloride, ethyllaluminum dichloride, propylaluminum chloride, isobutylaluminum chloride, and the like. Among them, trialkylaluminum chloride, triisobutylaluminum chloride may be preferable.

Preferable examples of the alkylaluminoxane co-catalyst include methylaluminoxane, ethylaluminoxane, propylaluminoxane, butylaluminoxane, isobutylaluminoxane, or the like; preferable examples of the organic aluminum co-catalyst include trimethylaluminum, triethylaluminum, tripropylaluminum, triisopropylaluminum, tributylaluminum, triisobutylaluminum, triisopentylaluminum, dimethylaluminum chloride, diethylaluminum chloride, dipropylaluminum chloride, diisobutylaluminum chloride, dihexylaluminum chloride, methylaluminum dichloride, ethylaluminum dichloride, propylaluminum chloride, isobutylaluminum chloride, or the like; and preferable examples of the boron compound co-catalyst include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate, tetrakis(3,5-bistrifluoromethylphenyl)borate, N,N-dimethylanilinium tetrakis(pentafluorophenyl)borate, triphenylmethylium tetrakis(pentafluorophenyl)borate, or the like.

The present invention relates to a method for preparing a hybrid supported metallocene catalyst including 1) treating a carrier with an ionic compound and a co-catalyst; and 2) simultaneously supporting a hybrid of first and second metallocene compounds on the carrier surface-treated with the ionic compound and the co-catalyst in step 1) to prepare a hybrid supported metallocene catalyst.

Hereinafter, the method for preparing a hybrid supported metallocene catalyst according to the present invention will be described.

In order to adjust a content of hydroxyl group in a surface of an inorganic carrier used for supporting such as silica, or the like, so as to satisfy a supporting object, inert gas such as nitrogen or argon flows at 100 to 900° C. or treatment is performed in vacuum. In this case, the content of residual hydroxyl groups in the surface may be 0.001 to 100 mmol OH/g silica, preferably, 0.1 to 5 mmol OH/g silica. The condition as described above is a condition of the carrier before the surface thereof is functionalized with the ionic compound. A required amount of the ionic compound is injected into a flask charged with the prepared silica as the carrier, and an organic solvent may be injected together with the ionic compound at the time of injection. The amount of injected ionic compound may be similar to or more than that of OH group on a surface of the silica.

The silica and the ionic compound are sufficiently mixed with each other at a temperature of a melting point of the ionic compound or more for 1 hour under nitrogen atmosphere, such that the ionic compound sufficiently contacts the surface of the silica and the hydroxyl group of the surface. Then, a co-catalyst, preferable, methylaluminoxane (MAO) is diluted in an organic solvent such as toluene and injected into the flask charged with the silica pre-treated with the ionic compound, followed by sufficient mixing at a suitable temperature for a suitable time under nitrogen atmosphere. Next, a hybrid metallocene compound is dissolved in an organic solvent together with a co-catalyst at a suitable temperature and then, injected into the silica surface-treated with the ionic compound and the co-catalyst, followed by stirring for a suitable time under nitrogen atmosphere, thereby supporting the hybrid metallocene on the silica. In this case, a ratio of the transition metal M to the aluminum atom may be based on a molar ratio of 1:0.1 to 1:3000, preferably, 1:1 to 1:500, by mole. Thereafter, in order to remove metallocene that is not supported and the co-catalyst, the mixture was washed three times or more using an organic solvent such as hexane, or the like and dried using vacuum, nitrogen gas, or the like, thereby finally obtaining the hybrid supported metallocene catalyst supported on the carrier surface-treated with the ionic compound and the co-catalyst.

A content of the transition metal in the hybrid supported metallocene catalyst prepared as the above-mentioned method may be 0.05 to 1.5 weight %.

Homopolymerization using one kind of olefin monomer or multiple polymerization using at least two kinds of monomers may be performed using the hybrid supported metallocene catalyst supported on the inorganic or organic porous carrier treated with the ionic compound and the co-catalyst obtained as described above. In this case, a polymerization reaction of the olefin monomer is performed in a slurry phase or gas phase of an organic solvent such as hexane, or the like. The hybrid supported metallocene catalyst according to the present invention is dispersed in a reaction solvent in a condition in which moisture is not present to thereby be used, wherein as the polymerization reaction solvent, aliphatic hydrocarbons or a mixture thereof may be generally used. For example, propane, isobutane, isopentane, hexane, heptane, octane, or the like, may be used.

The hybrid supported metallocene catalyst according to the present invention may be applied to all of the batch and continuous polymerization process as well as the gas phase, slurry, and liquid phase polymerization processes, but may be most preferably applied to the slurry or gas phase polymerization reaction.

As an example of a method for polymerizing polyolefin using the hybrid supported metallocene catalyst according to the present invention, a batch slurry polymerization process will be described below.

First, after moisture and air is removed by vacuum in a high pressure reactor at a high temperature, a solvent is injected into the reactor and the temperature is raised up to a polymerization temperature. Then, alkylaluminum or MAO is injected thereinto as a scavenger, and the hybrid supported metallocene catalyst according to the present invention is injected thereto. Next, olefin such as ethylene, or the like, is injected, and hydrogen is injected together with olefin as needed. When the required polymerization time is consumed, injection of olefin is stopped, and unreacted olefin and the solvent are removed, and the reactor is opened, thereby obtaining a polymer in a solid state.

The polymerization solvent is used after the moisture, oxygen, and other catalyst poison materials are sufficiently removed by allowing the solvent to pass through the solvent through a tube filled with molecular sieve 5 Å and active alumina and bubbling the solvent with high purity nitrogen, and the polymerization temperature may be −50 to 200° C., preferably 50 to 100° C. Polymerization pressure may be 1 to 50 atm, preferably, 5 to 30 atm.

The present invention provides a process of preparing an olefin polymer using the hybrid supported metallocene catalyst, wherein the olefin polymer includes a homopolymer or copolymer of α-olefin.

As examples of olefin based monomer that may be used in the method for preparing an olefin polymer according to the present invention, there are ethylene, α-olefin, cyclo olefin, and the like, and diene based monomer, triene based, styrene based, and cyclic olefin may be used.

The example of the monomer includes ethylene, propylene, 1-butene, 1-pentene, 1-hexene, 1-octene, 1-decene, 1-dodecene, 1-tetradecene, 1-hexadecene, 1-octadecene, 1-eicocene, 4-methyl-1-pentene, 3-methyl-1-pentene and 3-methyl-1-butene, styrene, a-methylstyrene, allylbenzene, divinylbenzene, vinylcyclohexane, vinylcycloheptane, cyclopentene, cycloheptene, norbornene, tetracyclododecene, isoprene, 1,3-butadiene, 1,4-pentadiene, 1,4-hexadiene, cyclopentadiene, and the monomer may be polymerized alone or a mixture of at least two kinds thereof may be polymerized.

Hereinafter, the present invention will be described through Comparative Examples and Examples, but is not limited thereto.

Analysis of the hybrid supported metallocene catalyst and the polymer according to the present invention was carried out by the method as follows.

1) Metal Content in Supported Catalyst

The metal content was measured by inductively coupled plasma (ICP) spectroscopy.

2) Melt Index

The melt index was measured according to ASTM D2839.

3) Melting Point Analysis

The melting point was measured under the condition of $2^{nd}$ heating at a speed of 20° C./min under nitrogen atmosphere by using Dupont DSC2910.

4) Molecular Weight and Molecular Weight Distribution

The molecular weight was measured at a speed of 1 ml/min and a temperature of 160° C. by using PL GPC210 (Product made by Polymer Laboratories Company) equipped with Column TSK Guard Column HHR(S)+TSK-Gel GMHHR H(S) made by TOHO Company. 1,2,3-trichlorobenzene was used as the solvent, and the molecular weight was calibrated with standard sample PS1_A,B (Mw=580 to 7,500,000).

Preparation Example 1

Preparation of Second Metallocene Compound

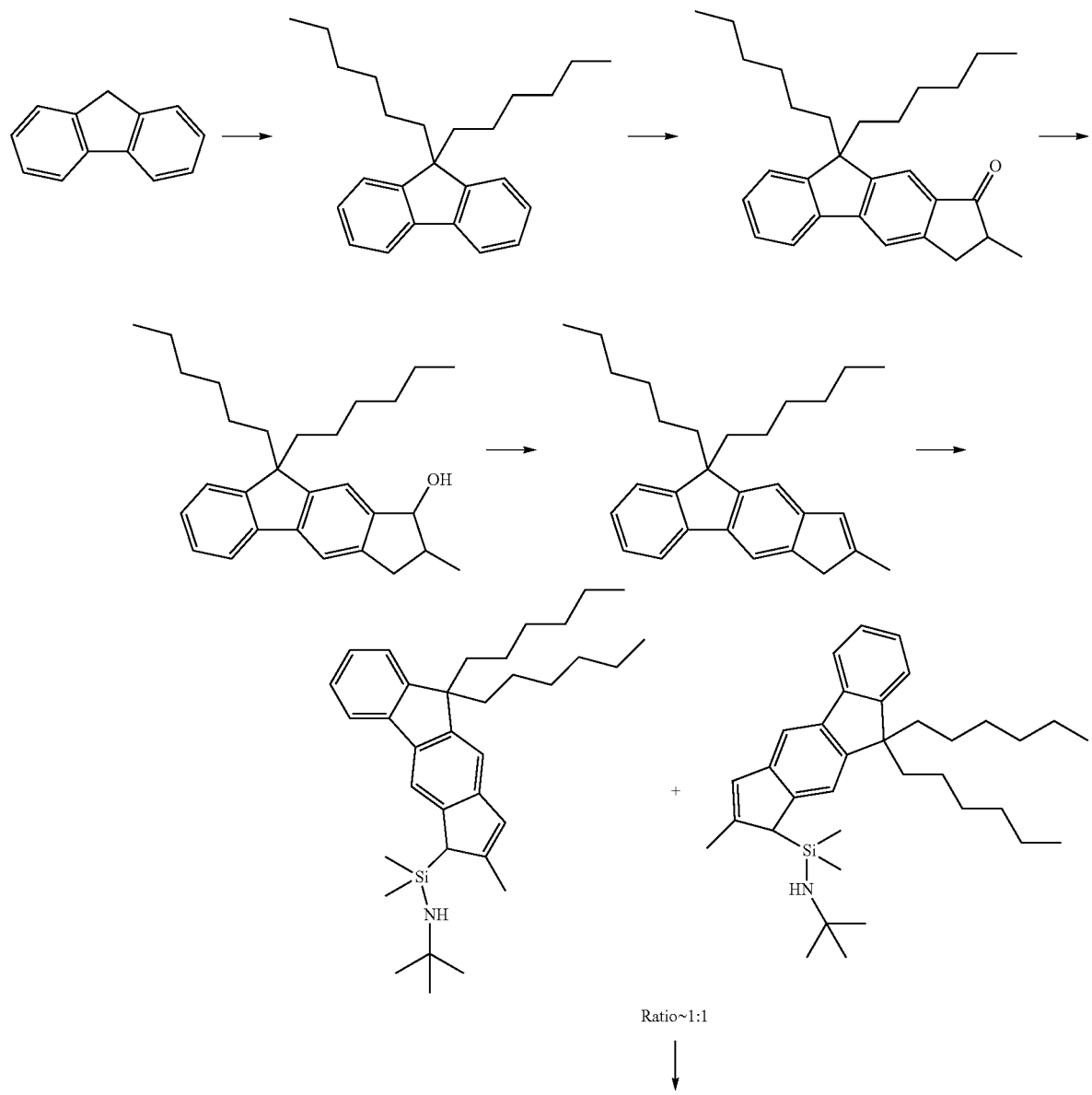

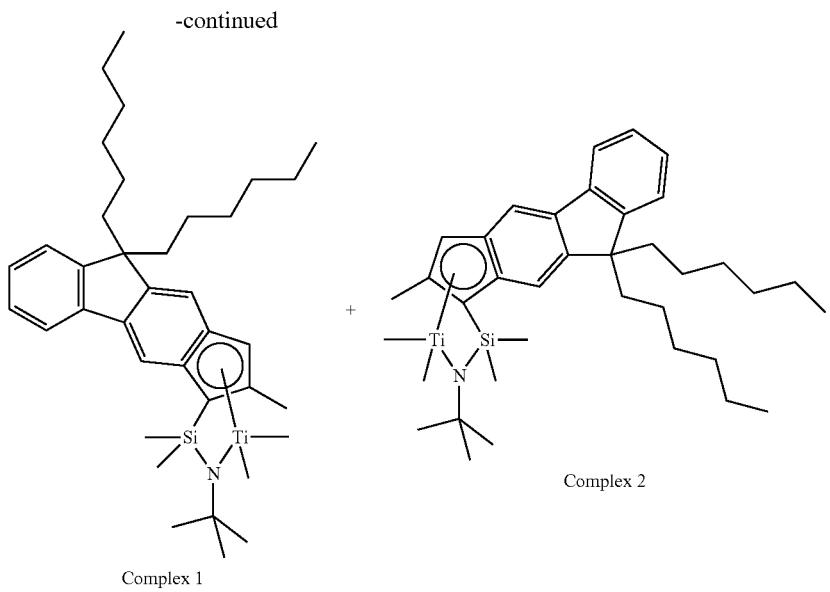

Complex 1

Complex 2

Preparation of 9,9-dihexyl-9H-fluorene

A 2000 mL round flask was charged with 9H-fluorene (50 g, 300.1 mmol) and potassium t-butoxide (77.0 g, 721.9 mmol), and then 700 mL of DMSO was slowly injected thereinto. 1-Bromohexane (119 g, 721.9 mmol) was slowly added thereto from a dropping funnel under nitrogen atmosphere. The mixture was stirred at room temperature for 24 hours, and the reaction was terminated by adding 500 mL of distilled water. The organic layer extracted with n-hexane was collected and dried over magnesium sulfate, followed by removal of volatile materials, and then purified with n-hexane by using silica gel column chromatography, followed by drying and long-time storage at room temperature, thereby obtaining 90.0 g of 9,9-dihexyl-9H-fluorene (yield: 72.40%) as solid.

$^1$H-NMR (500 MHz, CDCl$_3$, ppm): δ=0.625-0.628 (m, 4H), 0.759-0.785 (m, 6H), 1.050-1.125 (m, 12H), 1.953-1.983 (t, 4H), 7.293-7.340 (m, 6H), 7.706-7.720 (d, 2H)

Preparation of 9,9-dihexyl-2-methyl-2,3-dihydrocyclopenta[b]fluoren-1(9H)-one 9,9-dihexyl-9H-fluorene (79 g, 236.2 mmol) and 2-bromo-2-methylpropanoyl bromide (54.3 g, 236.2 mmol) were injected into a 2000 mL round flask and then dissolved by adding 600 mL of carbon disulfide inputted thereto. Then, the reactor was cooled with ice water. Aluminum trichloride (78.7 g, 590.4 mmol) was slowly added thereto in ten lots over 2 hours under nitrogen atmosphere. Then, after the mixture was stirred at room temperature for 8 hours, the reaction was terminated by adding of 500 mL of distilled water, followed by washing with 500 mL of distilled water three times. The organic layer was dried over magnesium sulfate, followed by removal of volatile materials and drying, thereby obtaining 89.0 g of 9,9-dihexyl-2-methyl-2,3-dihydrocyclopenta[b]fluoren-1(9H)-one (yield: 93.6%) as highly viscous oil.

$^1$H-NMR (500 MHz, CDCl$_3$, ppm): δ=0.601-0.627 (m, 4H), 0.741-0.774 (m, 6H), 1.000-1.126 (m, 12H), 1.366-1.380 (d, 3H), 1.961-2.202 (m, 4H), 2.789-2.801 (m, 2H), 3.445-3.498 (m, 1H), 7.375-7.383 (m, 3H), 7.731 (s, 2H), 7.764-7.779 (d, 1H)

Preparation of 9,9-dihexyl-2-methyl-1,2,3,9-tetrahydrocyclopenta[b]fluoren-1-ol In a 1000 mL round flask, 9,9-dihexyl-2-methyl-2,3-dihydrocyclopenta[b]fluoren-1(9H)-one (85 g, 211.1 mmol) was dissolved in 400 mL of THF and 400 mL of ethanol and then stirred. Sodium borohydride (NaBH$_4$) (10 g, 265.0 mmol) was added to the reactant in five lots, and then stirred for 12 hours. After removal of the solvent, the resultant material was dissolved in ethylacetate, and then washed with water three times. The organic layer was dried over magnesium sulfate, followed by removal of volatile materials and drying, thereby obtaining 82.0 g of 9,9-dihexyl-2-methyl-1,2,3,9-tetrahydrocyclopenta[b]fluoren-1-ol (yield: 96.0%) (two isomers) as highly viscous oil.

$^1$H-NMR (500 MHz, CDCl$_3$, ppm): δ=0.628-0.631 (m, 8H), 0.762-0.788 (m, 12H), 1.109-1.136 (m, 24H), 1.198-1.212 (d, 3H), 1.314-1.327 (d, 3H), 1.522-1.535 (d, 1H), 1.830-1.846 (d, 1H), 1.956-1.963 (m, 8H), 2.323-2.352 (m, 1H), 2.525-2.572 (m, 1H), 2.628-2.655 (m, 1H), 2.733-2.779 (m, 1H), 3.011-3.057 (m, 1H), 3.164-3.210 (m, 1H), 4.783-4.812 (t, 1H), 5.052-5.077 (t, 1H), 7.289-7.380 (m, 8H), 7.525 (s, 1H), 7.558 (s, 1H), 7.672-7.685 (d, 2H)

Preparation of 9,9-dihexyl-2-methyl-3,9-dihydrocyclopenta[b]fluorene

In a 500 mL round flask, 9,9-dihexyl-2-methyl-1,2,3,9-tetrahydrocyclopenta[b]fluoren-1-ol (80 g, 197.7 mmol) and p-toluene sulfonic acid (0.2 g) were dissolved in 320 mL of toluene, and then water was completely removed under reflux with Dean-Stark. The resultant material was cooled to room temperature, and then an ammonium chloride aqueous solution (150 mL) and 200 mL of diethyl ether were injected thereto, followed by separation of the organic layer. The organic layer collected by extracting the residue with diethyl ether was dried over magnesium sulfate, followed by removal of volatile materials, and then purified by using silica gel column chromatography, thereby obtaining 74.0 g of 9,9-dihexyl-2-methyl-3,9-dihydrocyclopenta[b]fluorene (yield: 96.8%).

$^1$H-NMR (500 MHz, CDCl$_3$, ppm): δ=0.611-0.671 (m, 4H), 0.755-0.784 (m, 6H), 1.041-1.140 (m, 12H), 1.943-1.976 (m, 4H), 2.200 (s, 3H), 3.373 (s, 2H), 6.556 (s, 1H), 7.208-7.381 (m, 4H), 7.653-7.668 (d, 1H), 7.700 (s, 1H)

Preparation of N-tert-butyl-1-(9,9-dihexyl-2-methyl-3,9-dihydrocyclopenta[b]fluoren-3-yl)-1,1-dimethyl silanamine) and N-tert-butyl-1-(9,9-dihexyl-2-methyl-1,9-dihydrocyclopenta[b]fluoren-1-yl)-1,1-dimethyl silanamine In a 500 mL round flask, 9,9-dihexyl-2-methyl-3,9-dihydrocyclopenta[b]fluorene (40.0 g, 103.5 mmol) was dissolved in 320 mL of diethyl ether, and then the temperature was lowered to −78° C. Then, n-butyllithium (2.5 M hexane solution, 42 mL) was slowly injected thereinto, followed by stirring at room temperature for 12 hours. After volatile materials were removed by vacuum, 350 mL of n-hexane was added to the mixture to lower the reactor temperature to −78° C., followed by addition of dichlorodimethylsilane (40 g). The temperature was again raised to room temperature, followed by stirring for 24 hours, and then salts were removed through filtering. Then, volatile materials were removed by vacuum. The product was again inputted to a 500 mL round flask and dissolved in 320 mL of diethyl ether. The temperature was lowered to −78° C., and tert-butylamine (22.7 g, 310.4 mmol) was added thereto. The temperature was raised to room temperature, followed by stirring for 12 hours, and then volatile materials were completely removed by vacuum. Then, 200 mL of n-hexane was added to dissolve the resultant material, and salts were removed through filtering. The solvent was removed, thereby obtaining 48 g of a mixture of N-tert-butyl-1-(9,9-dihexyl-2-methyl-3,9-dihydrocylopenta[b]fluoren-3-yl)-1,1-dimethylsilanamine and N-tert-butyl-1-(9,9-dihexyl-2-methyl-1,9-dihydrocylopenta[b]fluoren-1-yl)-1,1-dimethylsilanamine (ratio=~1:1), (yield: 88.9%), as a highly viscous material.

$^1$H-NMR (500 MHz, C$_6$D$_6$, ppm): δ=0.132 (s, 3H), 0.177-0.198 (d, 6H), 0.270 (s, 1H), 0.804-0.879 (m, 12H), 0.973-1.295 (m, 50H), 2.170-2.348 (m, 14H), 3.398-3.428 (d, 2H), 6.745 (s, 2H), 7.337-7.434 (m, 6H), 7.518-7.908 (m, 6H)

Preparation of (t-butylamido)dimethyl(9,9-dihexyl-2-methyl-3,9-dihydrocyclopenta[b]fluoren-3-yl)silanetitanium(IV)dimethyl (Complex 1) and (t-butylamido)dimethyl(9,9-dihexyl-2-methyl-1,9-dihydrocylopenta[b]fluoren-1-yl)silanetitanium(IV) dimethyl (Complex 2)

In a 250 mL round flask, a mixture (8.64 g, 16.75 mmol) of N-tert-butyl-1-(9,9-dihexyl-2-methyl-3,9-dihydrocylopenta[b]fluoren-3-yl)-1,1-dimethylsilanamine and N-tert-butyl-1-(9,9-dihexyl-2-methyl-1,9-dihydrocylopenta[b]fluoren-1-yl)-1,1-dimethylsilanamine (ratio=~1:1) was dissolved in 130 mL of diethyl ether, and then the temperature was lowered to −78° C. Then, methyllithium (1.5 M diethyl ether solution, 49.4 mL) was slowly injected thereinto. The temperature was raised to room temperature, followed by stirring for 12 hours, to thereby prepare lithium salt. In addition, in a dry box, TiCl$_4$ (16.75 mmol) and 150 mL of anhydrous n-hexane were inputted to a 500 mL round flask, and then the temperature was lowered to −78° C. Then, the lithium salt prepared in advance was slowly added thereto. The temperature was again raised to room temperature, followed by stirring for 4 hours, and the solvent was removed by vacuum. The resultant material was dissolved in n-hexane, and then the filtrate was extracted through filtering. Again, the solvent was removed by vacuum, thereby obtaining 8.1 g of a mixture of Complex 1 and Complex 2 (ratio of approximately 1:1), as a solid.

$^1$H-NMR (500 MHz, C$_6$D$_6$, ppm): δ=0.079-0.091 (d, 6H), 0.623-0.645 (d, 6H), 0.813-1.336 (m, 56H), 1.601-1.619 (d, 18H), 2.071-2.514 (m, 14H), 7.025-7.035 (d, 2H), 7.330-8.099 (m, 12H)

Comparative Preparation Example 1

Preparation of Second Metallocene Compound: (t-butylamido)dimethyl(tetramethylcyclopentadienyl)silanetitanium(IV) dimethyl

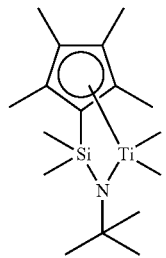

A (t-butylamido)dimethyl(tetramethylcyclopentadienyl)silanetitanium(IV) dimethyl compound was prepared by dissolving (t-butylamido)dimethyl(tetramethylcyclopentadienyl)silanetitanium(IV) dichloride purchased from Boulder Scientific Company (US) in diethylether to lower the temperature to −78° C., and then reacting the resultant material with 2 equivalent of methyllithium.

Example 1

1. Preparation of Hybrid Supported Metallocene Catalyst on Silica Surface-Treated with Ionic Compound and Co-Catalyst 18.3 mg of an ionic compound 1,3,-bis(cyanomethyl)-imidazolium chloride (Fluka Co., 0.1 mmol) was injected into a round bottom flask charged with 1 g of silica H-122 (Japan, Asahi Glass Co., average particle size: 12, surface area: 700 m$^2$/g, average pore volume: 1.8 mL/g, average pore diameter 20 nm), and MAO (aluminum content: 7 weight %, Albemarle Corp., 50 mmol-Al) diluted in toluene was injected thereinto. The mixture was sufficiently stirred at 100° C. for 3 hours using a magnetic bar. After the temperature was lowered to 80° C., bis(n-butylcyclopentadienyl)zirconium dichloride ((n-BuCp)2ZrCl2, Boulder Scientific company, 64.7 mg, 0.16 mmol), which is a first metallocene catalyst, and (t-butylamido)dimethyl(9,9-dihexyl-2-methyl-3(1),9-dihydrocyclopenta[b]fluoren-3(1)-yl)silanetitanium(IV)dimethyl (Preparation Example 1, 142 mg, 0.24 mmol), which is a second metallocene catalyst were simultaneously injected thereinto and stirred at 70° C. for 3 hours, thereby supporting MAO and hybrid metallocene. After stopping the stirring, the resultant material was filtered to remove unreacted MAO and metallocene and dried by vacuum. 3.4 g of the hybrid supported metallocene catalyst was obtained.

2. Polymerization of Ethylene Slurry

After 1.9 L of hexane was injected into a 3 L high pressure reactor washed in vacuum at a high temperature, the temperature was raised to 70° C. Next, triethylaluminum (TEAL, 1 mmol-Al) was injected thereinto, and the above prepared hybrid supported metallocene catalyst (20 mg) was injected into hexane slurry in the reactor. Ethylene gas was injected while controlling the ethylene pressure so that the total pressure in the reactor becomes 8 atm to thereby be saturated, and then ethylene polymerization reaction was started by rotating a stirrer. The total polymerization time was 60 minutes and the temperature was maintained at 80° C. After the reaction was completed, the prepared polymer was washed with ethanol and dried by vacuum, thereby obtaining 137 g of the polymer.

Example 2

1. Preparation of Hybrid Supported Metallocene Catalyst on Silica Surface-Treated with Ionic Compound and Co-Catalyst A hybrid supported metallocene catalyst was prepared by the same process as the process of preparing the hybrid supported metallocene catalyst in 1 of [Example 1] except that (t-butylamido)dimethyl(2,9,9-trimethyl-3,9-dihydrocyclopenta[b]fluoren-3-yl)silanetitanium(IV)dimethyl (108.4 mg, 0.24 mmol) was used as the second metallocene compound, thereby obtaining 3.34 g of hybrid supported metallocene catalyst.

2. Polymerization of Ethylene Slurry

A polymerization reaction was performed by the same method as the ethylene slurry polymerization method in 2 of [Example 1] using the above prepared supported catalyst, thereby obtaining 133 g of the polymer.

Example 3

1. Preparation of Hybrid Supported Metallocene Catalyst on Silica Surface-Treated with Ionic Compound and Co-Catalyst A hybrid supported metallocene catalyst was prepared by the same process as the process of preparing the hybrid supported metallocene catalyst in 1 of [Example 1] except that (t-butylamido)dimethyl(1,2,9,9-tetramethyl-3,9-dihydrocyclopenta[b]fluoren-3-yl)silanetitanium(IV)dimethyl (111.7 mg, 0.24 mmol) was used as the second metallocene compound, thereby obtaining 3.34 g of hybrid supported metallocene catalyst.

2. Polymerization of Ethylene Slurry

A polymerization reaction was performed by the same method as the slurry polymerization method in 2 of [Example 1] using the above prepared supported catalyst, thereby obtaining 129 g of the polymer.

Comparative Example 1

1. Preparation of Hybrid Supported Metallocene Catalyst on Silica Surface-Treated with Ionic Compound and Co-Catalyst A hybrid supported metallocene catalyst was prepared by the same process as that the process of preparing the hybrid supported metallocene catalyst in 1 of [Example 1] except that (t-butylamido)dimethyl(tetramethylcyclopentadienyl)silanetitanium(IV)dimethyl (Comparative Preparation Example 1, 78.6 mg, 0.24 mmol) was used as the second metallocene compound, thereby obtaining 3.23 g of hybrid supported metallocene catalyst.

2. Polymerization of Ethylene Slurry

A polymerization reaction was performed by the same method as the slurry polymerization method in 2 of [Example 1] using the above prepared supported catalyst, thereby obtaining 95 g of the polymer.

TABLE 1

| | | Ionic compound[1] | | MAO (7 wt. %) | | | metallocene | | | | | |
| | | | | | | | First metallocene | | Second metallocene | | | |
| | carrier (g) | Injection amount (mmol) | Injection amount (mmol) | Treatement temperature (° C.) | Treatment time (hr) | Kind | Injection amount (mmol) | Kind | Injection amount (mmol) | Treatment temperature (° C.) | Treatment time(hr) |
|---|---|---|---|---|---|---|---|---|---|---|---|
| Example 1 | 1 | 0.1 | 35.8 | 100 | 3 | A[2] | 0.16 | B[3] | 0.24 | 80 | 3 |
| Example 2 | 1 | 0.1 | 35.8 | 100 | 3 | A | 0.16 | C[4] | 0.24 | 80 | 3 |
| Example 3 | 1 | 0.1 | 35.8 | 100 | 3 | A | 0.16 | D[5] | 0.24 | 80 | 3 |
| Comparative Example 1 | 1 | 0.1 | 35.8 | 100 | 3 | A | 0.16 | E[6] | 0.24 | 80 | 3 |

[1] 1,3-bis(cyanomethyl)-imidazolium chloride

[2] A: bis(n-butylcyclopentadienyl)zirconium dichloride

[3] B: (t-butylamido) dimethyl (9,9-dihexyl-2-methyl-3(1),9-dihydrocyclopenta[b]flororen-3(1)-yl)silanetitanium(IV) dimethyl

[4] C: (t-butylamido)dimethyl(2,9,9-trimethyl-3,9-dihydrocyclopenta[b]fluoren-3-yl)silanetitanium(IV)dimethyl

[5] D: (t-butylamido)dimethyl(1,2,9,9-tetramethyl-3,9-dihydrocyclopenta[b]fluoren-3-yl)silanetitanium(IV)dimethyl

[6] E: (t-butylamido)dimethyl(tetramethylcyclopentadienyl)silane titanium(IV)dimethyl

TABLE 2

| | Co-catalyst in polymerization | solvent | Amount of catalyst (mg) | PE yield (g) | Activity | MI | GPCM WD | DSC (° C.) | BulkDensity |
|---|---|---|---|---|---|---|---|---|---|
| Example 1 | TEAL | n-hexane | 20 | 137 | 7.0 | 0.58 | 2.36 | 123.87 | 0.33 |
| Example 2 | TEAL | n-hexane | 20 | 133 | 6.7 | 0.77 | 2.14 | 124.47 | 0.35 |
| Example 3 | TEAL | n-hexane | 20 | 129 | 6.5 | 0.75 | 2.56 | 124.04 | 0.35 |
| Comparative Example 1 | TEAL | n-hexane | 20 | 95 | 4.8 | 0.52 | 2.37 | 125.04 | 0.33 |

\* Activity: kg-PE/g-cat., 1 hr, 8 bar
\* M.I: g/10 min.
\* Polymerization pressure and time: 8 bar, 60 min.
\* Bulk Density: g/cc

The invention claimed is:

1. A hybrid supported metallocene catalyst comprising a hybrid of a first metallocene compound represented by the following Chemical Formula 2 and a second metallocene compound represented by the following Chemical Formula 3, which hybrid is supported on a carrier surface-treated with an ionic compound represented by the following Chemical Formula 1 and a co-catalyst:

$$X^+Y^-$$ [Chemical Formula 1]

in Chemical Formula 1, $X^+$ is imidazolium ion, pyridinium ion, ammonium ion, phosphonium ion, sulfonium ion, pyrazolium ion, or pyrrolidium ion and substituted with (C1-C20)alkyl or (C6-C20)aryl substituted or unsubstituted with at least one functional group selected from —CN, —OH, —SO$_3$H, —COOH, amino, —SiR$_{11}$R$_{12}$R$_{13}$, (C1-C20)alkyl, and (C1-C20)alkoxy; $Y^-$ is BF$_4^-$, BCl$_4^-$, PF$_6^-$, AlCl$_4^-$, halogen$^-$, CH$_3$CO$_2^-$, CF$_3$CO$_2^-$, CH$_3$SO$_4^-$, CH$_3$CH$_2$SO$_4^-$, CF$_3$SO$_3^-$, N(CN)$_2^-$, HCO$_3^-$, (CF$_3$SO$_2$)N$^-$, SCN$^-$, NO$_3^-$, SbF$_6^-$, Sb$_2$F$_{11}^-$, MePhSO$_3^-$, (CF$_3$SO$_2$)$_2$N$^-$, (CF$_3$SO$_2$)$_3$C$^-$, (OR)$_2$PO$_2^-$, Bu$_2$PO$_2^-$, Et$_2$PO$_2^-$, or HSO$_4^-$; R$_{11}$ to R$_{13}$ each are independently (C1-C20)alkyl or (C6-C30)aryl; R is (C1-C20)alkyl;

$$Cp'L^1M^1L^2_m$$ [Chemical Formula 2]

in Chemical Formula 2,
M$^1$ is a Group 4 transition metal in the Periodic Table of Elements;
Cp' is a fused ring including cyclopentadienyl or cyclopentadienyl ring capable of being η$^5$-bonded to a central metal M$^1$;
L$^1$ is a fused ring containing cyclopentadiene or cyclopentadienyl ring, or an anion ligand including (C1-C20) hydrocarbon substituents and O, N, or P atoms;
L$^2$ is a halogen atom, (C1-C20)alkyl, (C6-C30)aryl(C1-C20)alkyl, (C3-C20)cycloalkyl, (C1-C20)alkoxy, (C6-C30)aryloxy, (C6-C30)aryl, —SiR$^a$R$^b$R$^c$, —NR$^d$R$^e$, —OSiR$^f$R$^g$R$^h$, or —PR$^i$R$^j$;
R$^a$ to R$^j$ each are independently (C1-C20)alkyl or (C6-C30)aryl;
m is an integer of 1 or 2; and
Cp' and L$^1$ are not connected to each other, or are connected via silicon or (C1-C4)alkenylene bond, the cyclopentadienyl ring or the fused ring containing the cyclopentadienyl ring of Cp' and L$^1$ are further substituted with at least one selected from a group consisting of (C1-C20) alkyl, (C3-C20)cycloalkyl, (C6-C30)aryl, (C2-C20)alkenyl, and (C6-C30)aryl(C1-C20)alkyl;

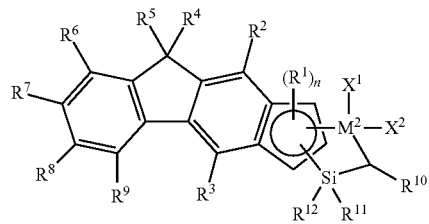

[Chemical Formula 3]

in Chemical Formula 3, M$^2$ is a Group 4 transition metal in the Periodic Table of Elements;
n is an integer of 1 or 2, and when n is 2, R$_1$(s) are the same as or different from each other;
R$_1$ is hydrogen, (C1-C20)alkyl, halo(C1-C20)alkyl, (C3-C20)cycloalkyl, (C1-C20)alkyl(C6-C30)aryl, (C6-C30) aryl, (C6-C30)ar(C1-C20)alkyl, ((C1-C20)alkyl(C6-C30)aryl)(C1-C20)alkyl, -NR$^k$R$^1$, -SiR$^m$R$^n$R$^o$, or 5- to 7-membered N-heterocycloalkyl containing at least one nitrogen atom;
R$_2$ and R$_3$ each are independently, hydrogen, (C1-C20) alkyl, (C1-C20)alkoxy, halo(C1-C20)alkyl, (C3-C20) cycloalkyl, (C1-C20)alkyl(C6-C30)aryl, (C6-C30)aryl, (C6-C30)aryloxy, (C1-C20)alkyl(C6-C30)aryloxy, (C6-C30)ar(C1-C20)alkyl, ((C1-C20)alkyl(C6-C30) aryl)(C1-C20)alkyl, -NR$^k$R$^1$, or -SiR$^m$R$^n$R$^o$;
R$_4$, R$_5$, R$_{10}$, R$_{11}$, and R$_{12}$ each are independently(C1-C20) alkyl, halo(C1-C20)alkyl, (C3-C20)cycloalkyl, (C1-C20)alkyl(C6-C30)aryl, (C6-C30)aryl, (C1-C20) alkoxy(C6-C30)aryl, (C6-C30)ar(C1-C20)alkyl, ((C1-C20)alkyl(C6-C30)aryl)(C1-C20)alkyl, -NR$^k$R$^1$, or -SiR$^m$R$^n$R$^o$;
R$_6$, R$_7$, R$_8$, and R$_9$ each are independently hydrogen, (C1-C20)alkyl, halo(C1-C20)alkyl, (C3-C20)cycloalkyl, (C1-C20)alkoxy, (C6-C30)aryl, (C1-C20)alkyl(C6-C30)aryl, (C6-C30)ar(C1-C20)alkyl, ((C1 -C20)alkyl (C6-C30)aryl)(C1-C20)alkyl, (C1-C20)alkoxy(C6-C30)aryl, (C6-C30)aryloxy, (C1-C20)alkyl(C6-C30) aryloxy, N-carbazolyl, -NR$^k$R$^1$, or -SiR$^m$R$^n$R$^o$ or linked to substituent adjacent thereto via (C1-C5)alkylene to form a ring, at least one CH$_2$- of alkylene may be substituted by a hetero atom selected from -O-, -S-, and NR'-, and alkylene may be further substituted with (C1-C20)alkyl;
R'and R$^k$ to R$^o$ each are independently (C1-C20)alkyl or (C6-C30)aryl; and $X_1$ and $X_2$ each are independently halogen, (C1-C20)alkyl, (C2-C20)alkenyl, (C3-C20)cycloalkyl, (C6-C30)aryl, (C6-C30)ar(C1-C20)alkyl, ((C1-C20)alkyl(C6-C30)aryl)(C1-C20)alkyl, (C1-C20)alkoxy, (C6-C30)aryloxy, (C1-C20)alkyl(C6-C30)aryloxy, (C1-C20)alkoxy(C6-C30)aryloxy or (C1-C20)alkylidene.

2. The hybrid supported metallocene compound of claim 1, wherein the ionic compound has a polarity in a liquid or solid phase in a temperature range of −100 to 300° C.

3. The hybrid supported metallocene compound of claim 2, wherein the ionic compound is at least one selected from a group consisting of 1,3-bis(cyanomethyl)-imidazolium chloride, 1-butyl-3-methylimidazoliumchloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogen carbonate, 1-butyl-3-methylimidazolium hydrogen sulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridinium chloride, 1-butyl-4-methylpyridinium tetrafluoroborate, 1-butyl-4-methylpyridinium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate, 1-butyl-1-methylpyrrolidium chloride, 1-butyl-1-methylpyrrolidium bromide, 1-butyl-1-methylpyrrolidium tetrafluoroborate, 1-mesityl-3-methylimidazolium bromide, 1-mesityl-3-methylimidazolium chloride, 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate, and 1-ethyl-2,3-dimethylimidazolium ethyl sulfate.

4. The hybrid supported metallocene catalyst of claim 1, wherein the second metallocene compound represented by Chemical Formula 3 is represented by the following Chemical Formula 4 or 5:

[Chemical Formula 4]

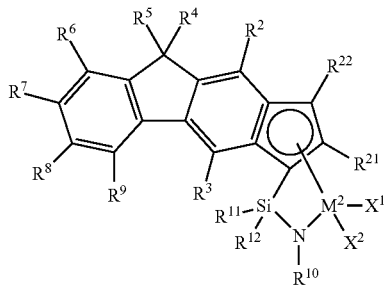

[Chemical Formula 5]

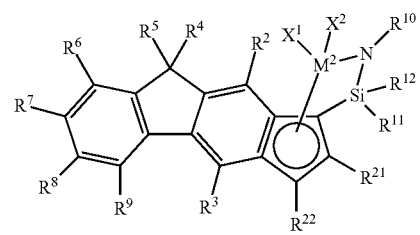

in Chemical Formulas 4 and 5, $M^2$, $R_2$ to $R_{12}$, $X_1$, and $X_2$ each have the same definition in Chemical Formula 3 of claim 1; $R_{21}$ and $R_{22}$ each are independently hydrogen, (C1-C20)alkyl, halo(C1-C20)alkyl, (C3-C20)cycloalkyl, (C1-C20)alkyl(C6-C30)aryl, (C6-C30)aryl, (C6-C30)ar(C1-C20)alkyl, ((C1-C20)alkyl(C6-C30)aryl)(C1-C20)alkyl, $-NR^kR^l$, $-SiR^mR^nR^o$, or 5-to 7-membered N-heterocycloalkyl containing at least one nitrogen atom; and $R^k$ to $R^o$ each are independently (C1-C20)alkyl or (C6-C30)aryl.

5. The hybrid supported metallocene catalyst of claim 1, wherein the co-catalyst is at least one selected from a group consisting of alkylaluminoxane compounds represented by the following Chemical Formula 6, organic aluminum compounds represented by the following Chemical Formula 7, and boron compounds co-catalyst represented by the following Chemical Formulas 8 to 10:

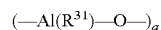 [Chemical Formula 6]

 [Chemical Formula 7]

in Chemical Formulas 6 and 7, $R^{31}$ and $R^{32}$ each are independently (C1-C20)alkyl; E is a hydrogen atom or halogen atom; a is an integer of 5 to 20; and b is an integer of 1 to 3;

 [Chemical Formula 8]

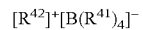 [Chemical Formula 9]

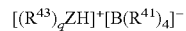 [Chemical Formula 10]

in Chemical Formulas 8 to 10, B is an boron atom; $R^{41}$ is phenyl, and phenyl is further substituted with 3 to 5 substituents selected from a group consisting of a fluorine atom, (C1-C4)alkyl substituted or unsubstituted with a fluorine atom, and (C1-C4)alkoxy substituted or unsubstituted with a fluorine atom; $R^{42}$ is (C5-C7)cycloalkyl radical, (C6-C20)aryl radical, or (C1-C20)alkyl (C6-C20)aryl radical, or (C6-C30)ar(C1-C20)alkyl radical; Z is a nitrogen or phosphorus atom; $R^{43}$ is ($C_1$-$C_4$)alkyl radical or anilinium radical substituted with two ($C_1$-$C_4$)alkyl together with a nitrogen atom; and q is an integer of 2 or 3.

6. The hybrid supported metallocene catalyst of claim 5, wherein the aluminoxane compound is at least one compound selected from a group consisting of methylaluminoxane, ethylaluminoxane, propylaluminoxane, butylaluminoxane, and isobutylaluminoxane;

the organic aluminum compound is at least one compound selected from a group consisting of trimethylaluminum, triethylaluminum, tripropylaluminum, triisopropylaluminum, tributylaluminum, triisobutylaluminum, triisopentylaluminum, dimethylaluminum chloride, diethylaluminum chloride, dipropylaluminum chloride, diisobutylaluminum chloride, dihexylaluminum chloride, methylaluminum dichloride, ethylaluminum dichloride, propylaluminum chloride, and isobutylaluminum chloride; and the boron compound is at least one compound selected from a group consisting of tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-tetrafluorophenyl)borate, tetrakis(2,2,4-trifluorophenyl)borate, phenylbis(pentafluorophenyl)borate, tetrakis(3,5-bistrifluoromethylphenyl)borate, N,N-dimethylanilinium tetrakis(pentafluorophenyl)borate, and triphenylmethylium tetrakis(pentafluorophenyl)borate.

7. The hybrid supported metallocene catalyst of claim 1, wherein the carrier is an inorganic or organic porous carrier selected from silica, alumina, magnesium chloride, magnesium oxide, mineral clay, kaolin, talc, mica, montmorillonite, polysiloxane based polymer compounds, polystyrene, or a combination thereof.

8. The hybrid supported metallocene catalyst of claim 3, wherein a content of the ionic compound is 0.001 to 50 weight % based on the surface-treated carrier.

9. The hybrid supported metallocene catalyst of claim 4, wherein the second metallocene compound represented by Chemical Formula 3 is selected from compounds having the following structures;

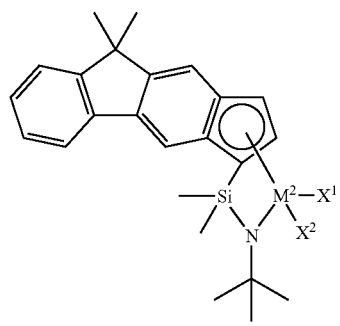

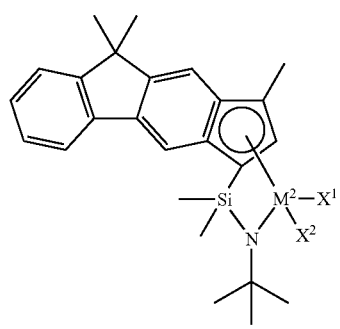

-continued

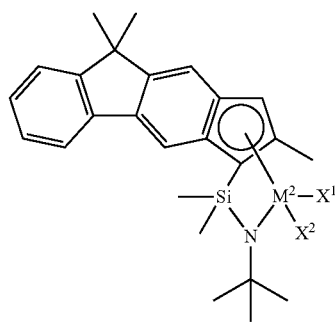

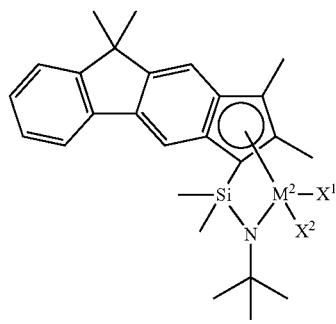

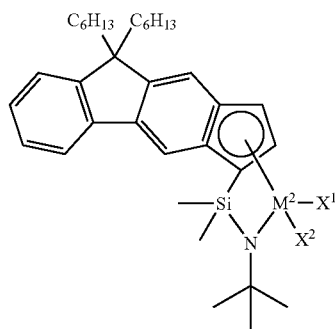

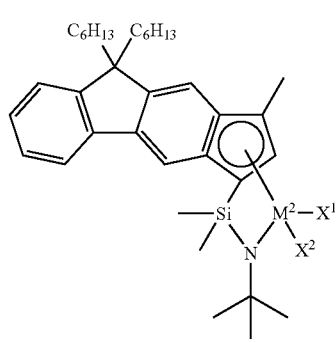

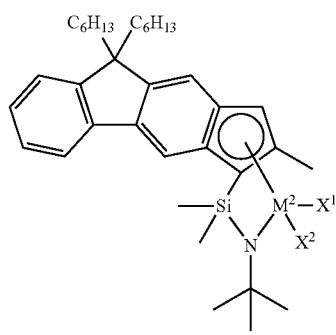

69
-continued
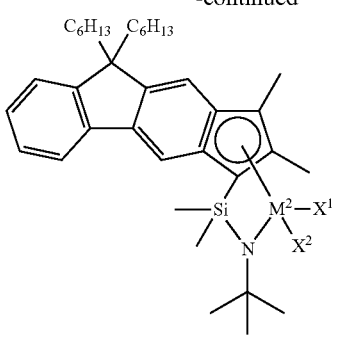
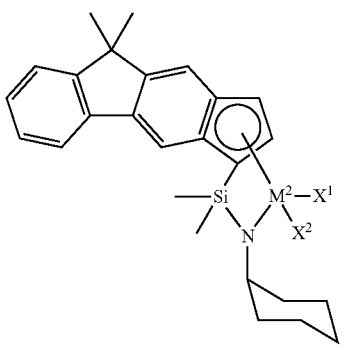
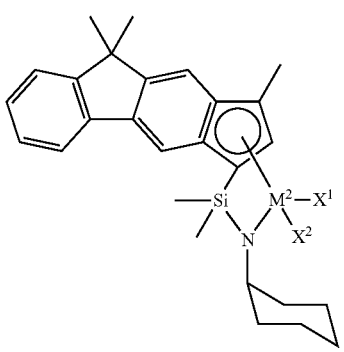
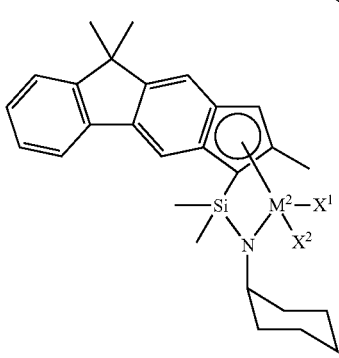
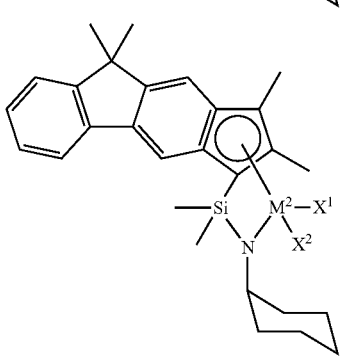
70
-continued
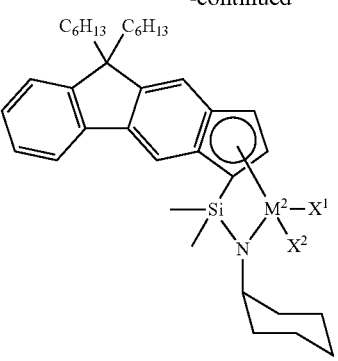
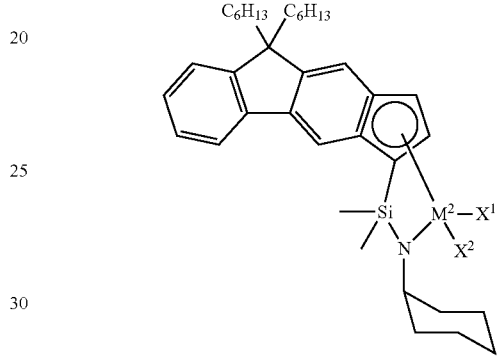
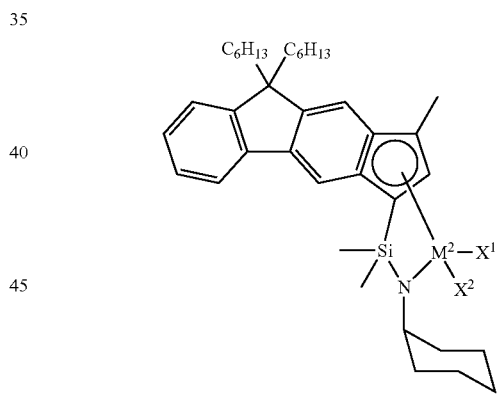
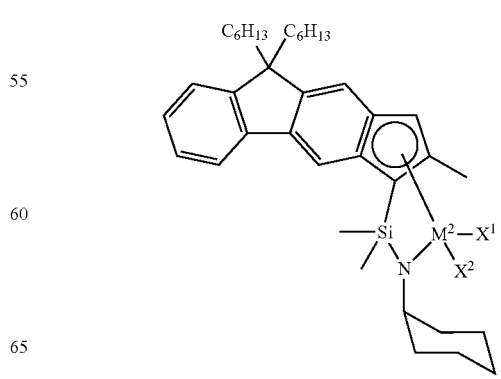

71
-continued
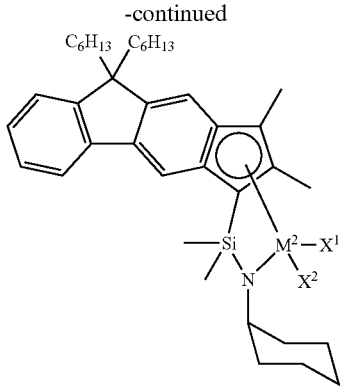
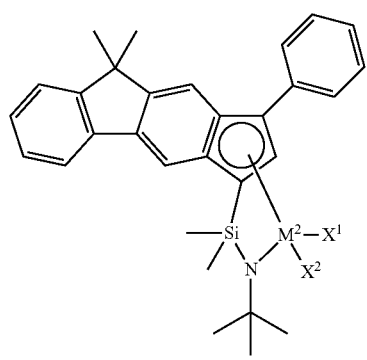
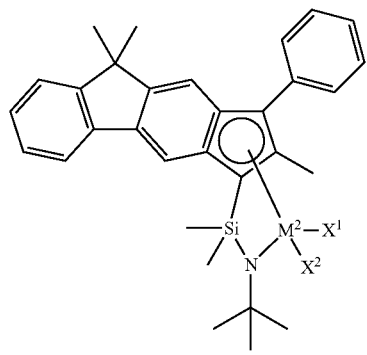
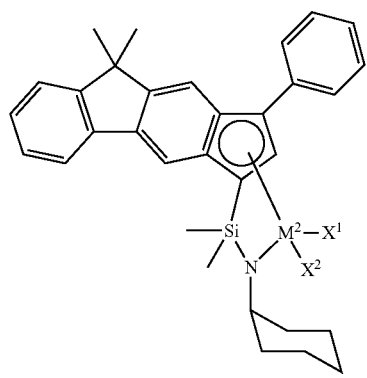
72
-continued
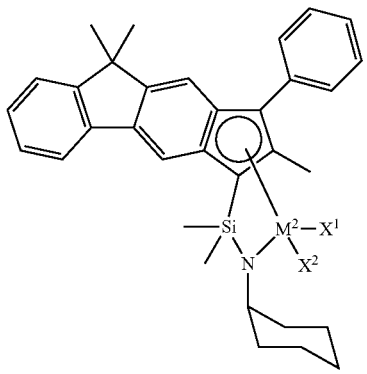
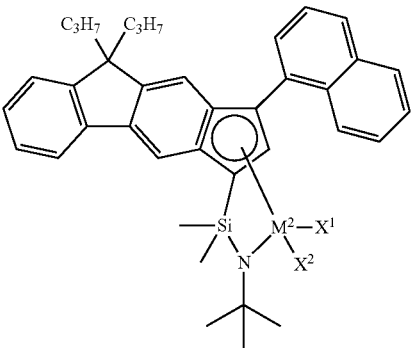
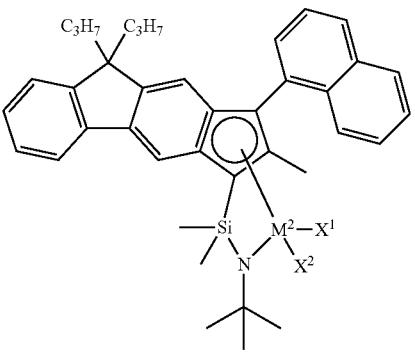
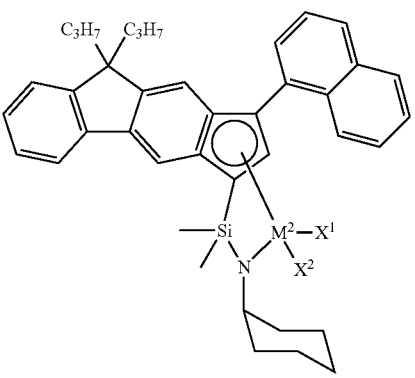

73
-continued
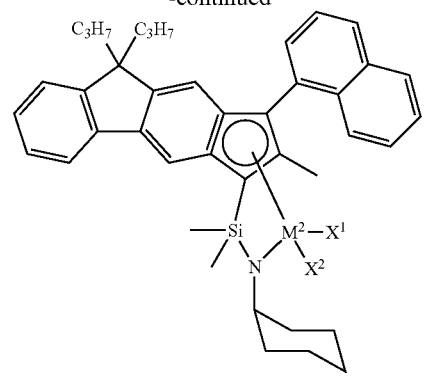
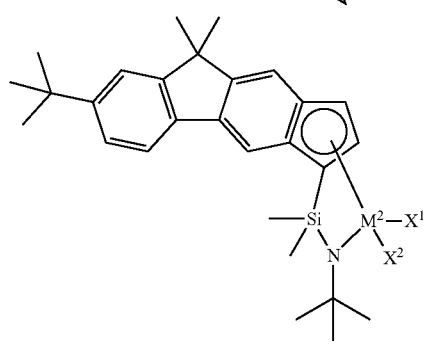
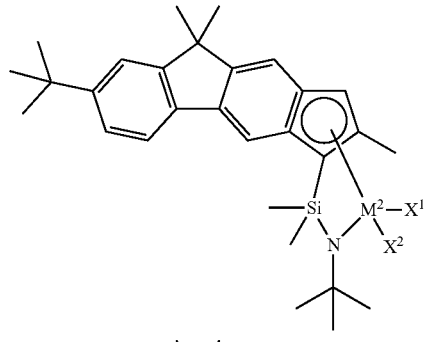
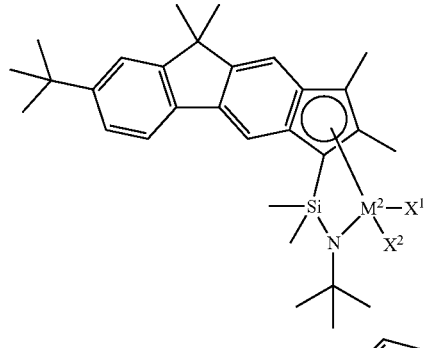
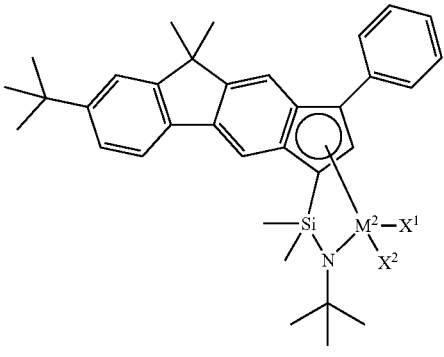
74
-continued
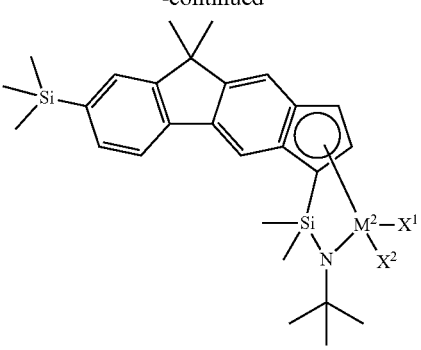
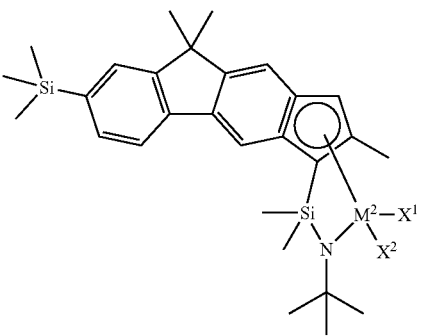
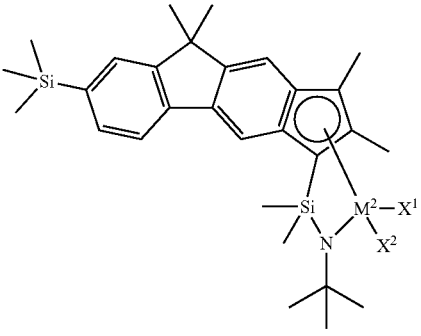
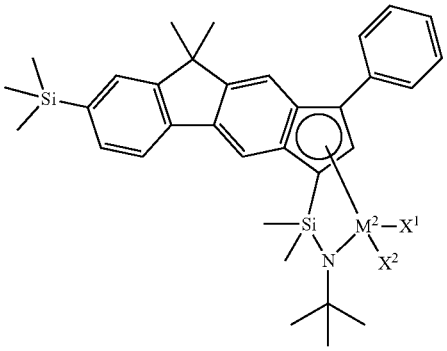
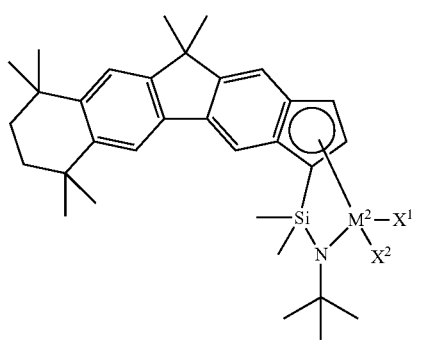

75
-continued
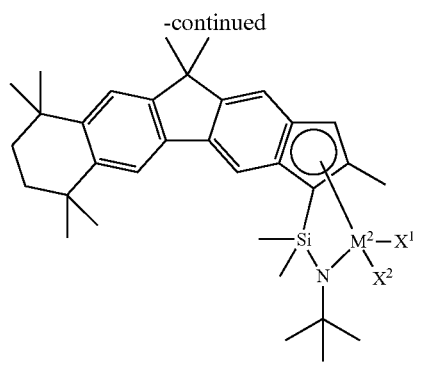
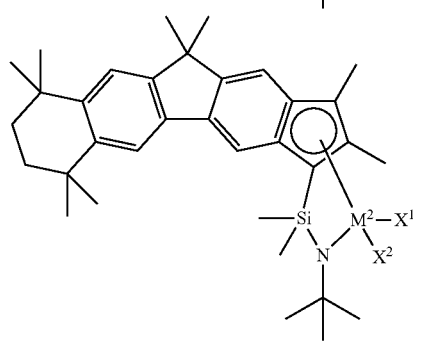
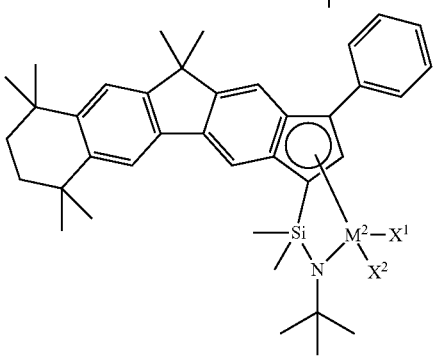
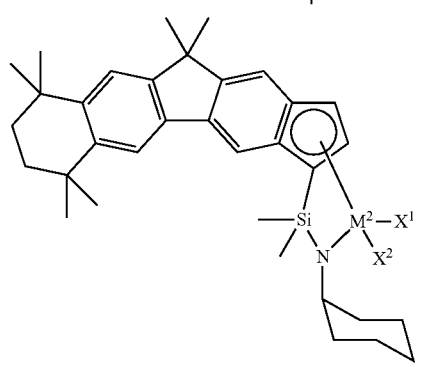
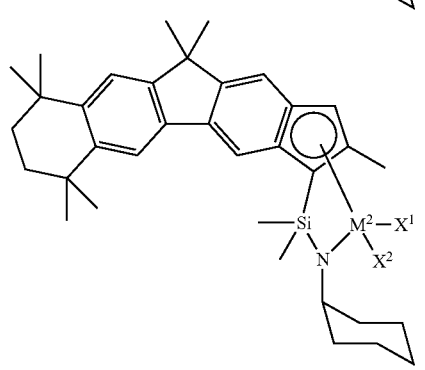
76
-continued
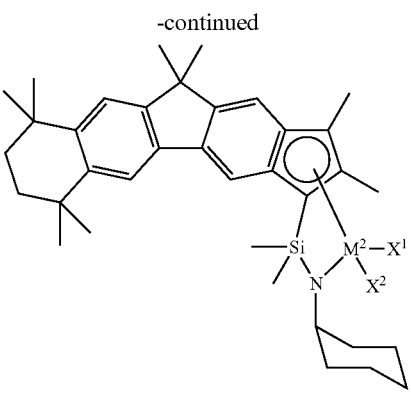
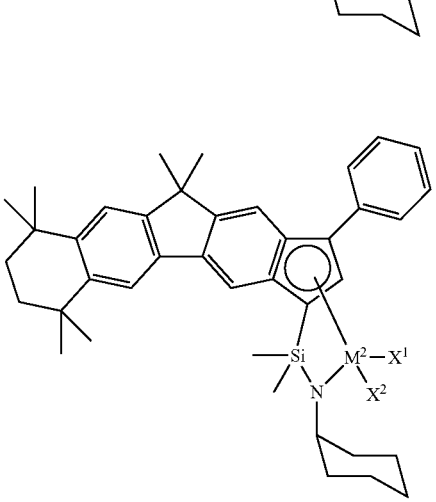
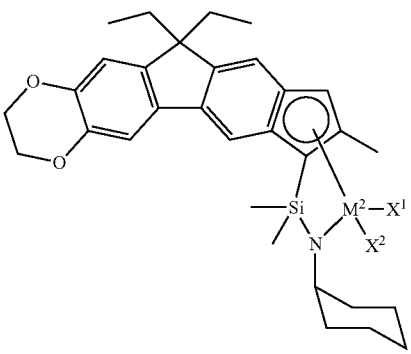
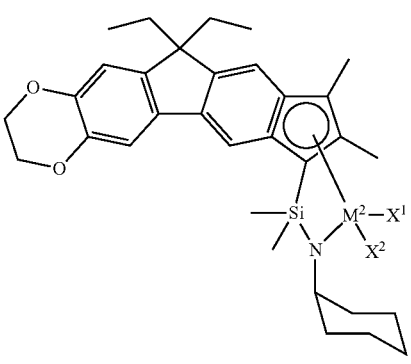

77
-continued
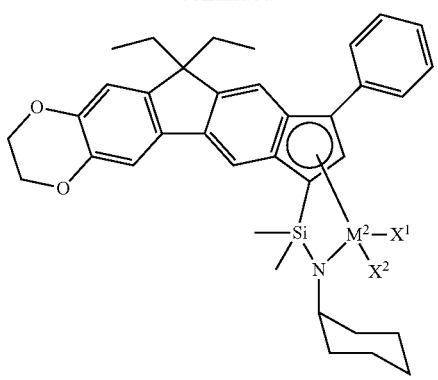
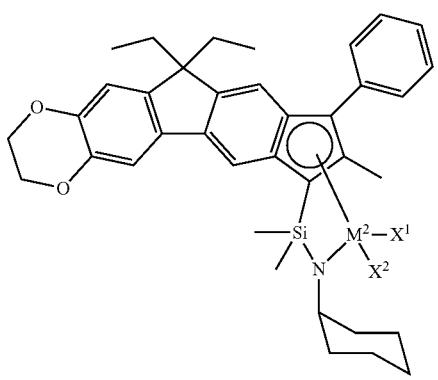
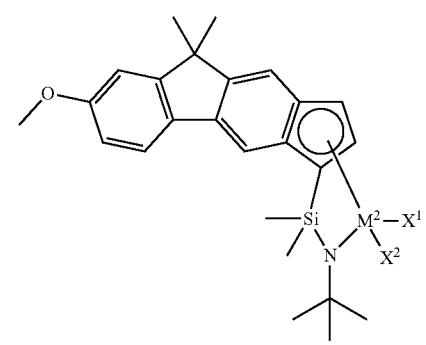
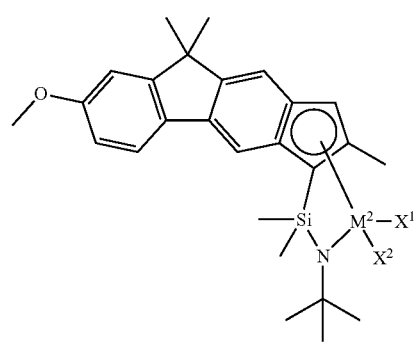
78
-continued
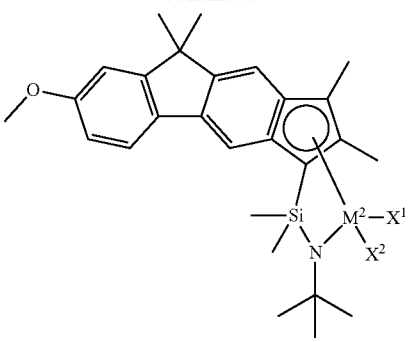
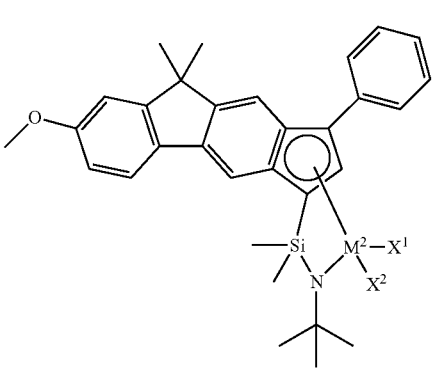
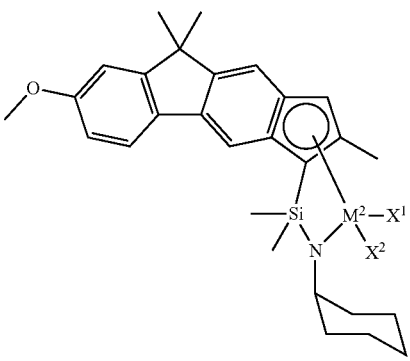
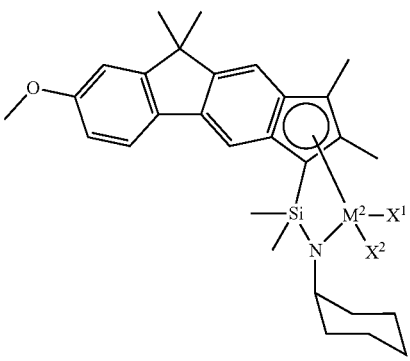

79
-continued
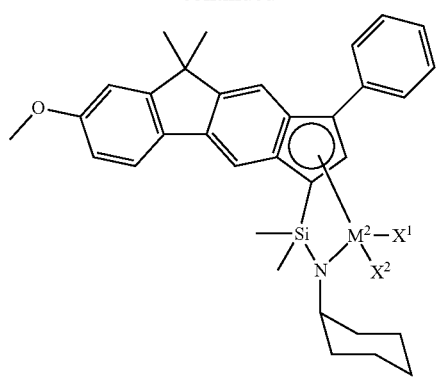
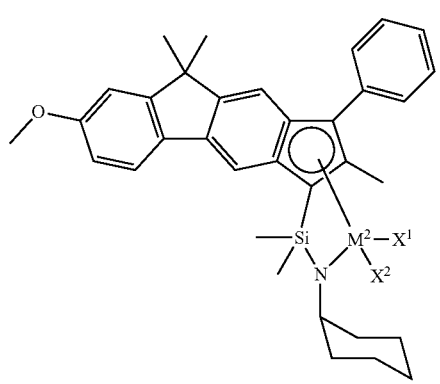
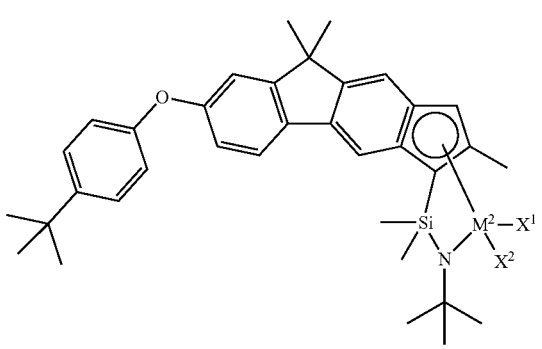
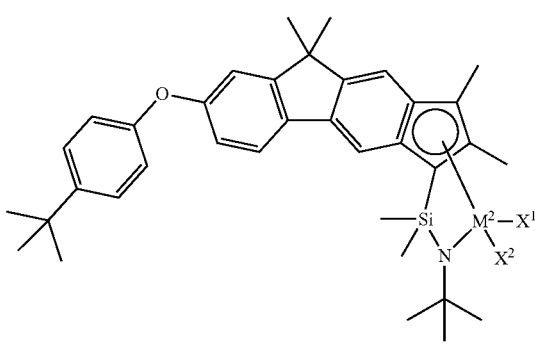
80
-continued
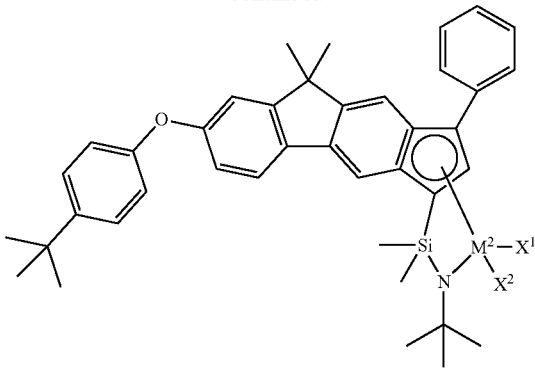
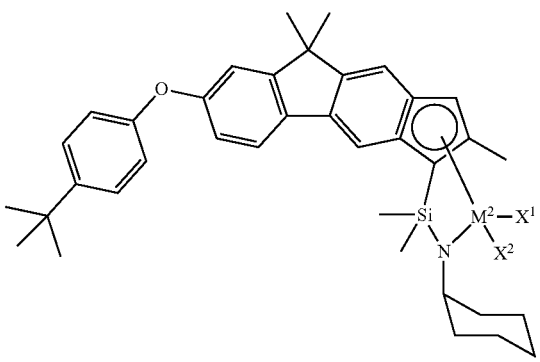
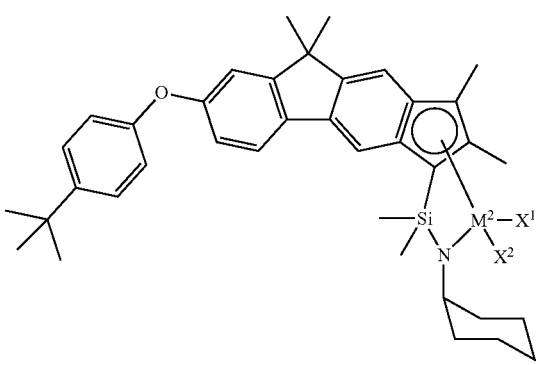
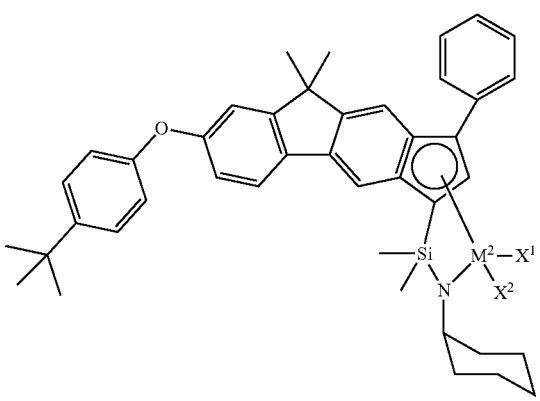

81
-continued
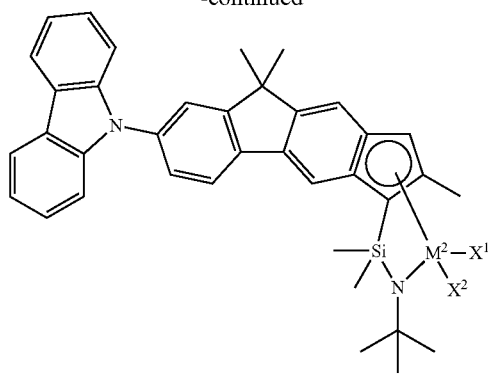
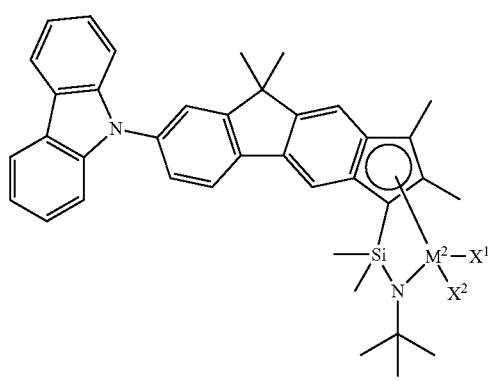
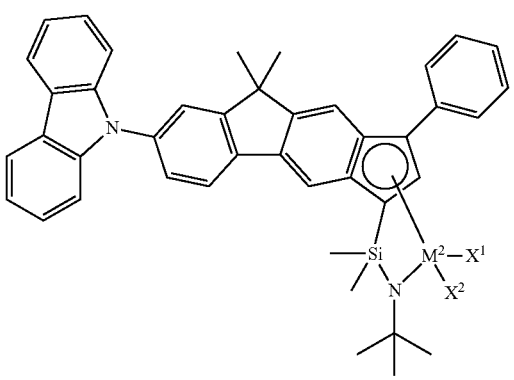
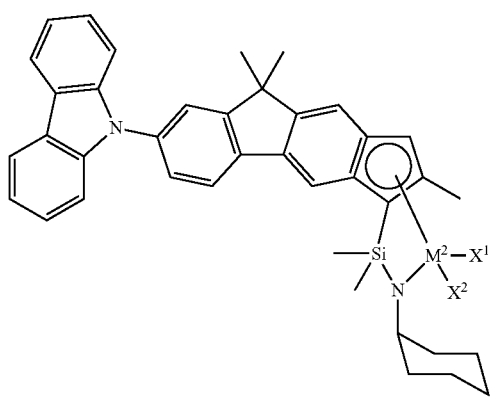
82
-continued
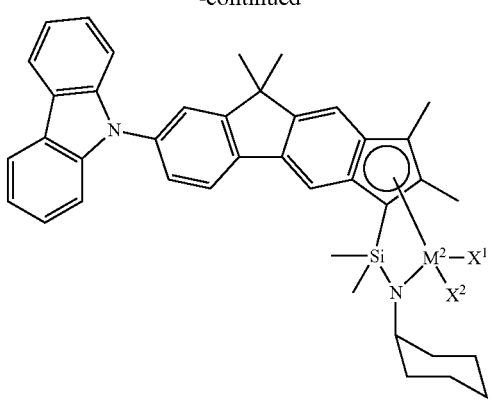
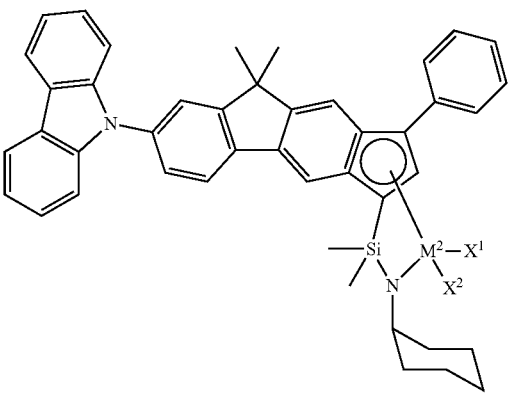
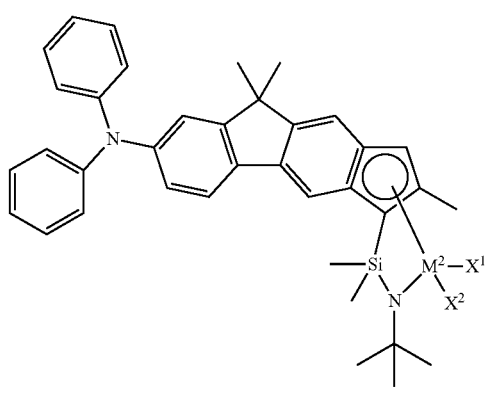
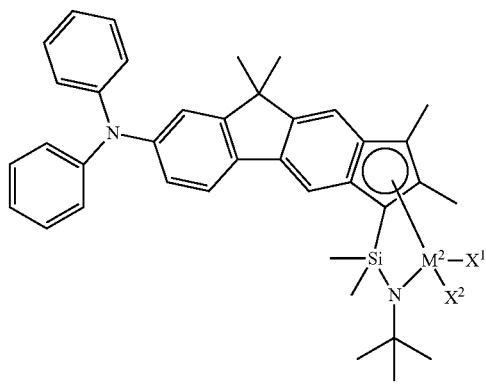

83
-continued
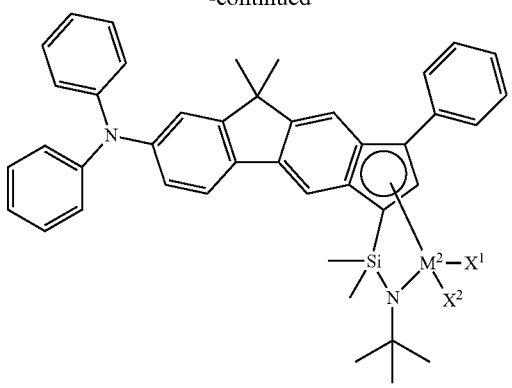
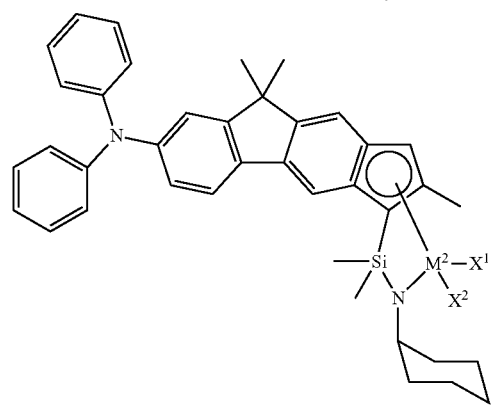
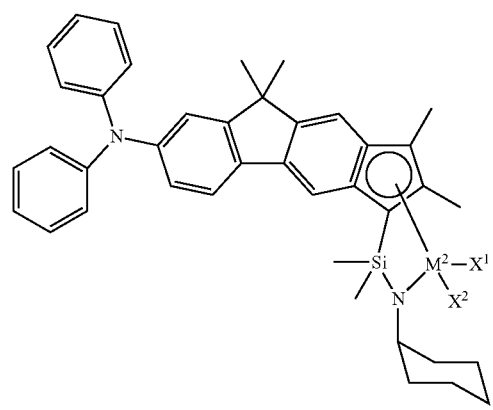
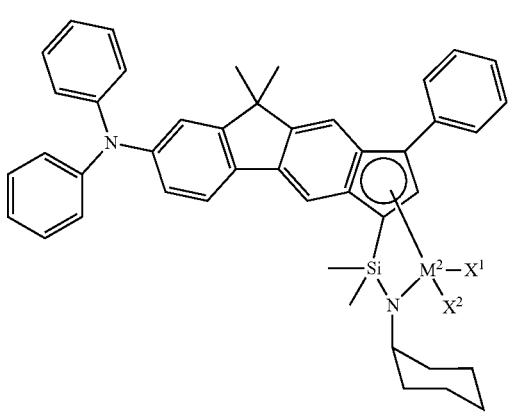
84
-continued
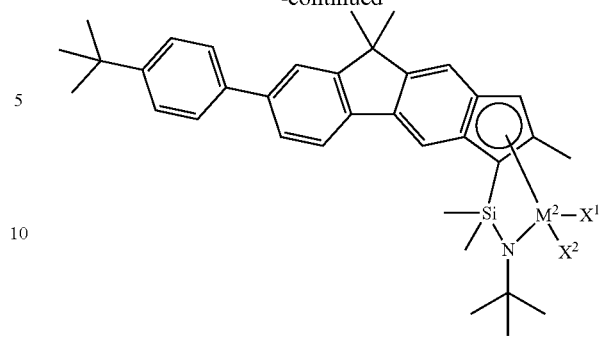
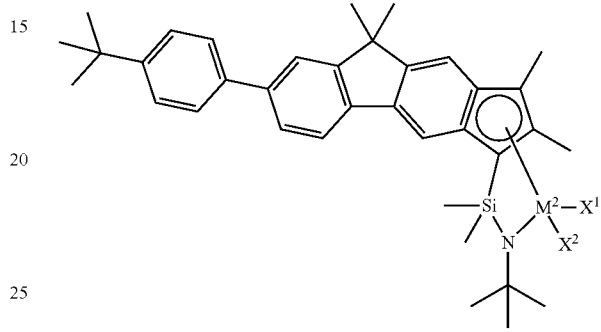
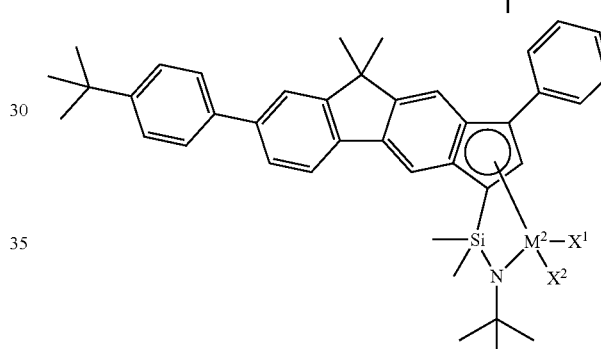
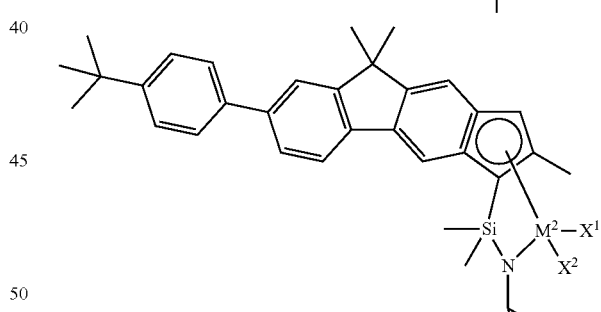
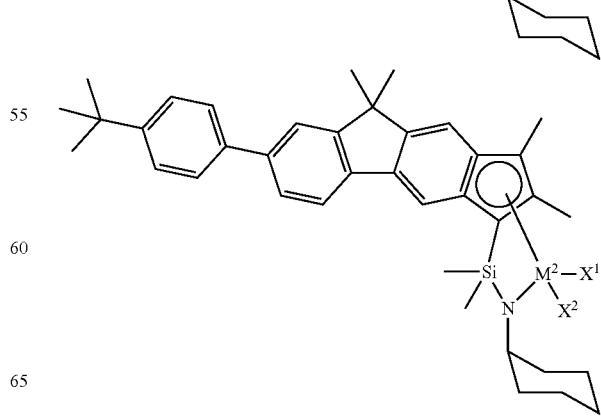

85
-continued
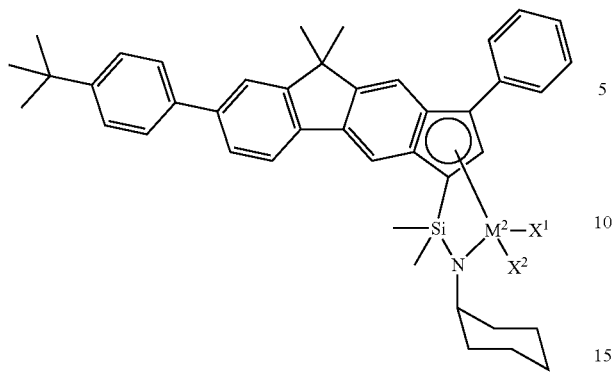
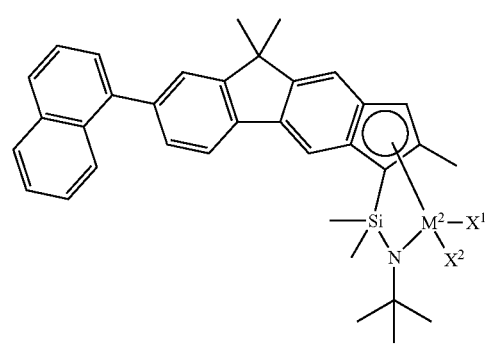
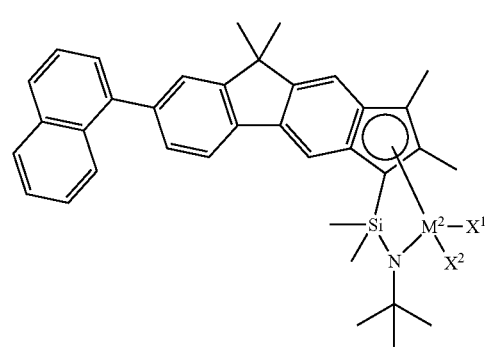
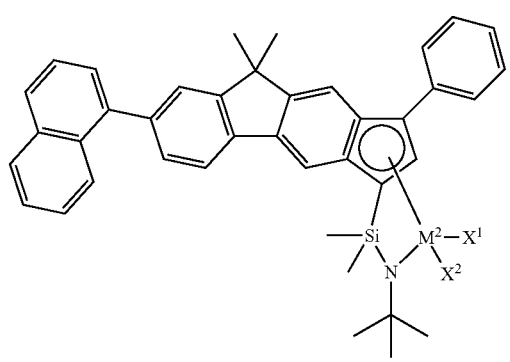
86
-continued
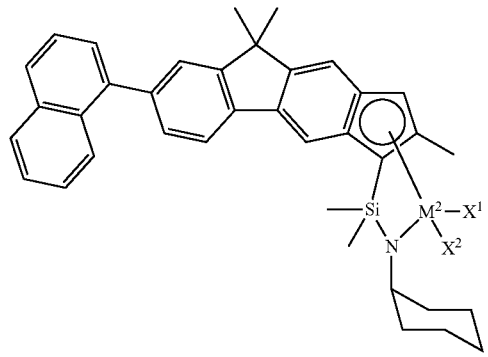
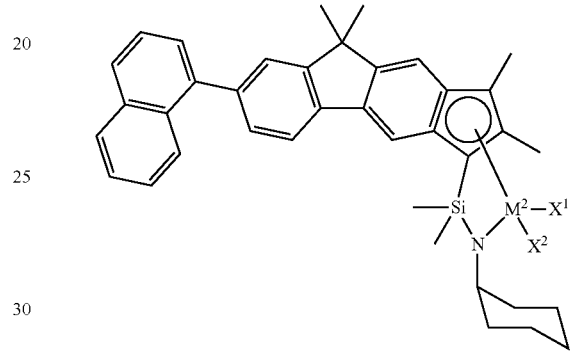
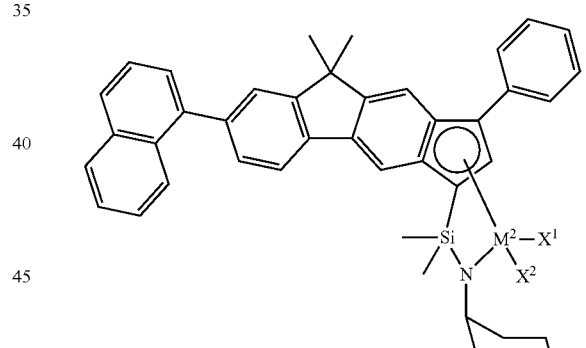
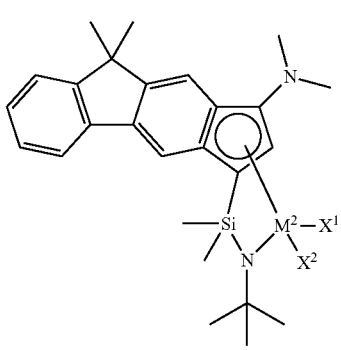

87
-continued
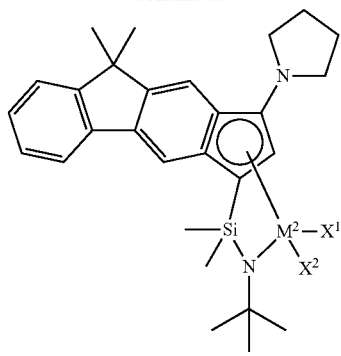
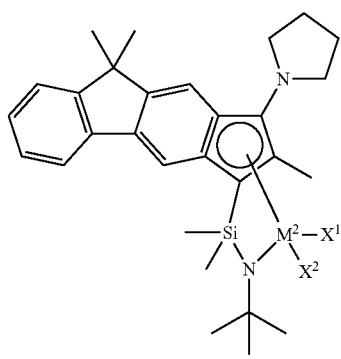
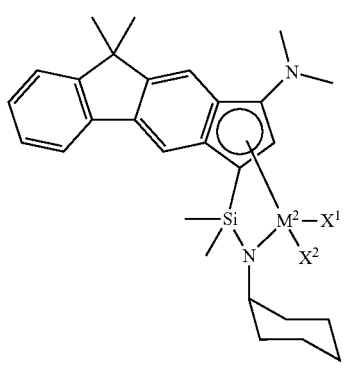
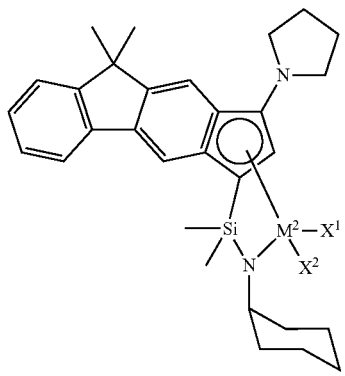
88
-continued
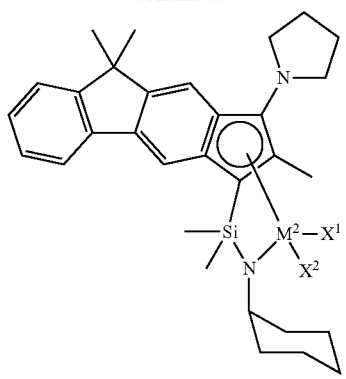
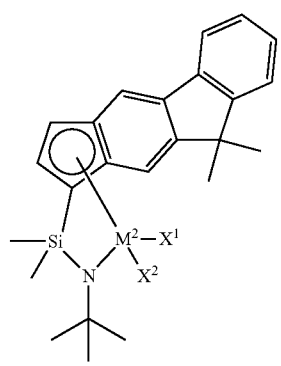
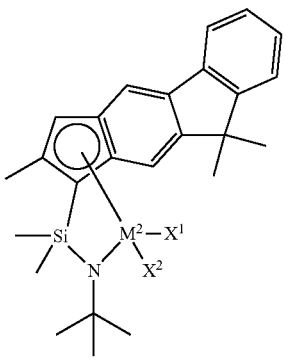
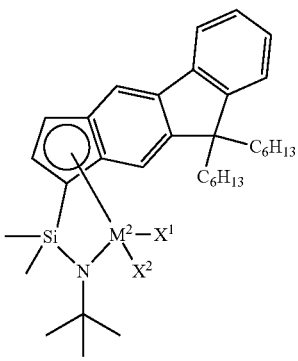

89
-continued
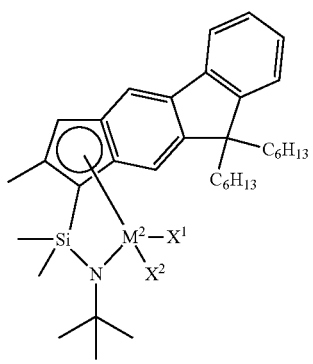
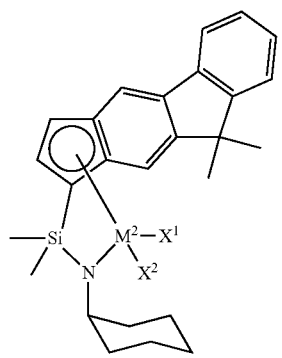
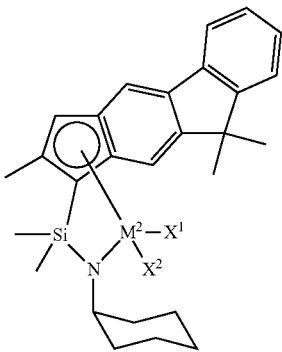
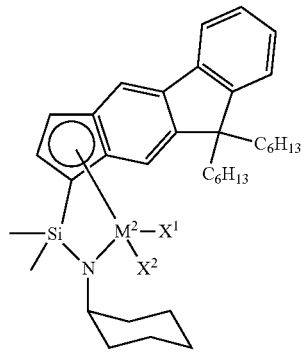
90
-continued
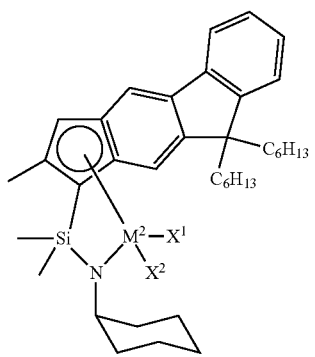
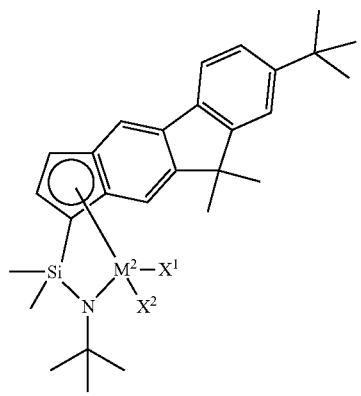
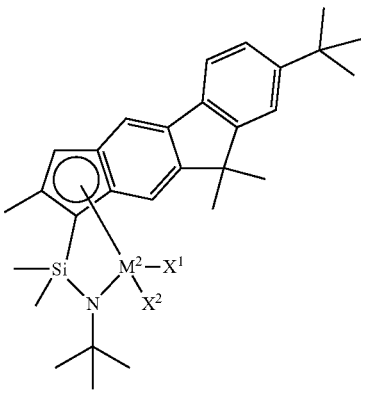
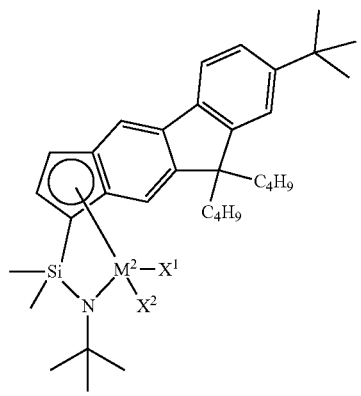

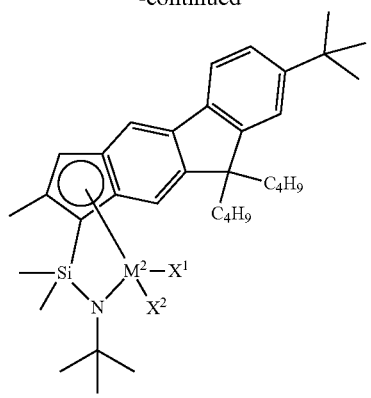
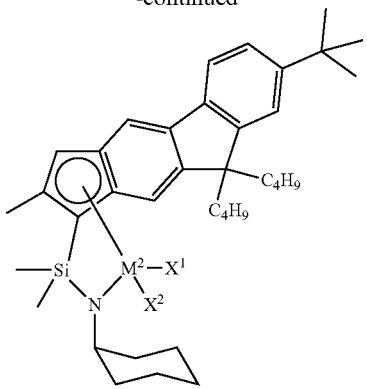
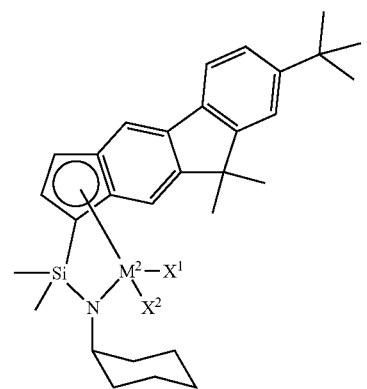
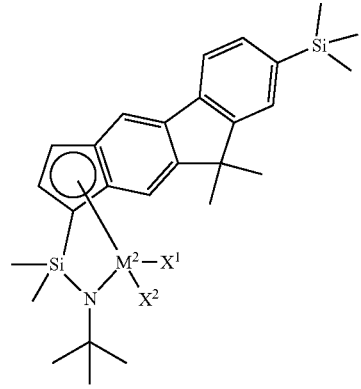
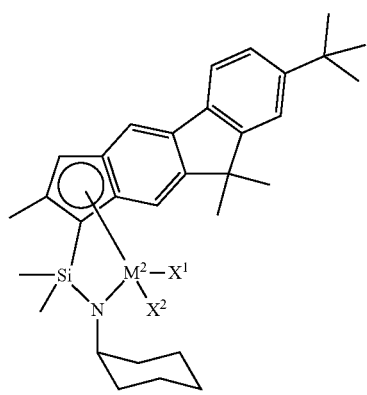
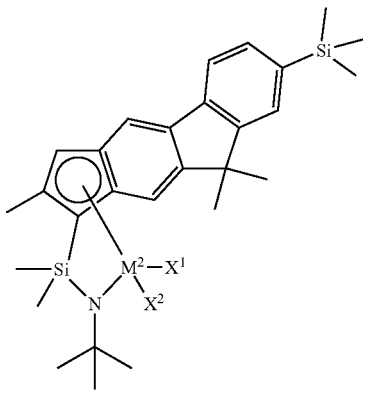
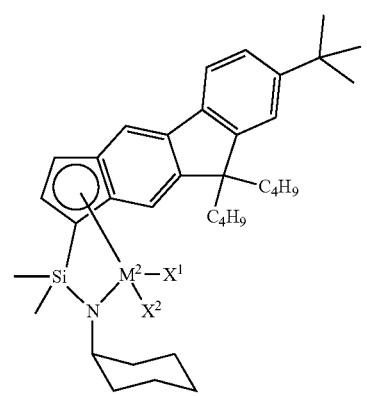
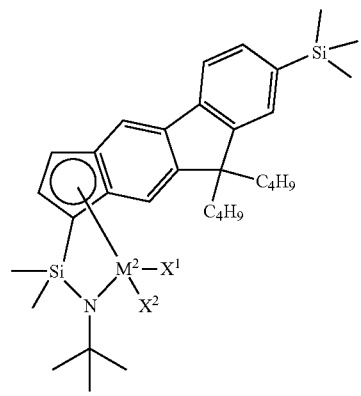

-continued
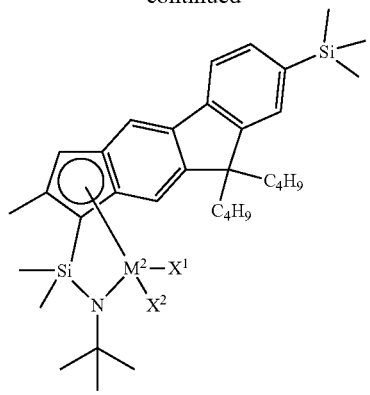
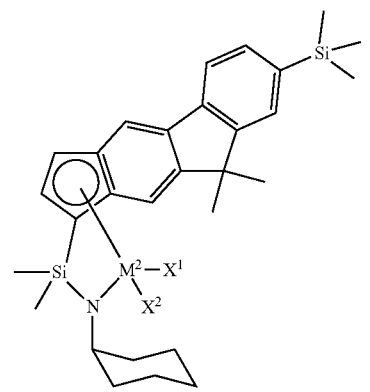
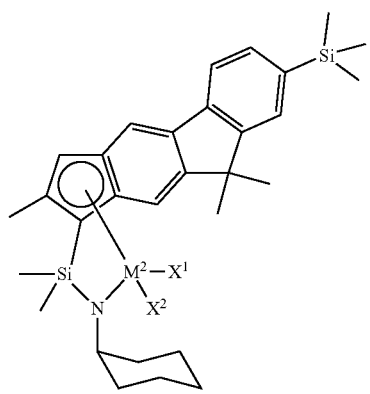
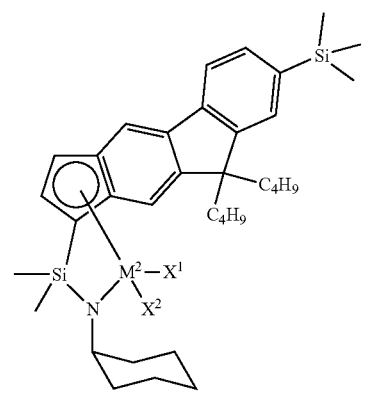
-continued
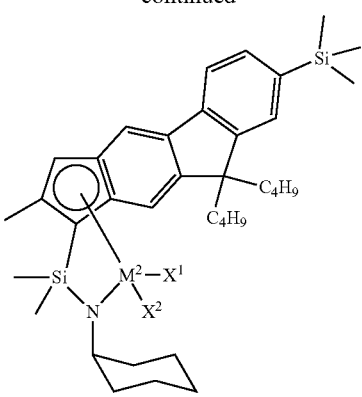
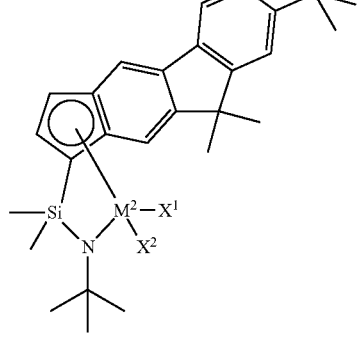
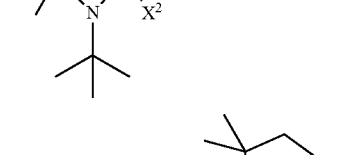
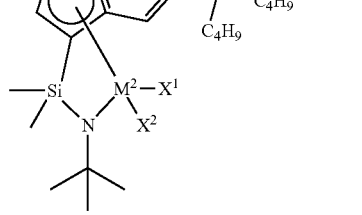

95
-continued
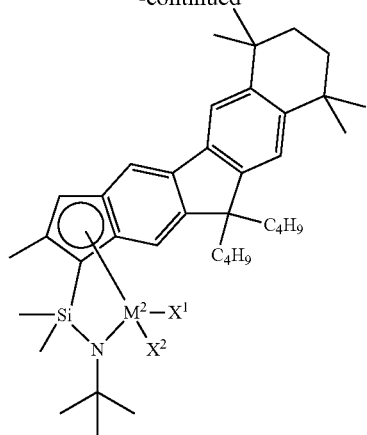
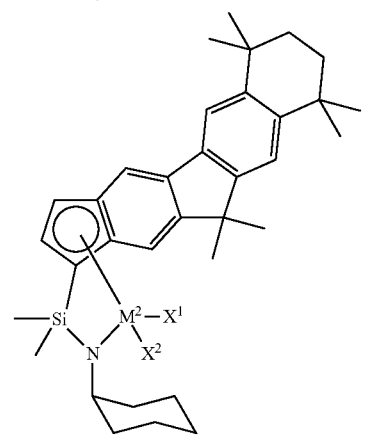
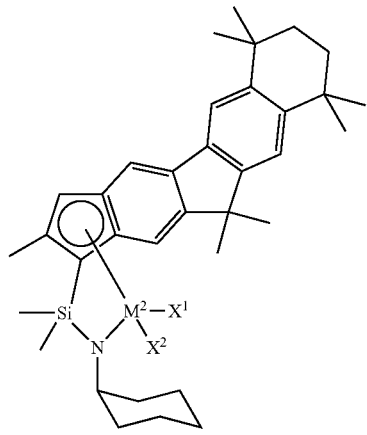
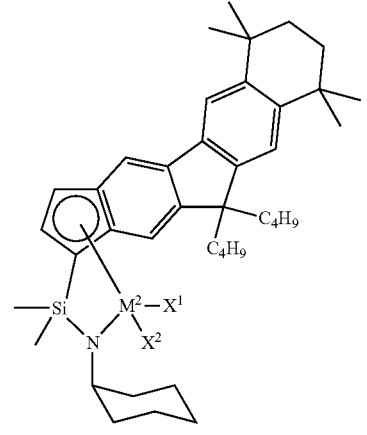
96
-continued
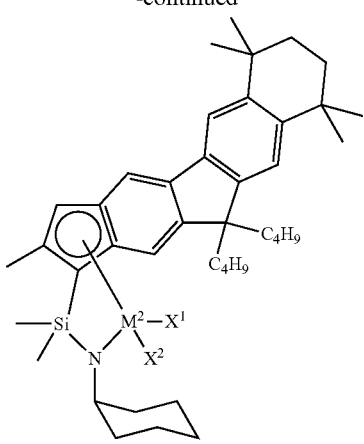
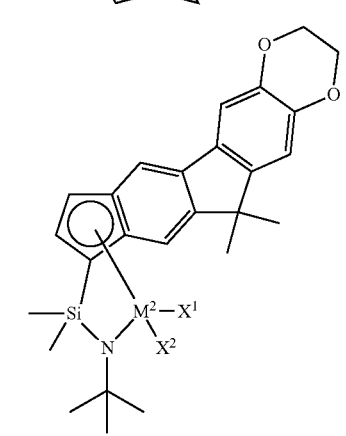
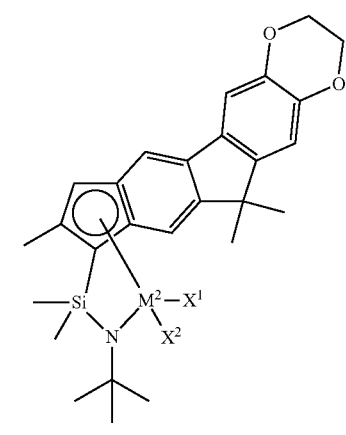
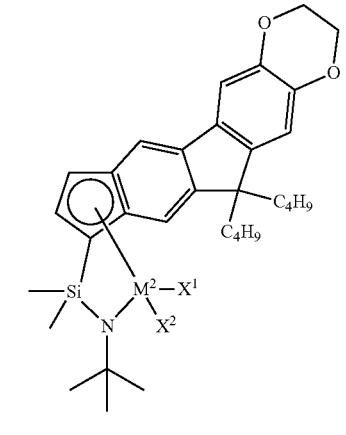

-continued
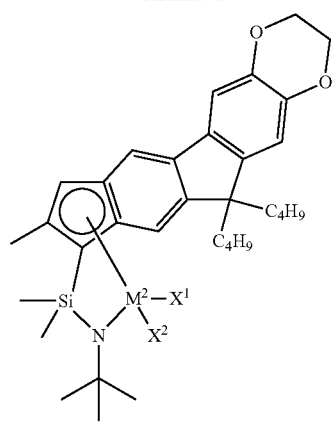
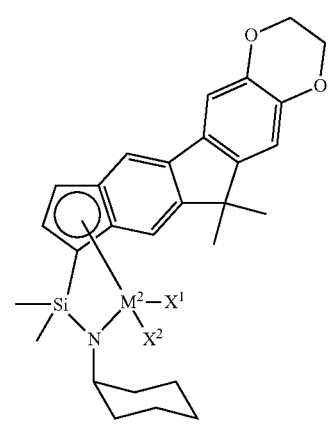
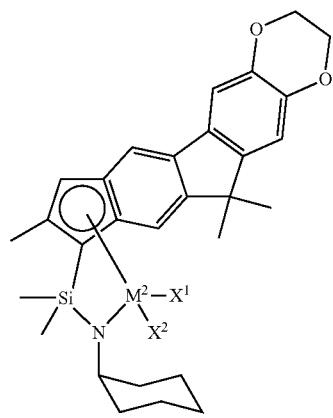
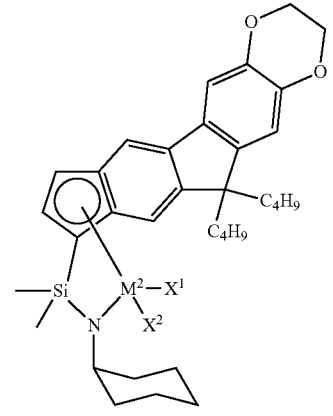
-continued
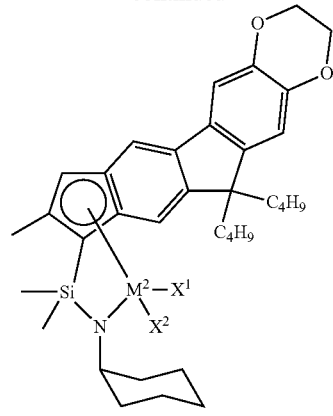
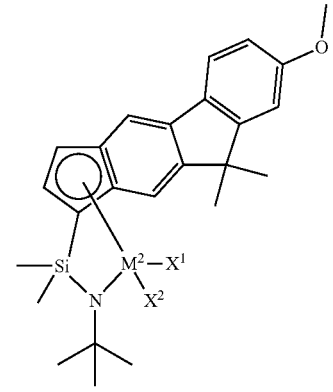
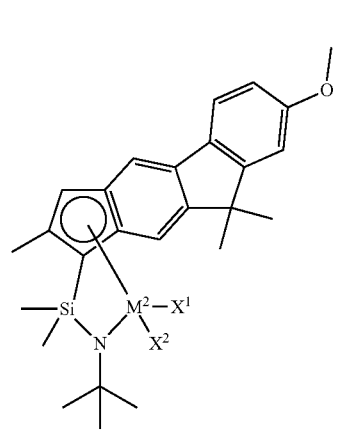
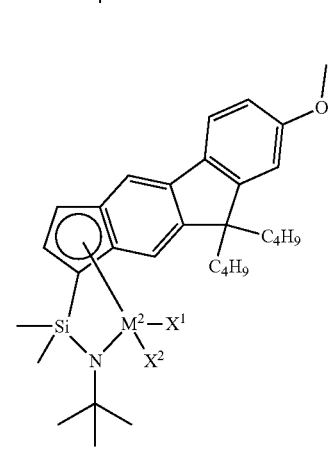

99
-continued
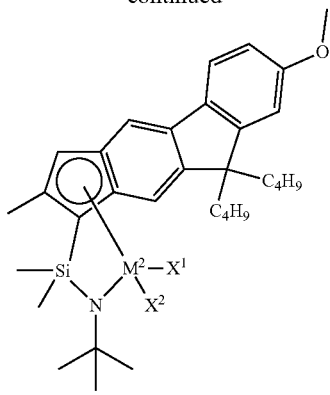
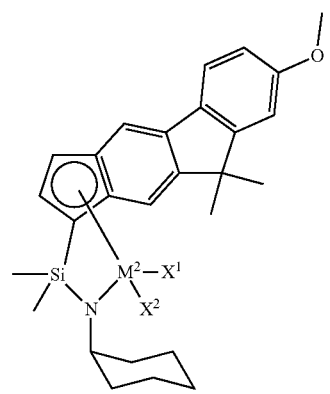
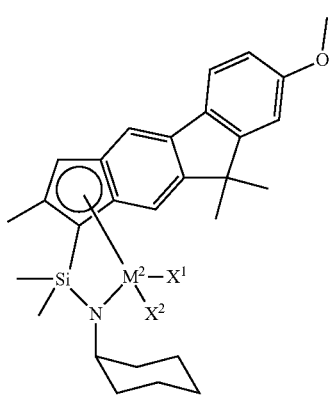
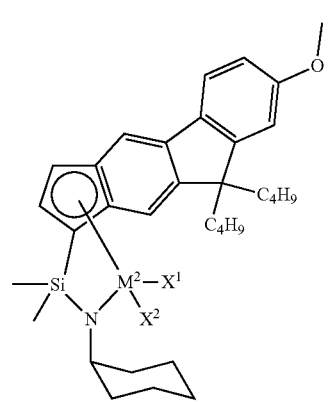
100
-continued
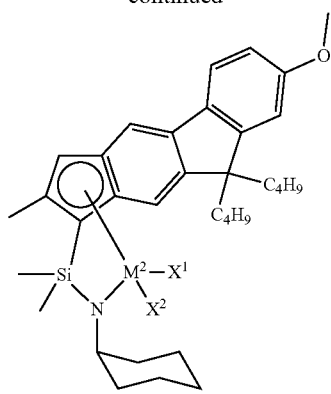
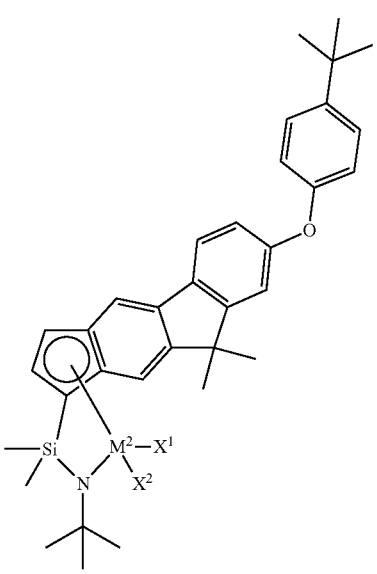
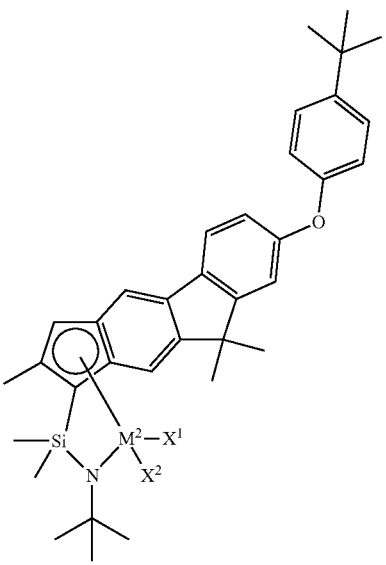

101
-continued
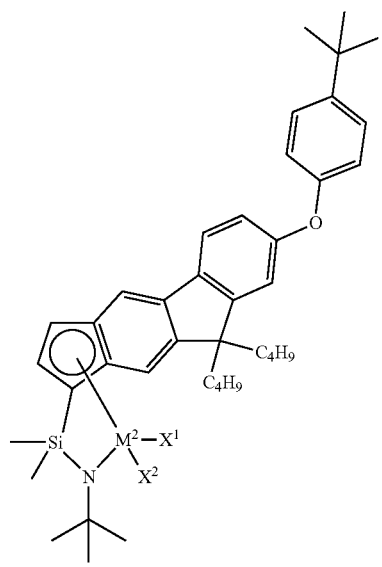
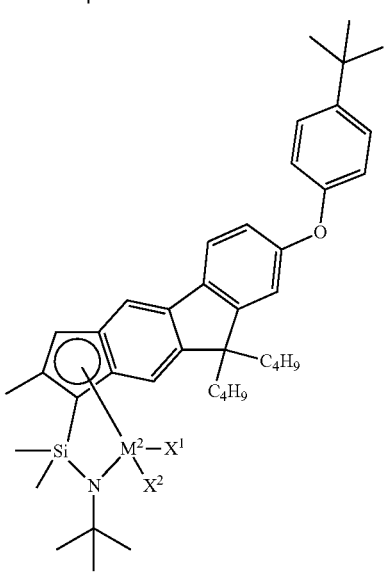
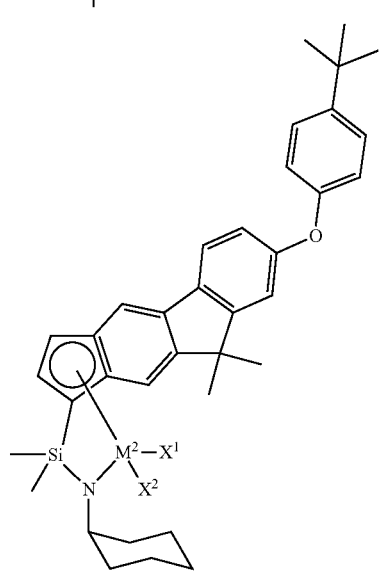
102
-continued
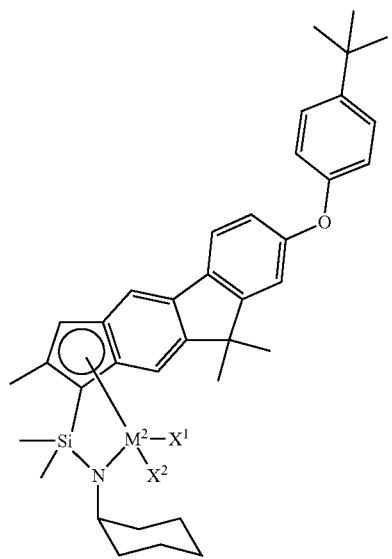
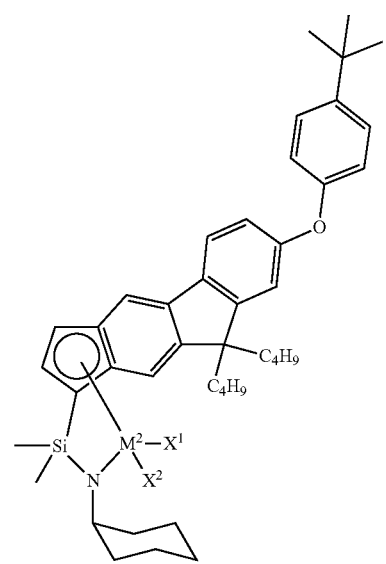
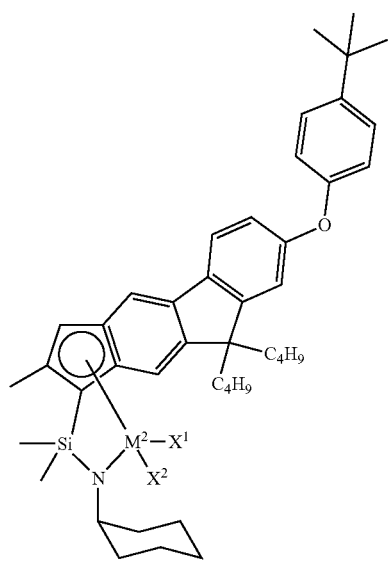

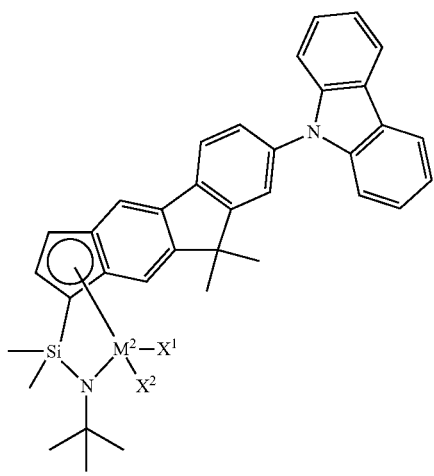
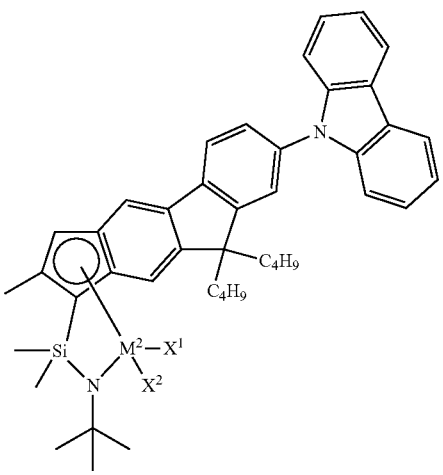
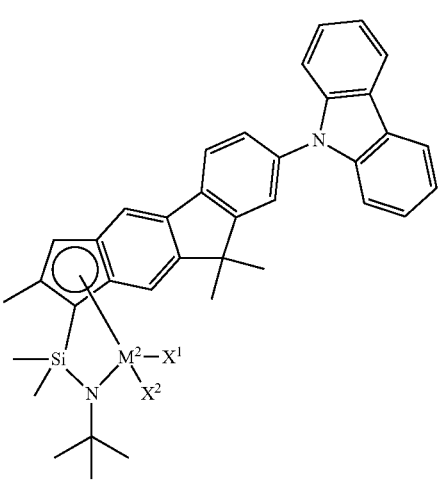
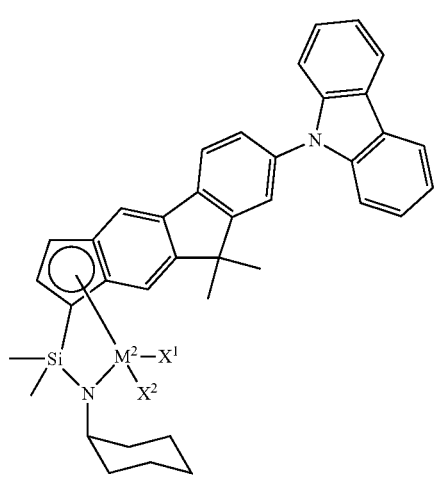
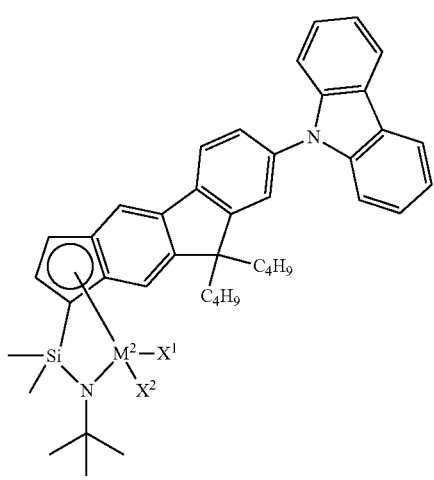
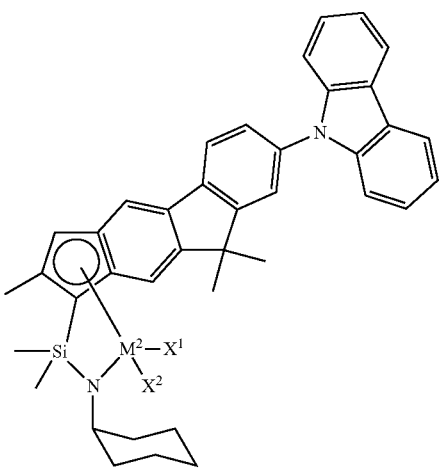

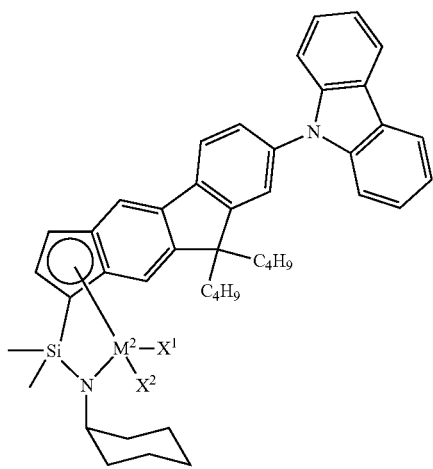
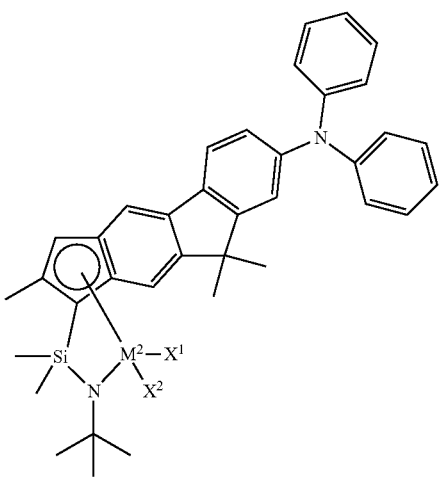
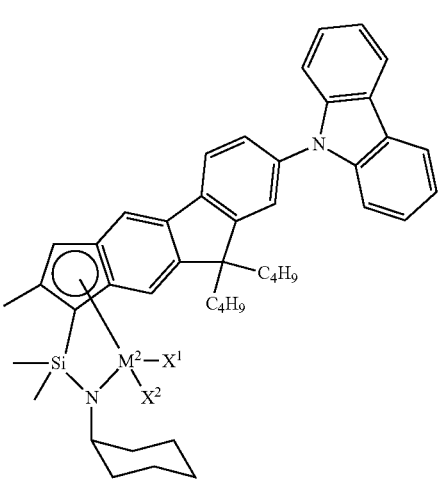
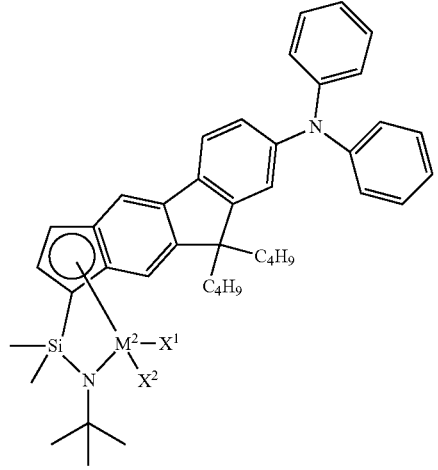
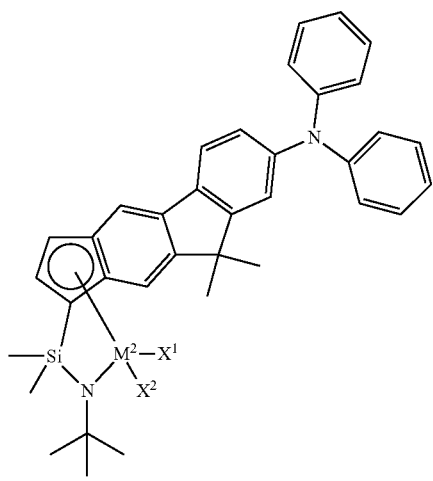
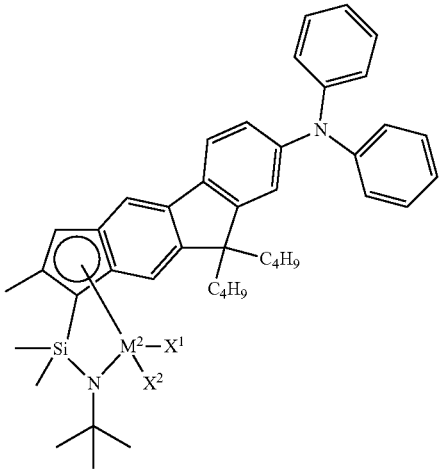

107
-continued
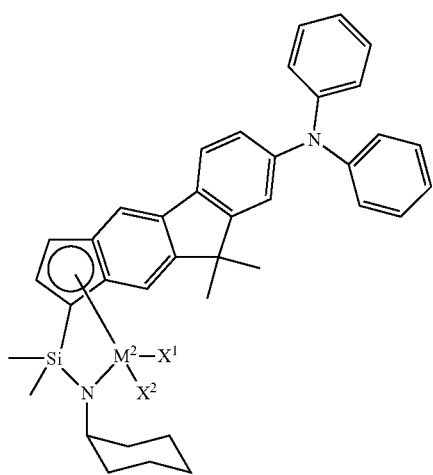
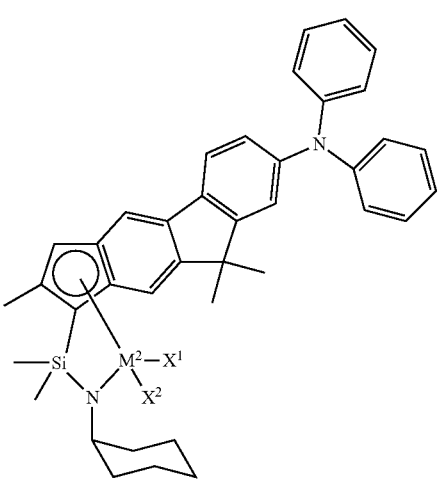
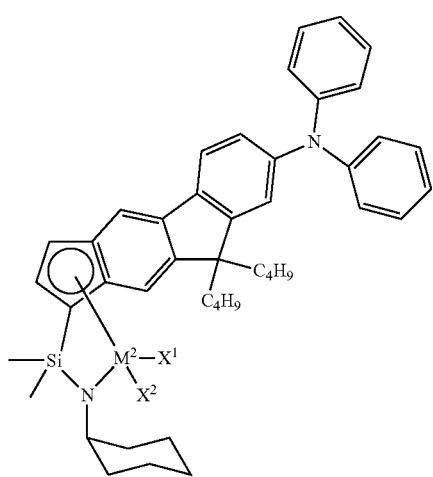
108
-continued
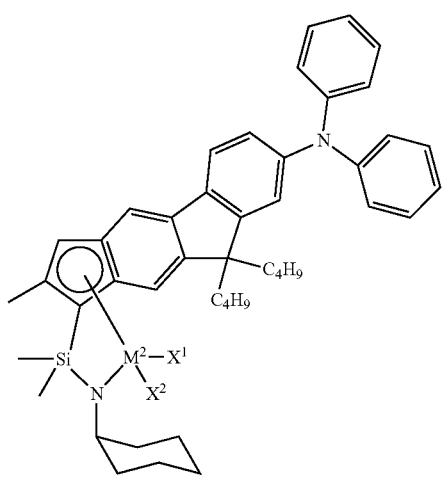
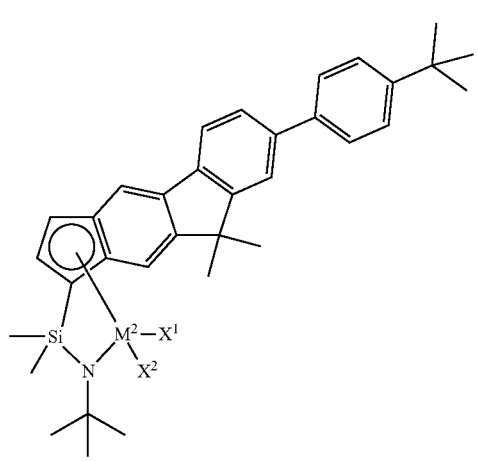
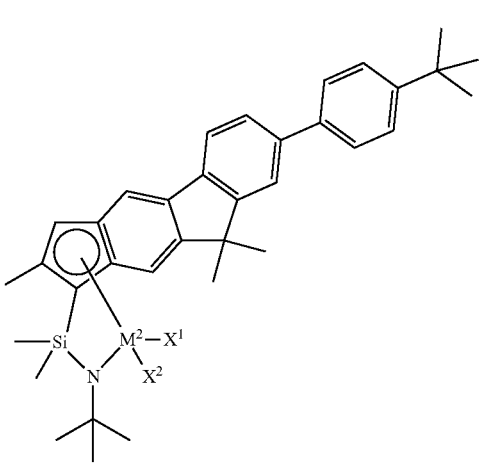

109
-continued
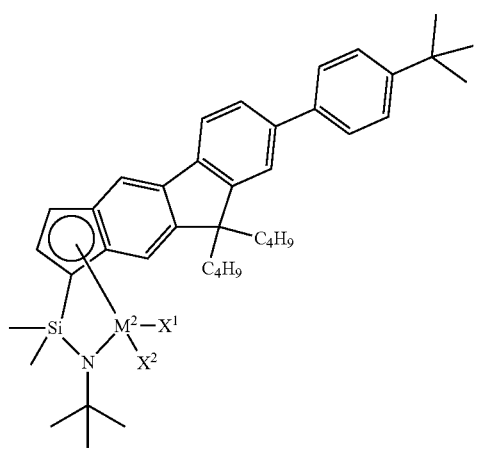
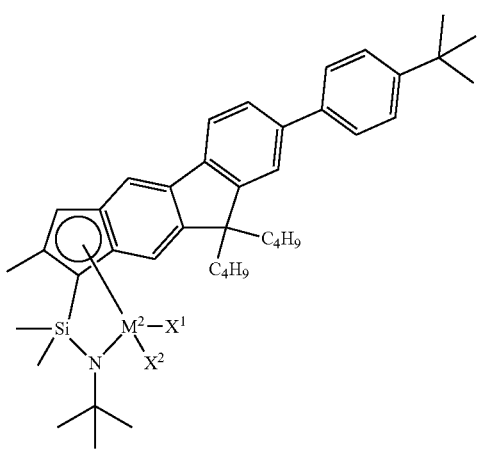
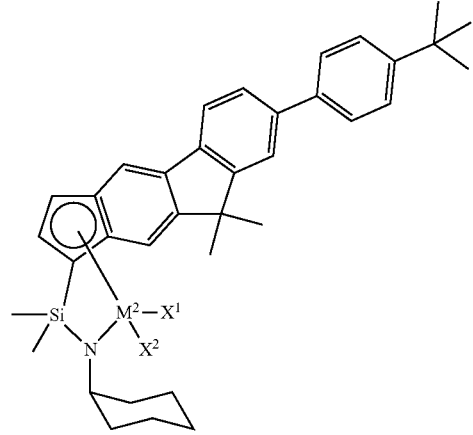
110
-continued
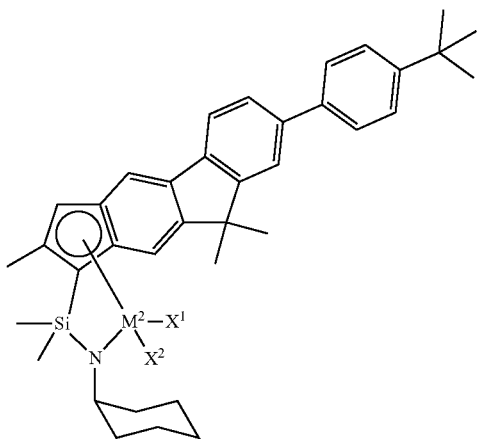
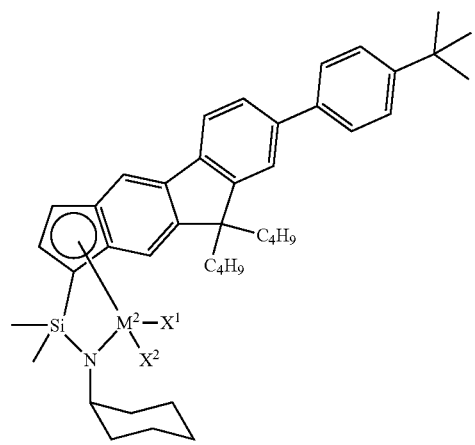
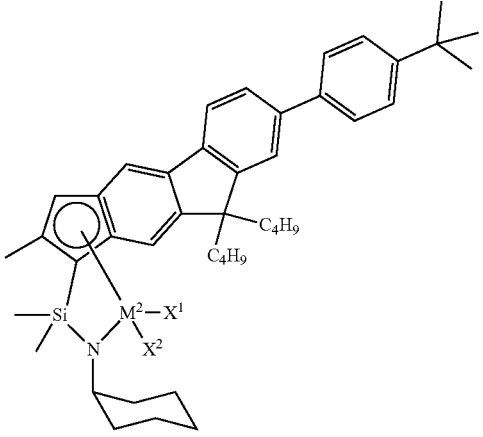

111
-continued

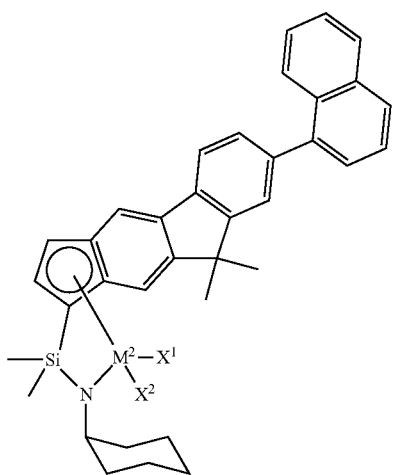

112
-continued

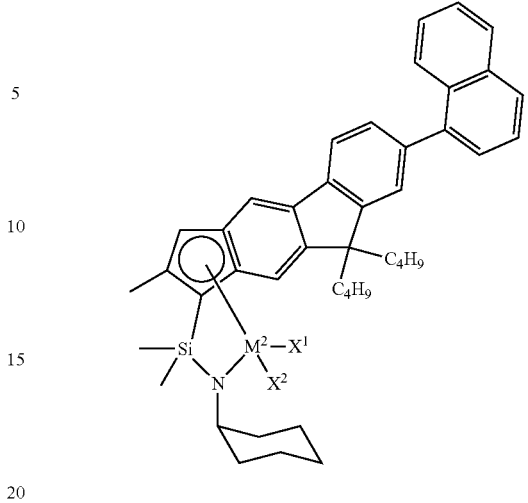

M² is Ti, Zr, or Hf; and X₁ and X₂ each have the same definition as defined in Chemical Formula 3 of claim 1.

10. The hybrid supported metallocene catalyst of claim 1, wherein the first metallocene compound is selected from a group consisting of bis(cyclopentadienyl)zirconium dichloride, bis(methylcyclopentadienyl)zirconium dichloride, bis(normalbutylcyclopentadienyl)zirconium dichloride, bis(cyclopentylcyclopentadienyl)zirconium dichloride, bis(cyclohexylcyclopentadienyl)zirconium dichloride, bis(1,3-dimethylcyclopentadienyl)zirconium dichloride, bis(isobutylcyclopentadienyl)zirconium dichloride, bis(indenyl)zirconium dichloride, bis(fluorenyl)zirconium dichloride, bis(4,5,6,7-tetrahydro-1-indenyl)zirconium dichloride, ethylene-bis(indenyl)zirconium dichloride, ethylene-[bis(4,5,6,7-tetrahydro-1-indenyl)]zirconium dichloride, dimethylsilyl-bis(indenyl)zirconium dichloride, diphenylsilyl-bis(indenyl)zirconium dichloride, isopropyl(cyclopentadienyl)(fluorenyl)zirconium dichloride, dimethylsilyl(cyclopentadienyl)(fluorenyl)zirconium dichloride, diphenylsilyl(cyclopentadienyl)(fluorenyl)zirconium dichloride, (cyclopentylcyclopentadienyl)(cyclopentadienyl)zirconium dichloride, (1-methyl-3-cyclopentylcyclopentadienyl)(cyclopentadienyl)zirconium dichloride, (1-ethyl-3-cyclopentylcyclopentadienyl)(cyclopentadienyl) zirconium dichloride, (1-butyl-3-cyclopentylcyclopentadienyl)(cyclopentadienyl)zirconium dichloride, (cyclopentylcyclopentadienyl)(cyclomethylcyclopentadienyl)zirconium dichloride, (1-methyl-3-cyclopentylcyclopentadienyl)(pentamethylcyclopentadienyl)zirconium dichloride, (1-ethyl-3-cyclopentylcyclopentadienyl)(pentamethylcyclopentadienyl)zirconium dichloride, (1-butyl-3-cyclopentylcyclopentadienyl)(pentamethylcyclopentadienyl)zirconium dichloride, (cyclohexylcyclopentadienyl)(cyclopentadienyl)zirconium dichloride, (1-methyl-3-cyclohexylcyclopentadienyl)(pentamethylcyclopentadienyl)zirconium dichloride, (1-ethyl-3-cyclohexylcyclopentadienyl)(pentamethylcyclopentadienyl) zirconium dichloride, (1-butyl-3-cyclohexylcyclopentadienyl)(pentamethylcyclopentadienyl) zirconium dichloride, (cyclohexylmethylenylcyclopentadienyl)(cyclopentadienyl) zirconium dichloride, (cycloheptylcyclopentadienyl)(cyclopentadienyl)zirconium dichloride, (1-methyl-3-cycloheptylcyclopentadienyl)(pentamethylcyclopentadienyl)zirconium dichloride, (1-ethyl-3-cycloheptylcyclopentadienyl)(pentamethylcyclopentadienyl)zirconium dichloride, (1-butyl-3- cycloheptylcyclopentadienyl)(pentamethylcyclopentadienyl)zirconium dichloride, and (cyclohexylethylenylcyclopentadienyl)(cyclopentadienyl)zirconium dichloride.

11. The hybrid supported metallocene catalyst of claim 1, further comprising at least one kind of co-catalyst selected from a group consisting of alkylaminoxane co-catalysts, organic aluminum co-catalysts, and boron compound co-catalysts.

12. A method for preparing a hybrid supported metallocene catalyst comprising:
   1) treating a carrier with an ionic compound and a co-catalyst; and
   2) simultaneously supporting a hybrid of first and second metallocene compounds on the carrier surface-treated with the ionic compound and the co-catalyst in step 1) to prepare a hybrid supported metallocene catalyst.

13. A process for preparing an olefin polymer using the hybrid supported metallocene catalyst of claim 1.

14. The process for preparing an olefin polymer of claim 13, wherein the olefin polymer is a homopolymer or copolymer of α-olefin.

15. The process for preparing an olefin polymer of claim 14, wherein the α-olefin is at least one selected from a group consisting of ethylene, propylene, 1-butene, 1-pentene, 1-hexene, 1-octene, 1-decene, 1-dodecene, 4-methyl-1-pentene, 3-methyl-1-pentene, and 3-methyl-1-butene.

* * * * *